US006813405B1

(12) United States Patent (10) Patent No.: US 6,813,405 B1
Bendett et al. (45) Date of Patent: Nov. 2, 2004

(54) COMPACT APPARATUS AND METHOD FOR INTEGRATED PHOTONIC DEVICES HAVING FOLDED DIRECTIONAL COUPLERS

(75) Inventors: Mark P. Bendett, Plymouth, MN (US); Gregory Whaley, Woodbury, MN (US)

(73) Assignee: Teem Photonics, Meylan (FR)

( * ) Notice: Subject to any disclaimer, the term of this patent is extended or adjusted under 35 U.S.C. 154(b) by 27 days.

(21) Appl. No.: 10/112,589

(22) Filed: Mar. 29, 2002

(51) Int. Cl.[7] .............................. G02B 6/12; G02B 6/26

(52) U.S. Cl. ........................................... 385/14; 385/30

(58) Field of Search ............................... 385/14, 30, 24

(56) References Cited

U.S. PATENT DOCUMENTS

| | | | |
|---|---|---|---|
| 2,110,237 A | 3/1938 | Parsons ........................ | 23/258 |
| 2,182,564 A | 12/1939 | Leiboff ........................ | 167/74 |
| 3,481,712 A | 12/1969 | Bernstein et al. ............. | 23/292 |

(List continued on next page.)

FOREIGN PATENT DOCUMENTS

| | | | |
|---|---|---|---|
| EP | 0778478 | 6/1997 | ........... G02B/6/293 |
| EP | 0784362 | 7/1997 | ............. H01S/3/06 |
| EP | 0938000 | 8/1999 | ............ G02B/6/12 |
| EP | 0964290 | 12/1999 | ........... G02F/1/313 |
| JP | 02222187 | 9/1990 | ............. H01S/3/23 |
| JP | 60-158407 | 8/1995 | |
| WO | WO-97/44686 | 11/1997 | |

OTHER PUBLICATIONS

"TIA/EIA Telecommunications Systems Bulletin," *APCO Project 25 System and Standards Definition, TSB102–A (Revision of TSB102)*, (1995).

Barbier, D., et al., "Sub–Centimeter length ion–exchanged waveguide lasers in Er/Yb doped phosphate glass," *11th Ann. Conf. on Integrated Optics and Optical Fibre Comm.*, vol. 4, (1997), pp. 41–44.

Roman, J..E., et al., "Neodymium–doped glass channel waveguide laser containing an integrated distributed Bragg reflector," *Applied Physics Letters, 61 (23)*, Amer. Inst. of Physics,(Dec. 7, 1992), pp. 2744–2746.

Veasey, David.L.,et al., "Arrays of distributed–Bragg–reflector waveguide lasers at 1536 nm in Yb/Er codoped phosphate glass", *Applied Physics Letters, 74 (6)*, Amer. Inst. of Physics, NY,(Feb. 8, 1999),pp. 789–791.

Veasey, D.L., et al., "Distributed Feedback Lasers in Rare–earth–doped phosphate glass", *(Abstract) Proceedings of the 7th European Conference on Integrated Optics with Technical Exhibition*, vol. 1, XP000978171, Delft, Netherlands, (Apr. 3–6, 1995),pp. 579–582.

*Primary Examiner*—John D. Lee
*Assistant Examiner*—Tina M Lin
(74) *Attorney, Agent, or Firm*—Schwegman, Lundberg, Woessner & Kluth, P.A.

(57) ABSTRACT

An integrated photonic apparatus that includes a glass substrate having a major surface, a first waveguide segment and a second waveguide segment, and a folded evanescent coupler connecting the first waveguide segment to the second. The folded evanescent coupler is formed by a first length of the first waveguide segment and an equivalent length portion of the second waveguide running parallel and adjacent to the first waveguide segment. The first length is substantially equal to one half of an evanescent-coupler length needed to transfer a first wavelength in a non-folded evanescent coupler. A reflector (e.g., dielectric mirror that is highly reflective to light of the first wavelength and also highly transmissive to light of a second wavelength) is located at an end of the folded evanescent coupler. The first length is selected to transfer substantially all light of a first wavelength.

37 Claims, 34 Drawing Sheets

U.S. PATENT DOCUMENTS

| | | |
|---|---|---|
| 3,733,179 A | 5/1973 | Guehler .................... 23/230 B |
| 3,880,630 A | 4/1975 | Izawa ............................ 65/30 |
| 3,888,648 A | 6/1975 | West et al. ..................... 65/30 |
| 4,039,249 A | 8/1977 | Kaminow et al. ..... 350/96 WG |
| 4,318,058 A | 3/1982 | Mito et al. .................... 372/50 |
| 4,335,079 A | 6/1982 | Vander Mey ............... 422/194 |
| 4,515,431 A * | 5/1985 | Shaw et al. ................... 385/30 |
| 4,768,849 A * | 9/1988 | Hicks, Jr. ..................... 385/30 |
| 4,983,197 A | 1/1991 | Froning et al. ............ 65/30.13 |
| 4,993,034 A | 2/1991 | Aoki et al. .................... 372/40 |
| 5,080,503 A | 1/1992 | Najafi et al. .................... 385/1 |
| 5,081,314 A | 1/1992 | Kissel et al. ................. 568/479 |
| 5,134,620 A | 7/1992 | Huber ............................ 372/6 |
| 5,142,660 A * | 8/1992 | Chang et al. .................. 385/10 |
| 5,151,908 A | 9/1992 | Huber ............................ 372/6 |
| 5,242,531 A | 9/1993 | Klingshirn et al. ...... 156/620.4 |
| 5,243,609 A | 9/1993 | Huber .......................... 372/19 |
| 5,271,024 A | 12/1993 | Huber ............................ 372/6 |
| 5,295,209 A | 3/1994 | Huber ......................... 385/37 |
| 5,311,540 A | 5/1994 | Pocholle et al. ............. 372/97 |
| 5,334,559 A | 8/1994 | Hayden ....................... 501/48 |
| 5,384,797 A | 1/1995 | Welch et al. .................. 372/23 |
| 5,491,708 A | 2/1996 | Malone et al. ................ 372/41 |
| 5,544,268 A | 8/1996 | Bischel et al. ................. 385/4 |
| 5,574,807 A | 11/1996 | Snitzer ........................ 385/24 |
| 5,579,154 A | 11/1996 | Mueller-Fiedler et al. .. 359/341 |
| 5,580,471 A | 12/1996 | Fukumoto et al. ..... 219/121.63 |
| 5,614,436 A | 3/1997 | Shim et al. .................. 437/129 |
| 5,623,567 A * | 4/1997 | Barberio et al. .............. 385/30 |
| 5,625,728 A * | 4/1997 | Tardy et al. ................... 385/30 |
| 5,660,611 A | 8/1997 | Ishikawa et al. .............. 65/384 |
| 5,677,920 A | 10/1997 | Waarts et al. ................... 372/6 |
| 5,684,899 A * | 11/1997 | Ota .............................. 385/24 |
| 5,858,051 A | 1/1999 | Komiyama et al. ............ 65/386 |
| 5,953,359 A | 9/1999 | Yamaguchi et al. .......... 372/50 |
| 6,055,342 A | 4/2000 | Yi et al. ....................... 385/15 |
| H1848 H | 5/2000 | Amin et al. ................. 385/132 |
| 6,144,785 A | 11/2000 | Fujita .......................... 385/24 |
| 6,211,980 B1 | 4/2001 | Terahara ..................... 359/128 |
| 6,304,697 B1 * | 10/2001 | Toyohara ..................... 385/50 |
| 6,304,711 B1 | 10/2001 | Samson et al. .............. 385/142 |
| 6,330,388 B1 | 12/2001 | Bendett et al. ............. 385/132 |

* cited by examiner

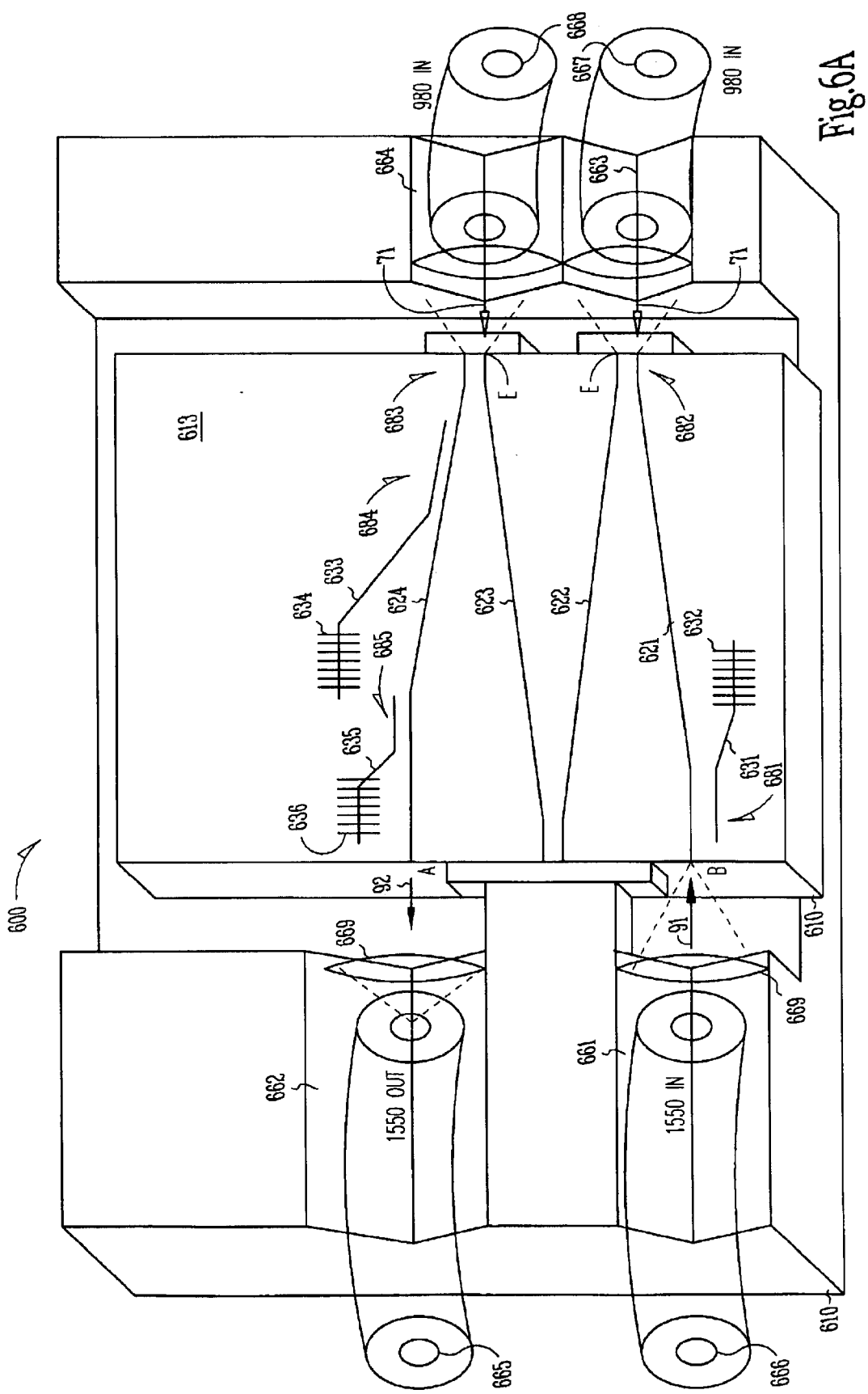

COMPACT APPARATUS AND METHOD FOR INTEGRATED PHOTONIC DEVICES HAVING FOLDED DIRECTIONAL COUPLERS

RELATED APPLICATIONS

This application is also related to: U.S. patent application Ser. No. 10/112,571, entitled METHOD AND APPARATUS FOR TAPPING A WAVEGUIDE ON A SUBSTRATE filed on Mar. 29, 2002, and U.S. patent application Ser. No. 09/995,407, entitled APPARATUS AND METHOD FOR INTEGRATED PHOTONIC DEVICES HAVING HIGH-PERFORMANCE WAVEGUIDES AND MULTICOMPOSITIONAL SUBSTRATES filed Nov. 27, 2001, and U.S. patent application Ser. No. 09/995,346, entitled APPARATUS AND METHOD FOR INTEGRATED PHOTONIC DEVICES HAVING GAIN AND WAVELENGTH-SELECTIVITY filed Nov. 27, 2001, and U.S. patent application Ser. No. 09/995,404, entitled APPARATUS AND METHOD FOR INTEGRATED PHOTONIC DEVICES HAVING ADD/DROP PORTS AND GAIN filed Nov. 27, 2001, and U.S. patent application Ser. No. 09/995,406, entitled APPARATUS AND METHOD FOR INTEGRATED PHOTONIC DEVICES HAVING ADJUSTABLE GAIN filed on Nov. 27, 2001, and U.S. patent application Ser. No. 09/490,748, entitled RARE-EARTH DOPED PHOSPHATE-GLASS LASERS AND ASSOCIATED METHODS filed on Jan. 25, 2000, and U.S. patent application Ser. No. 09/490,733, entitled METHOD AND APPARATUS FOR CLOSED-CRUCIBLE PROCESSING OF WAVEGUIDE OPTICS filed on Jan. 25, 2000, and U.S. patent application Ser. No. 09/490,730, entitled METHOD AND APPARATUS FOR WAVEGUIDE OPTICS AND DEVICES filed on Jan. 25, 2000, each of which are incorporated in their entirety by reference.

FIELD OF THE INVENTION

This invention relates to the field of optics and lasers, and more specifically to a method and apparatus including multi-compositional glass substrates and related devices and optical waveguides on a glass substrate.

BACKGROUND OF THE INVENTION

The telecommunications industry commonly uses optical fibers to transmit large amounts of data in a short time. One common light source for optical-fiber communications systems is a laser formed using erbium-doped glass. One such system uses erbium-doped glass fibers, or a small slab substrate of erbium-doped glass having waveguides formed on or near one face of the substrate, to form a laser that emits at a wavelength of about 1.536 micrometer and which is pumped by an infrared source operating at a wavelength of about 0.98 micrometer, such as a semiconductor laser diode. One method usable for forming waveguides in a substrate is described in U.S. Pat. No. 5,080,503 issued Jan. 14, 1992 to Najafi et al., which is hereby incorporated by reference. A phosphate glass useful in lasers is described in U.S. Pat. No. 5,334,559 issued Aug. 2, 1994 to Joseph S. Hayden, which is also hereby incorporated by reference. An integrated optic laser is described in U.S. Pat. No. 5,491,708 issued Feb. 13, 1996 to Malone et al., which is also hereby incorporated by reference.

To increase signal-carrying bandwidth, an optical fiber can carry a plurality of different wavelengths (i.e., colors), wherein each wavelength is modulated (e.g., using amplitude modulation) with a different signal stream. Dense wavelength-division multiplexing (DWDM) is the name for one such scheme wherein each signal stream is modulated on a carrier wavelength that is close to, but slightly different than, the neighboring wavelengths. For example, the carrier wavelengths can be chosen in the infrared at, say, 1536 nm, 1536.8 nm, 1537.6 nm, etc., for a wavelength spacing of 0.8 nm per channel. Many such wavelengths/channels can be combined and transmitted on a single optical fiber. Since photons have extraordinarily low or no interaction with one another, these channels are transmitted with no crosstalk or other inter-channel interference. Further, a broadband light amplifier can be used to simultaneously amplify all the colors/channels by equal amounts, also without introducing crosstalk. The challenge, thus, is to be able to separate the channels (i.e., to split off each channel's color without also getting interfering light signals from adjacent channels' colors).

It is desirable to be able, at, for example, a building in downtown Minneapolis, to extract one channel from the plurality of optical channels of data carried on a single optical fiber, e.g., to extract a first data stream that is modulated on the 1536.8 nm channel from all the other channels on some single optical fiber, and to insert in its place a second data stream that is modulated on the 1536.8 nm channel. The remaining channels being transmitted on the optical fiber should be undisturbed. This allows data that has a destination in that building to be separated and delivered into that building, and for other data in the second data stream to be sourced from that building and sent elsewhere.

There is a need in the art for an integrated optical system, including one or more high-powered lasers and/or amplifiers, along with routing and other components, that can be inexpensively mass-produced. The system should be highly reproducible, accurate, and stable. In particular, there is a need for an amplifier with stable and high gain formed on a relatively small glass substrate. There is further a need to having improved delivery of pump light to the active waveguides. There is further a need for improved add-drop devices that permit extraction of a first signal stream at a first wavelength from a plurality of other signal wavelengths, and insertion of a second signal stream modulated onto a laser carrier of the first wavelength.

SUMMARY OF THE INVENTION

The present invention is embodied by a amplifier, laser, and/or other optical, or combined, waveguide component that is formed using a glass substrate. In some embodiments, some or all portions of the substrate are doped with one or more optically active lanthanide species. The integrated optical device has one or more of waveguides defined by channels within the substrate.

One aspect of the present invention provides an integrated photonic apparatus that includes a glass substrate having a major surface, a plurality of waveguide segments on the surface of the substrate including a first waveguide segment and a second waveguide segment, and a folded evanescent coupler connecting the first waveguide segment to the second waveguide segment. In some embodiments, the folded evanescent coupler includes an evanescent coupler formed by a length portion, having a first length, of the first waveguide segment and an equivalent length portion of the second waveguide running parallel and adjacent to the length portion of the first waveguide segment, wherein the first length is substantially equal to one half of an evanescent coupler length needed to transfer a first wavelength in a non-folded evanescent coupler, and a reflector located at an end of the folded evanescent coupler.

In some embodiments, the first length is a length selected to transfer substantially all light of a first wavelength from the first waveguide segment to the second waveguide segment.

In some such embodiments, the reflector is a dielectric mirror that is highly reflective to light of the first wavelength. In some such embodiments, the reflector is also highly transmissive to light of a second wavelength, wherein the first wavelength is different than the second wavelength.

In some embodiments, the integrated photonic apparatus also includes a first port configured to launch signal light into the first waveguide segment, a second port configured to launch signal light into the second waveguide segment, and a third port configured to launch signal light into both the first waveguide segment and port configured to launch signal light into the first waveguide segment and into the second waveguide segment. In some such embodiments, the third port is through the reflector.

In some embodiments, the first length is a length selected to transfer substantially all light of a first wavelength from the first waveguide segment to the second waveguide segment, while the length is also selected to transfer substantially no light of a second wavelength from the first waveguide segment to the second waveguide segment, wherein the first wavelength is different than the second wavelength.

In some embodiments, the first length is a length selected to transfer substantially all light of a first wavelength from the first waveguide segment to the second waveguide segment, while the length is also selected to transfer substantially all of a second wavelength from the first waveguide segment to the second a waveguide segment, wherein the first wavelength is substantially different than the second wavelength.

Another aspect of the present invention provides an integrated photonic apparatus including a glass substrate having a major surface, a plurality of waveguide segments on the surface of the substrate including a first waveguide segment, a second waveguide segment, a third waveguide segment, a fourth waveguide segment, a first folded evanescent coupler connecting the first waveguide segment to the second waveguide segment, and a second folded evanescent coupler connecting the third waveguide segment to the fourth waveguide segment.

In some embodiments, the first folded evanescent coupler includes an evanescent coupler formed by a length portion, having a first length, of the first waveguide segment and an equivalent length portion of the second waveguide running parallel and adjacent to the length portion of the first waveguide segment, wherein the first length is substantially equal to one-half of an evanescent coupler length needed to transfer a first wavelength in a non-folded evanescent coupler, and a first reflector located at an end of the first folded evanescent coupler. In some embodiments, the second folded evanescent coupler includes an evanescent coupler formed by a length portion, having a second length, of the third waveguide segment and an equivalent length portion of the fourth waveguide running parallel and adjacent to the length portion of the third waveguide segment, wherein the second length is substantially equal to one half of an evanescent coupler length needed to transfer a second wavelength across a non-folded evanescent coupler, and a second reflector located at an end of the second folded evanescent coupler.

The present invention also provides apparatus and methods for amplifying light in a relatively short transverse distance on a glass substrate. Various embodiments include combinations and sub-combinations of the described subdevices, functions, and/or features.

BRIEF DESCRIPTION OF THE DRAWINGS

FIG. 6A shows a top isometric view of a waveguide device 600 having waveguide configuration repeating the configuration of device 104 of FIG. 1J.

DESCRIPTION OF PREFERRED EMBODIMENTS

Figure 1A:
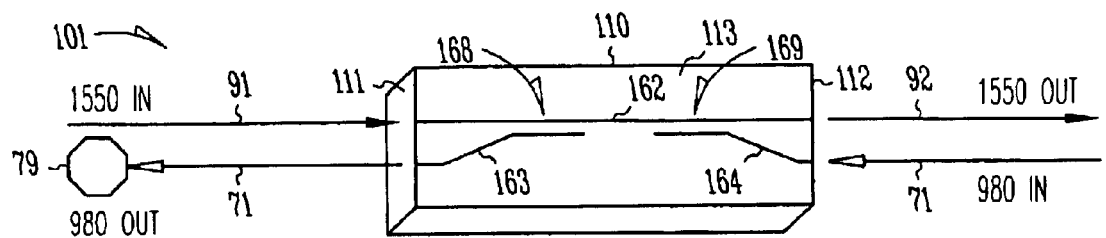
FIG. 1A shows a top isometric view of a waveguide device 101 having a signal waveguide segment passing signal light left to right, two pump waveguide segments passing pump light right to left, and two evanescent couplers that launch pump light into the signal waveguide near its right end and extract pump light from the signal waveguide near its left end.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The present invention provides a process for forming waveguides onto (or into) the surface of a glass substrate. In one embodiment, photolithographic techniques define waveguides by changing the index of refraction of waveguide channels formed into the surface of the substrate. In one such embodiment, a glass wafer, for example approximately 10 cm by 10 cm by 1 mm, is cut from a slab of IOG-1 laser glass available from Schott Glass Technologies, Inc., of Duryea, Pa., USA. The surfaces of interest, including a "top" major surface (where "top" refers to an orientation in the Figures of this discussion, and not necessarily to an orientation used in the process or operation of the devices) are polished to optical smoothness. This wafer is then processed to form waveguides, diffraction gratings, and/or other features across the wafer, which is then diced to form one or more chips. Each chip, typically measuring from 0.5 to 2 centimeters along one side and from 0.5 to 2 centimeters along the other side of the major surface, is then mounted and/or packaged, possibly with other components such as semiconductor pump lasers, to form a module having optical and/or electrical connections to the outside. Optical systems and networks (such as local area networks or portions of the internet) are then assembled using the packaged module.

In some embodiments, a phosphate glass composition called IOG1 glass available from Schott Glass Technologies, Inc. is used, and molten potassium salt ion-exchange is used to form the waveguides. In some such embodiments, these waveguides are formed as described in the above mentioned U.S. patent application Ser. No. 09/490,730. In other embodiments, a silver salt ion-exchange is used instead to form the waveguides, in order to make smaller-diameter waveguides. In some embodiments, for example, the doped glass is IOG1 glass that has an Erbium concentration of about 1.5 times $10^{20}$ ions/cc and a Ytterbium concentration of about 6 to 8 times $10^{20}$ ions/cc, and the undoped glass is IOG1 glass that has little or no Erbium or Ytterbium. In various other embodiments, the dopant combinations are Erbium about 1 times $10^{20}$ ions/cc and Ytterbium about 4 times $10^{20}$ ions/cc, Erbium about 1.5 times $10^{20}$ ions/cc and Ytterbium about 4 times $10^{20}$ ions/cc, Erbium about 1 times $10^{20}$ ions/cc and Ytterbium about 6 times $10^{20}$ ions/cc, Erbium about 1.25 times $10^{20}$ ions/cc and Ytterbium about 6 times $10^{20}$ ions/cc, or Erbium about 1.5 times $10^{20}$ ions/cc and Ytterbium about 6 times $10^{20}$ ions/cc. In some embodiments, shorter devices include doping with a higher a Ytterbium concentration, in order to have the pump light absorbed within the device rather than exiting the device as waste light.

In some embodiments, the present invention is embodied by an amplifier component that includes a glass substrate doped with one or more optically active lanthanide species, and having a plurality of waveguides defined by channels within the substrate.

As used herein, a "channel within the substrate" is meant to broadly include any channel that guides light and is formed upon, on or in the substrate, whether or not buried under a surface of the substrate or covered by another structure or layer of substrate. As used herein, when an embodiment reciting one or more optically active lanthanide species is described, other embodiments may also or alternatively use one or more laser species that are not a lanthanide.

Each substrate waveguide (or "channel") is defined within the substrate as a region of increased index of refraction relative to the substrate. The glass substrate is doped with one or more optically active lanthanide species which can be optically pumped (typically a rare-earth element such as Er, Yb, Nd, or Pr or a combination of such elements such as Er and Yb) to form a laser medium which is capable of lasing at a plurality of frequencies. Mirrors or distributed Bragg reflection gratings (DBR gratings) or other diffraction gratings are located along the length of a waveguide, in some embodiments, in order to provide feedback to create a laser-resonator cavity, or to provide a wavelength-selective filter, or to provide a gain-flattening filter, or to extract light from the underlying waveguide through the face of the chip, or to inject light from above the face into the underlying waveguide. In some embodiments, lasers are formed by making one or more of the mirrors or reflection gratings partially reflective for providing laser output.

In some embodiments, a chip includes a laser component, which in turn includes a monolithic array of individual waveguides in which the waveguides of the array form laser resonator cavities with differing resonance characteristics (e.g., each cavity resonating at one of a plurality of differing wavelengths). The component may thus be used as part of a laser system outputting laser light at a plurality of selected wavelengths. In certain embodiments of the invention, the resonance characteristics of a waveguide cavity are varied by adjusting the width of the channel formed in the substrate which thereby changes the effective refractive index of the waveguide, thus changing the effective optical spacing of the grating. The effective refractive index can also be changed by modifying the diffusion conditions under which the waveguides are formed as described below. Changing the effective refractive index thus changes the effective DBR spacings length of the waveguide cavity which in some embodiments determines the wavelengths of the longitudinal modes supported by the cavity. In another embodiment, the resonance characteristics of the waveguide cavities are individually selected by varying the pitch of the reflection gratings used to define the cavities which, along with the effective refractive index of the waveguide under the DBR for the propagated optical mode, determines the wavelengths of light reflected by the gratings. In still other embodiments, the location of the reflectors on the waveguide is varied in order to select a laser-resonator cavity length that supports the desired wavelength of light.

One aspect of the invention is an integrated optical component built on a single optical chip that includes a evanescent coupler (also called a directional coupler) formed by two parallel sections of waveguide. The length and spacing of the waveguides are designed to pass, from one waveguide to the other, one or the other, or both, of two different wavelengths of light. For example, some embodiments of the invention use 980 nm light from a semiconductor laser diode as the pump frequency, which is launched into a first of two waveguides FIG. 1A shows a top isometric view of a waveguide device 101 embodying this aspect. Waveguide device 101 includes glass substrate 110 having a first edge face 111, a second edge face 112, and a major surface face 113. Face 113 has several waveguide segments, each buried slightly below the surface in order to reduce losses due to surface roughness and imperfections. In some embodiments, the waveguides are formed by masking the surface, for example with aluminum that is lithographically patterned with the desired waveguide pattern, diffusing waveguides on the surface of the unmasked portions using a molten silver-salt or eutectic-silver-salt bath, and then driving the waveguides below the surface using a molten sodium salt bath and an electric field (also called field-assisted diffusion). In some embodiments, the waveguides are formed by contacting at least one optically smooth major surface of a phosphate glass with a molten-salt ion-exchange medium capable of supplying silver replacement ions, at a temperature sufficient to melt the medium, and for a time sufficient to increase the surface index of refraction with respect to the index of refraction of the substrate glass sufficient to form waveguides, and replacing Na<+>ions of the glass substrate the silver ions supplied by the exchange medium, and cooling the resulting glass. In some embodiments, the glass is then placed in a molted salt bath having sodium, potassium or a eutectic combination salt, and a DC voltage is applied across the major surfaces of the substrate for a time sufficient to bury the waveguides far enough below the surface of the substrate to substantially reduce or eliminate surface dispersions. Such a process is further described in U.S. Pat. No. 4,913,717 entitled Method for fabricating buried waveguides issued Apr. 3, 1990 to Cooper, which is incorporated by reference.

Substrate 110 includes a signal waveguide segment 162 passing signal light left to right, a first pump waveguide segment 164 that passes pump light right to left and ends with evanescent coupler 169 that launches pump light into the signal waveguide 162 near its right end (in order to clearly illustrate the invention, the Figures are not to scale). Pump light is extracted from the signal waveguide 162 near its left end by evanescent coupler 168 and is thus diverted into waveguide segment 163.

Figure 1B:
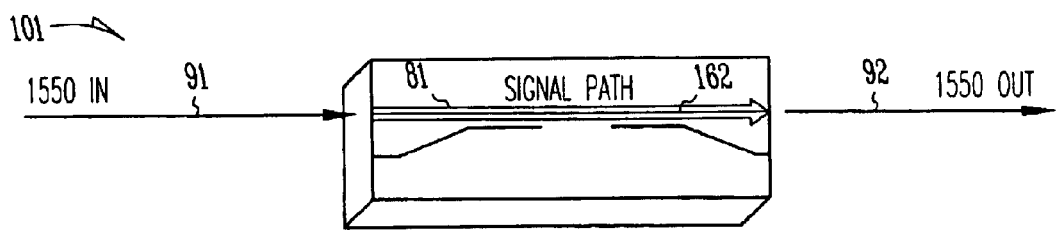
FIG. 1B shows a top isometric view of waveguide device 101 showing the signal light path passing signal light left to right.

FIG. 1B shows a top isometric view of waveguide device 101 showing the signal light path 81 passing signal light left to right inside of waveguide 162. In some embodiments, signal light of about 1530 to about 1560 nm (called 1550 nm signal light herein) is used, as more fully described in patent application Ser. No. 09/490,730 entitled METHOD AND APPARATUS FOR WAVEGUIDE OPTICS AND DEVICES by inventors Bendett et al., which is incorporated by reference. 1550 nm SIGNAL IN 91 is launched through face 111 and into waveguide 162, for example, from an optical fiber and appropriate lens. Amplified 1550 nm SIGNAL OUT 92 is extracted from face 111, for example, into an optical fiber using an appropriate lens.

Figure 1C:
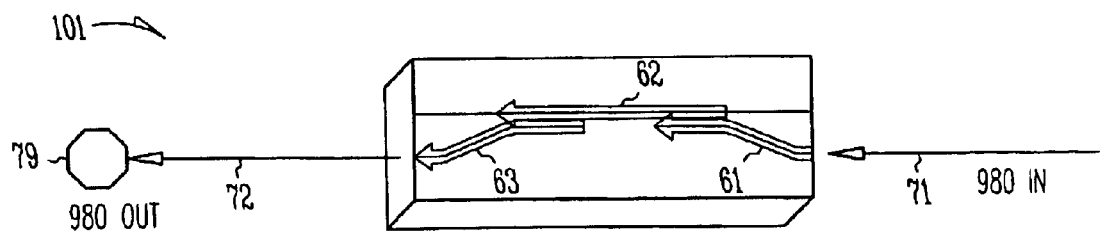
FIG. 1C shows a top isometric view of waveguide device 101 showing the pump light path passing pump light right to left.

FIG. 1C shows a top isometric view of waveguide device 101 showing the pump light paths 61, 62, 63 passing pump light right to left. 980-nm pump light 71 is launched into face 113 and into waveguide 164, for example, from an optical fiber and appropriate lens. The pump light 71 then crosses directional evanescent coupler 169 into waveguide segment 162 near its right-hand end, and crosses nearly the length of waveguide segment 162, pumping the active species (for example, Er of about 1% to about 8% by weight and Yb in about 1% to about 8% by weight in a phosphate glass such as IOG1, available from Schott Glass Technology of Duryea Pa.) in order to amplify the signal light that is passing in the opposite direction. The length and spacing of the respective waveguide segments forming the evanescent couplers is designed so that light of about 980 nm is nearly completely passed from one waveguide to the other while light of about 1550 nm does not cross. Thus, pump light is injected near one end of waveguide segment 162, and nearly all of it is extracted near the other end, avoiding the problem of having pump light 71 exit into the source signal 91. Further, the pump light travels in the opposite direction as the signal light, eliminating the possibility of pump light 71 going into the amplified exit signal 92. In some embodiments, any waste pump light 72 that exits is directed to an absorber 79.

Another aspect of the invention is an extraction port formed from an evanescent coupler and a dispersion grating having a spacing that causes a small portion of the wavelength of interest to exit through the top face (major surface) of the device.

Figure 1D:
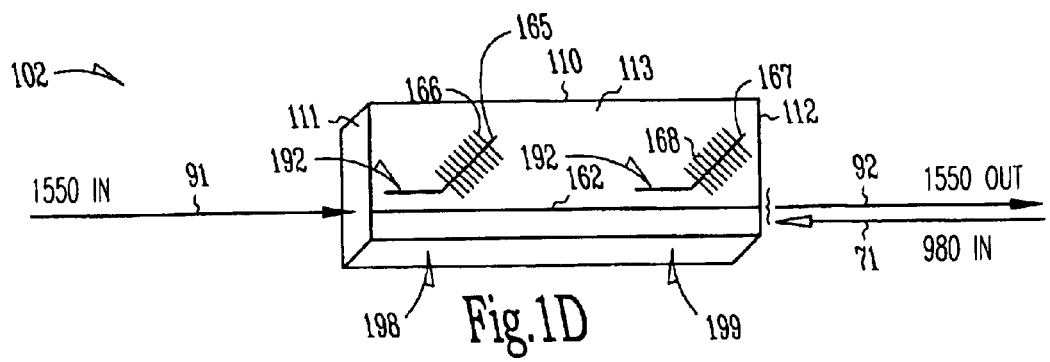
FIG. 1D shows a top isometric view of a waveguide device 102 having a signal waveguide segment passing signal light left to right, two signal extraction ports that remove a small portion of the input signal and a small portion of the output signal.

FIG. 1D shows a top isometric view of a waveguide device 102 embodying this aspect. Device 102 includes a signal waveguide segment 162 passing signal light left to right, a first signal extraction port 198 having evanescent coupler 192 into a surface waveguide segment 165, and a surface grating 166 that removes a small portion of the input signal and directs it out of face 113 of substrate 110. A second signal extraction port 199 having an evanescent coupler 192 into a surface waveguide segment 167, and a surface grating 168 that removes a small portion of the output signal and directs it out of face 113 of substrate 110. In some embodiments as shown, pump light is launched into the end of waveguide segment 162 though face 112, and amplified signal out 92 is extracted from the same location. In other embodiments, the pump light is routed through one or more evanescent couplers such as shown in FIG. 1A or FIG. 1K.

Figure 1E:
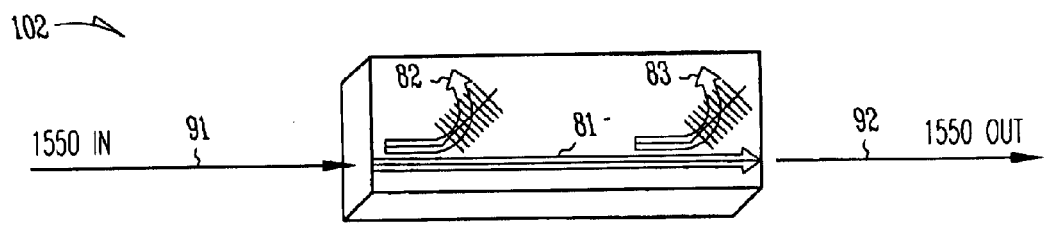
FIG. 1E shows a top isometric view of waveguide device 102 showing the signal light path passing signal light left to right, and extraction of two portions of the signal.

FIG. 1E shows a top isometric view of waveguide device 102 showing the signal light path passing signal light left to right, and extraction of a first portion 82 of the input signal, and extraction of a second portion 83 of the output signal. In some embodiments, a number of different length and different spaced evanescent couplers are empirically and/or theoretically tested, and a length of evanescent coupler is chosen to couple, for example about 1% or 5% or 10% of the input signal into waveguide segment 165, and all of that light is output using grating 166. This port allows power measurement, data extraction, or other uses of one or more wavelengths of the input signal. In some embodiments, the grating spacing is chosen to select a very narrow spectrum portion (for example, between about 1536.2 to 1536.6 nm) for output through the face 113, while all other wavelengths are absorbed in substrate 110. Similarly, a small portion (which may be a different percentage than the portion at port 198) of the amplified output signal is output through port 199. This port allows power measurement, data extraction, or other uses of one or more wavelengths of the input signal.

As described more fully below, in some embodiments waveguide segment 165 is buried (such as waveguide 184 of FIG. 1H) in the portion used for evanescent coupler 192, and then transitions to a surface waveguide (such as waveguide 189 of FIG. 1H) in the portion under grating 166. In some embodiments, the entire length of waveguide segment 165 is within the defined evanescent coupler 192, positioned as shown in FIG. 1H above and to the side of waveguide segment 162, while in other embodiments, is positioned directly above waveguide 162. In these embodiments, grating 166 is also placed directly over the evanescent coupler 192, in order that the small percentage of signal light that couples into waveguide segment 165 is then directed through grating 166 and out through face 112. One advantage of the configuration shown in FIG. 1D is that the evanescent couplers 198 and 199 are directional, so no pump light is coupled across, regardless of length or spacing of the waveguides in the coupler.

Figure 1F:
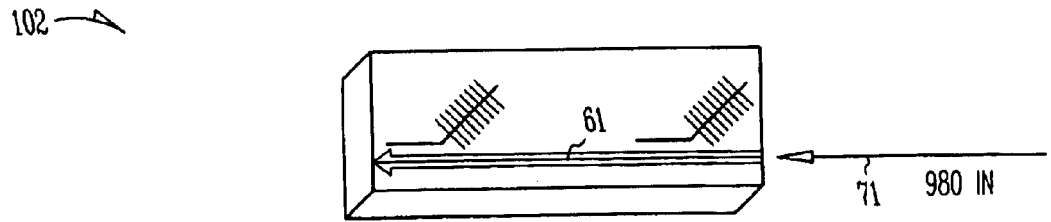
FIG. 1F shows a top isometric view of waveguide device 102 showing the pump light path passing pump light right to left.

FIG. 1F shows a top isometric view of waveguide device 102 showing the pump light path 61 passing pump light 71 right to left.

Figure 1G:
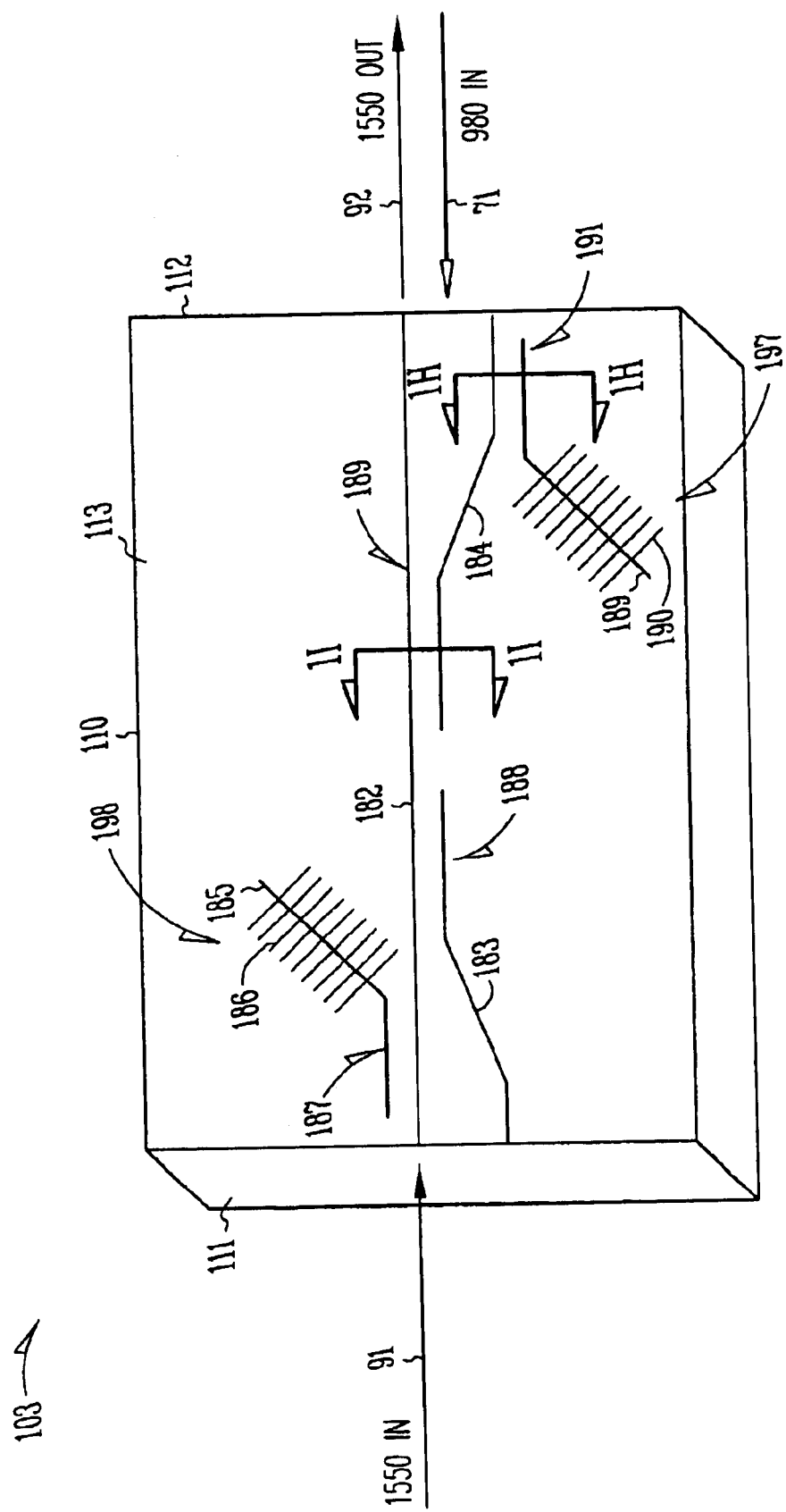
FIG. 1G shows a top isometric view of a waveguide device 103 having a signal waveguide segment passing signal light left to right, one signal extraction port that removes a small portion of the input signal and one pump extraction port that removes a small portion of the pump input.
Figure 1H:
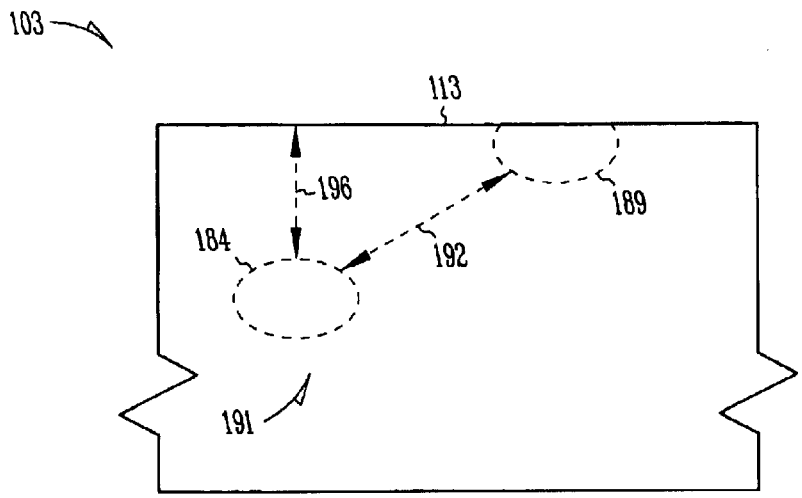
FIG. 1H shows an enlarged lateral cross section view of waveguide device 103 schematically showing a buried waveguide evanescently coupled to an adjacent but separated surface waveguide.

FIG. 1G shows a top isometric view of a waveguide device 103 having a signal waveguide segment 182 passing signal light left to right, one signal extraction port 198 (which includes waveguide segment 185, evanescent coupler 187, and grating 185) that removes a small portion of the input signal and one pump extraction port 197 (which includes waveguide segment 189, grating 190 and evanescent coupler 191) that removes a small portion of the pump input 71. This device operates in a manner substantially the same as described above for FIG. 1D, except that port 197 allows power measurement of the small portion of the pump light that exits through grating 190.

The evanescent coupling of waveguides 191, 189, and 188 is directional and right to left in FIG. 1G. This allows pump light 71 to be inserted near the right end of waveguide segment 182, and removed from the left end, thus preventing pump light form exiting either of the signal ports of waveguide segment 182 at faces 111 and 112.

FIG. 1H shows an enlarged cross section view of waveguide device 103 schematically showing a buried waveguide 184 spaced apart by distance 192, and evanescently coupled, to an adjacent but separated surface waveguide 189. Waveguide 184 is buried by distance 196, which, in some embodiments, is about 6 to 8 micrometers. In other embodiments, waveguide 189 is buried in the region of evanescent coupler 191, but then transitions to a surface waveguide 189 as shown in FIG. 1H in the region of grating 190.

Figure 1I:
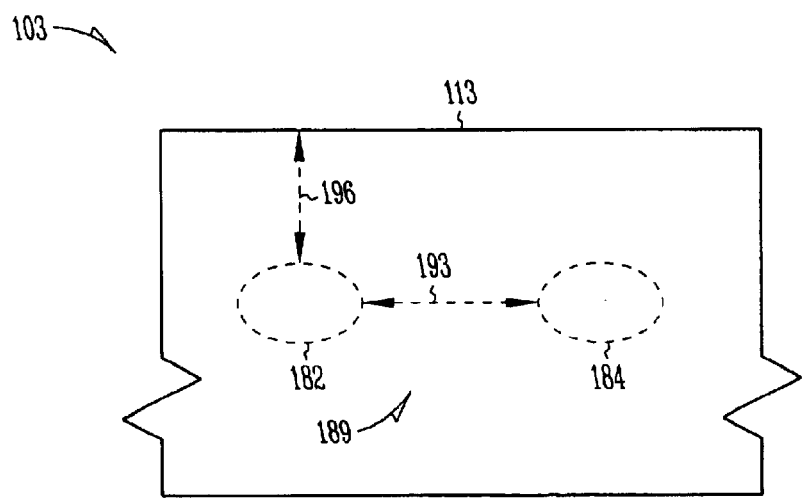
FIG. 1-I shows an enlarged lateral cross section view of waveguide device 103 schematically showing a buried waveguide evanescently coupled to an adjacent but separated buried waveguide.
FIG. 1J shows a top isometric view of a waveguide device 104 having a signal waveguide segment passing signal light left to right, a folded evanescent coupler that directionally couples the signal light to another waveguide segment that passes the signal light right to left.
FIG. 1K shows a top isometric view of a waveguide device 105 having a plurality of subdevices 120, each having a signal waveguide segment passing signal light left to right, a folded evanescent coupler that directionally couples the signal light to another waveguide segment that passes the signal light right to left, and a pump light injection port.
FIG. 1L shows a top isometric view of waveguide device 105 showing the signal light path passing signal light left to right in a first waveguide and then right to left in a second waveguide.
FIG. 1M shows a top isometric view of waveguide device 105 showing the pump light path passing pump light right to left in both waveguides.
FIG. 1N shows a conceptual graph of the respective evanescent coupling ratios of two different wavelengths of light versus evanescent-coupler-length for a coupler having a given spacing.
FIG. 1O shows an enlarged lengthwise cross section view of waveguide device 106 schematically showing a buried waveguide having a transition into a surface waveguide.
FIG. 1P shows an enlarged lengthwise cross section view of waveguide device 106 schematically showing a buried waveguide having a transition into a surface waveguide.
FIG. 1Q shows an enlarged lengthwise cross section view of waveguide device 107 schematically showing a buried waveguide having an evanescent coupling transition to a surface waveguide.
FIG. 1R shows an enlarged lengthwise cross section view of waveguide device 107 schematically showing a buried waveguide having an evanescent coupling transition to a surface waveguide.
FIG. 1S shows a top isometric view of waveguide device 106 schematically showing a buried waveguide having a transition into a surface waveguide.
FIG. 1T shows a top isometric view of waveguide device 107 schematically showing a buried waveguide having an evanescent coupling transition to a surface waveguide.

FIG. 1I shows an enlarged cross section view of waveguide device 103 schematically showing a buried waveguide 184 evanescently coupled to an adjacent but separated buried waveguide 182.

Yet another aspect of the invention is a folded evanescent coupler that employs a length of side-by-side waveguides half the length that is normally needed for an evanescent coupler having the desired coupling characteristics. A reflector such as a mirror on the end of this half-length coupler forms a folded evanescent coupler of the proper effective length. See the discussion for FIG. 1N, below.

Figure 1J:
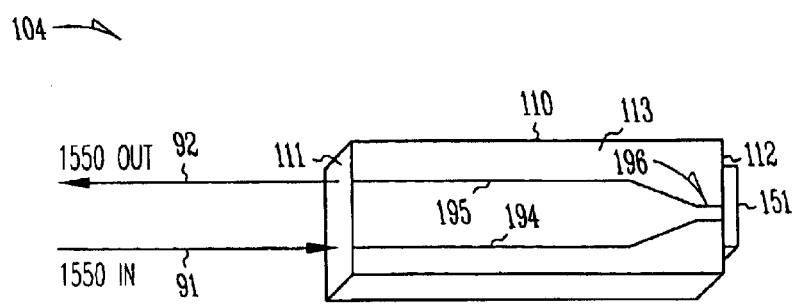
Figure 1K:
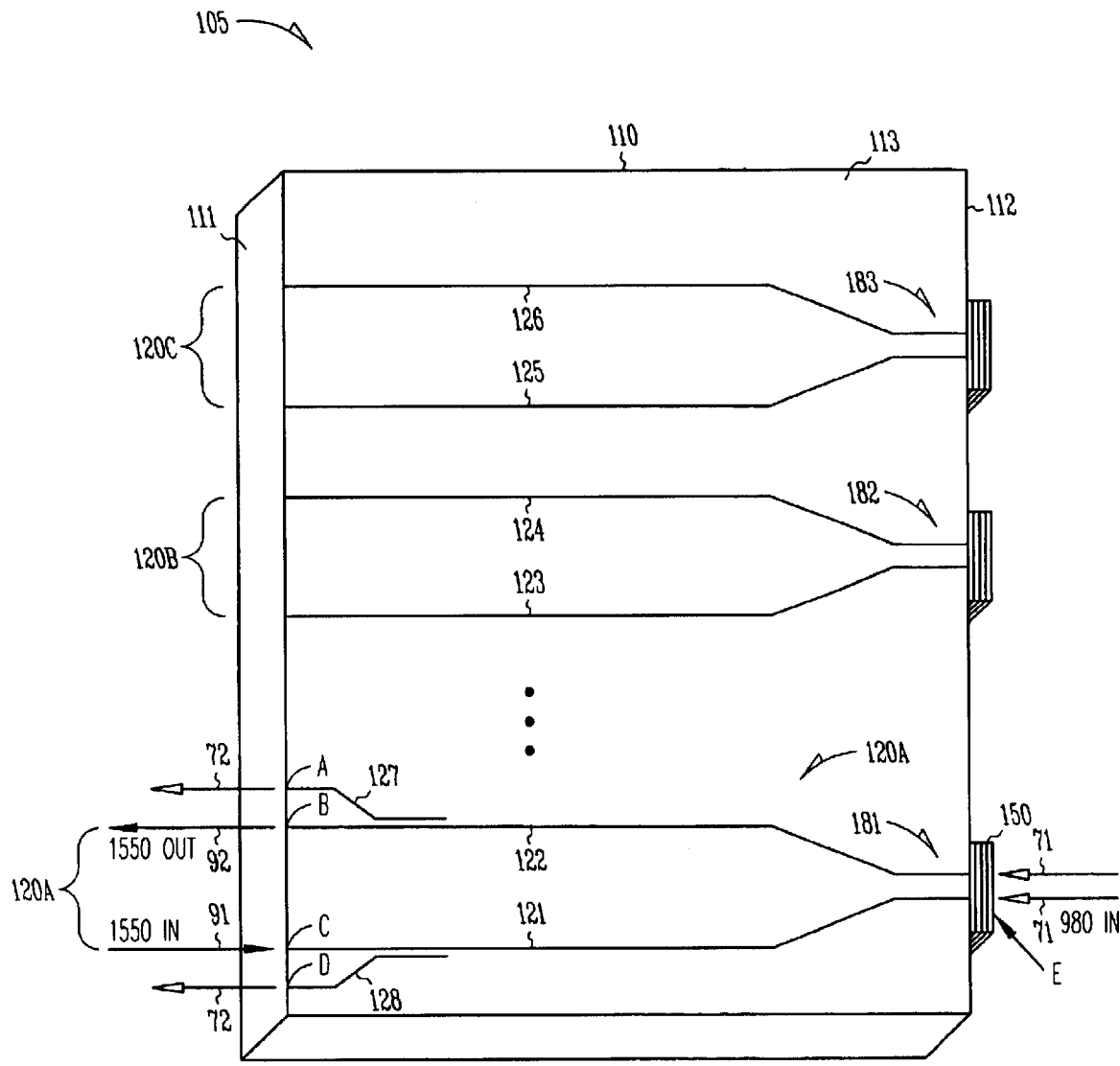

FIG. 1J shows a top isometric view of a waveguide device 104 having a signal waveguide segment 194 passing signal light 91 left to right, a folded evanescent coupler 196 that directionally couples the signal light to another waveguide segment 195 that passes the signal light right to left. Mirror 151 one face 112 makes the effective length, as seen by light in the device, to the proper length for the desired directional evanescent coupled transfer characteristic. In some embodiments, the substrate is undoped glass for some or all of the waveguide segments shown, but other optical components or functions are provided. In other embodiments, doped glass is used. This allows retro-reflection of the signal at the edge 112 of the substrate, allowing shorter substrate dimensions to achieve functions that otherwise would require longer substrates. For example, in some embodiments, folded lasers or folded amplifiers are thus formed.

FIG. 1K shows a top isometric view of a waveguide device 105 having a plurality of subdevices 120, each having a signal waveguide segment 121 passing signal light in port C, then left to right, a folded evanescent coupler 181 that directionally couples the signal light 91 to another waveguide segment 122 that passes the signal light right to left, the amplified light 92 exiting through port B at face 111, and a pump light injection port E. Reflector 150, which in some embodiments is a layered dielectric mirror that is highly reflective at about 1550 nm and highly transmissive at about 980 nm, thus reflecting the signal and transmitting the pump light 71 launched into port E through the mirror from face 112. In some embodiments, substrate 110 is highly doped with active lanthanide species, and the pump light is substantially completely absorbed, such that a negligible amount of pump light exits through the signal ports at face 111. Subdevice 120C typifies such an embodiment. In other embodiments, additional waveguide segments 127 and/or 128 are provided that evanescent couple (using evanescent couplers designed to transfer 980 nm pump light) substantially all remaining pump light 72 from the left ends of waveguide segments 121 and/or 122 for exit at separate ports A and D on face 111 (or, in other embodiments, for termination on chip 110).

In some embodiments, only one folded amplifier 120 is provided on a chip 110. In other embodiments, a plurality (such as 120A, 120B and 120C) of substantially identical amplifiers are provided, as shown. In some embodiments, this allows higher yields, since if one amplifier is faulty, the connections can be made to the next amplifier, or the next. This allows use of partially functional chips. In other embodiments, the two or more of the plurality of amplifiers can be connected, providing a multiple-amplifier device.

Figure 1L:
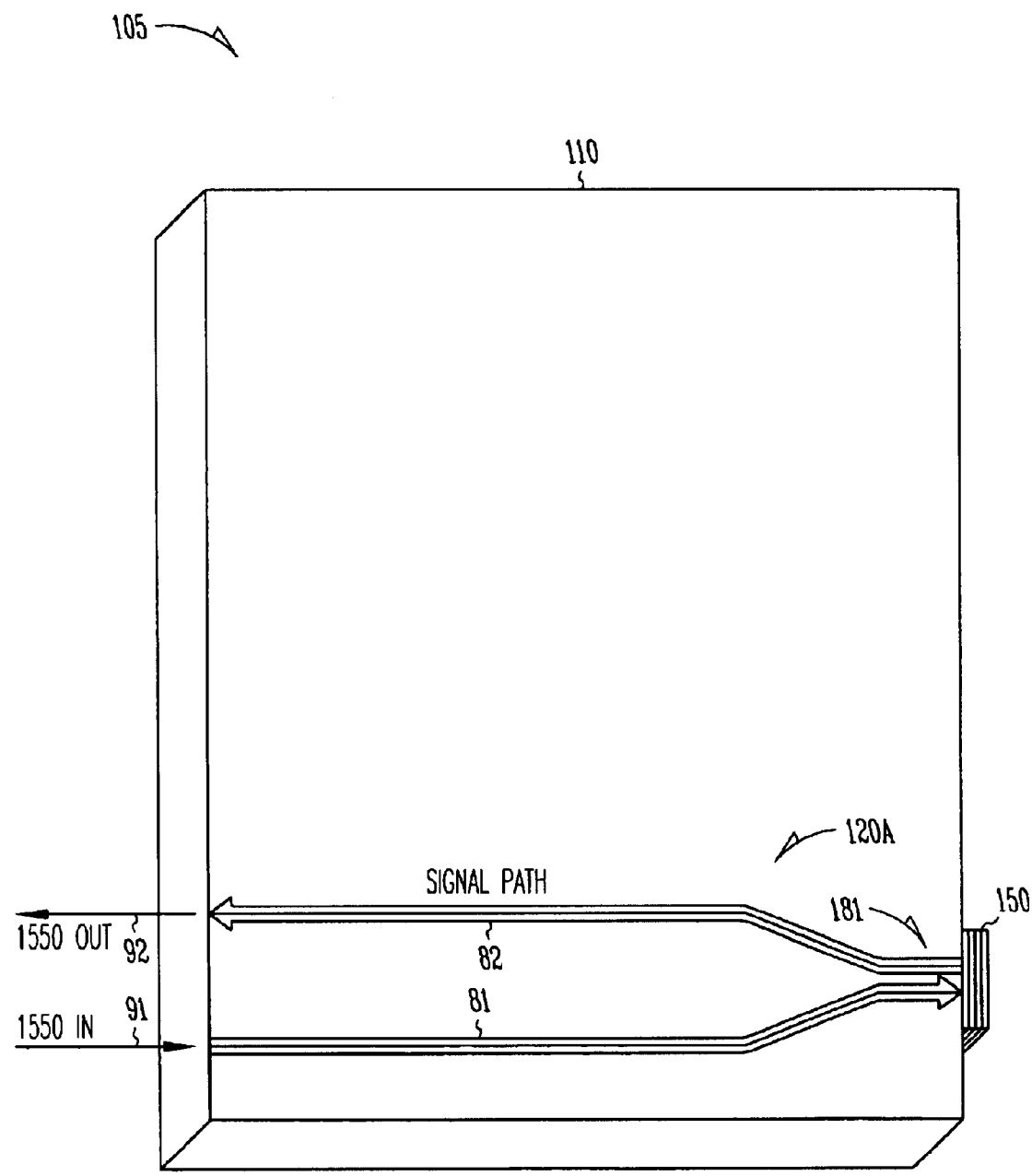

FIG. 1L shows a top isometric view of waveguide device 105 showing the signal light path 81 passing signal light left to right in a first waveguide and then path 82 passing light right to left in a second waveguide.

Figure 1M:
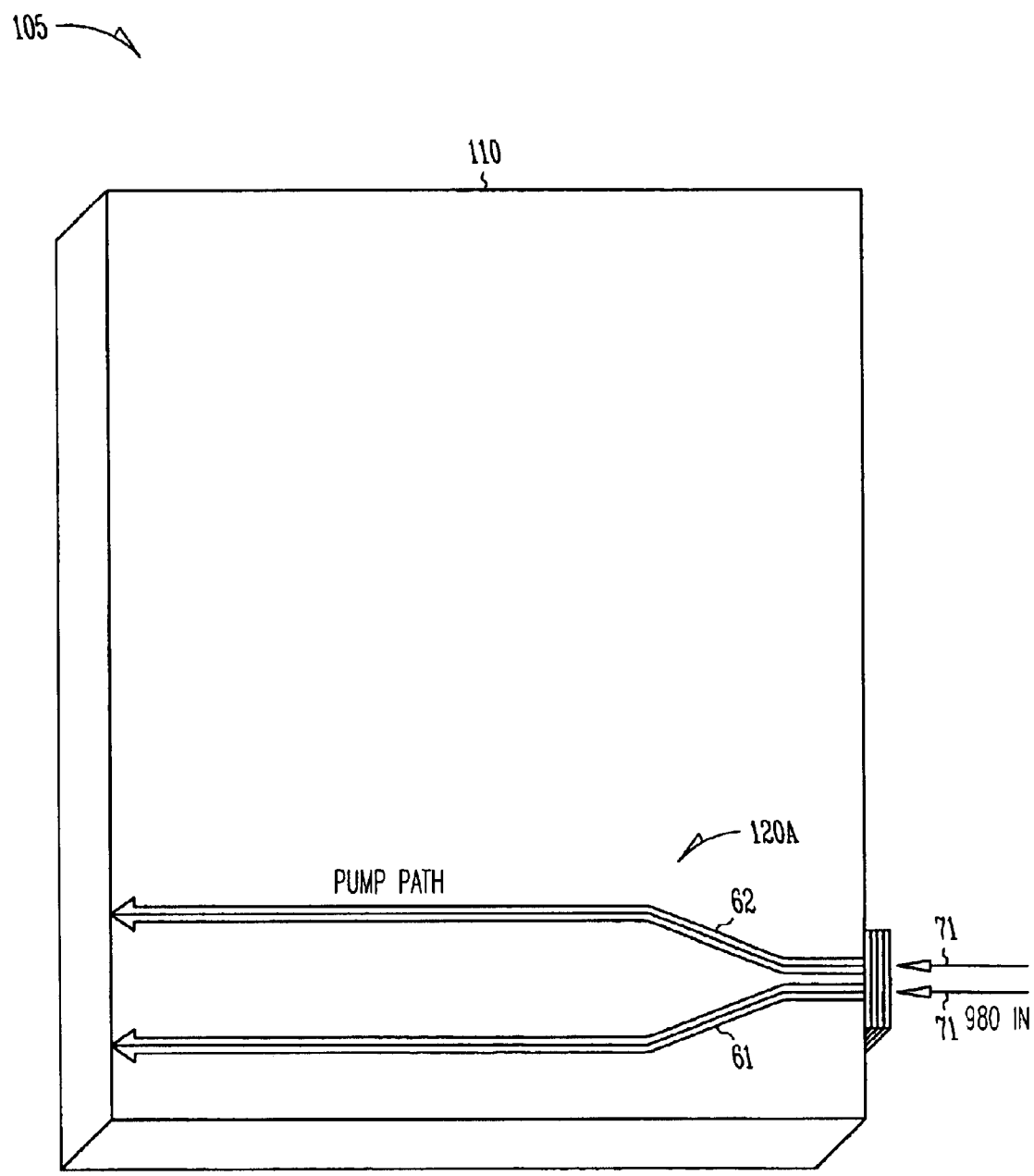

FIG. 1M shows a top isometric view of waveguide device 105 showing the pump light paths 61 and 62 passing pump light right to left in both waveguides. This is the case for a subdevice such as 120C that does not include waveguide segments 127 and 128. If waveguide segments 127 and/or 128 are included, the pump light crosses at the respective evanescent coupler and exits ports A and/or D.

In some embodiments, sufficiently high amounts of pump light 71 are provided, in order that a wide spectrum of signal wavelengths (for example, a large number of separate channels, each modulated onto a slightly different wavelength) are all modulated substantially fully with minimal cross-modulation.

In other embodiments, a chip 110 having a device 120A is provided, but a different connection is used. In these embodiments, a modulated signal input, having a first wavelength (e.g., 1536.0 nm), is launched into port C, passes left to right in waveguide segment 121, reflects into waveguide segment 122 at evanescent coupler 181, but is then completely transferred into waveguide segment 127 using an evanescent coupler designed to completely transfer 1550 nm light. Further, a constant intensity (also called unmodulated, or continuous-wave or cw) signal, having a first wavelength (e.g., 1540.0 nm) is launched into port C, passes left to right in waveguide segment 122, reflects into waveguide segment 121 at evanescent coupler 181, passes right to left but is then completely transferred into waveguide segment 128 using an evanescent coupler designed to completely transfer 1550 nm light. Thus, the modulated input signal goes from port C to port A in the opposite direction but in the same waveguides as the unmodulated cw input signal that goes from port B to port D. In these embodiments, a lower level of pump light is injected through port E, such that amplification of the modulated 1536.0 nm signal depletes the pumped species to an extent that cross modulation of the 1540.0 nm signal occurs. The more the 1536 signal is amplified, the less the 1540 nm signal is amplified. Thus the modulation pattern from the 1536.0 nm signal is inverted and imposed on the 1540.0 nm signal, thus changing the wavelength or channel of the data.

Figure 1N:
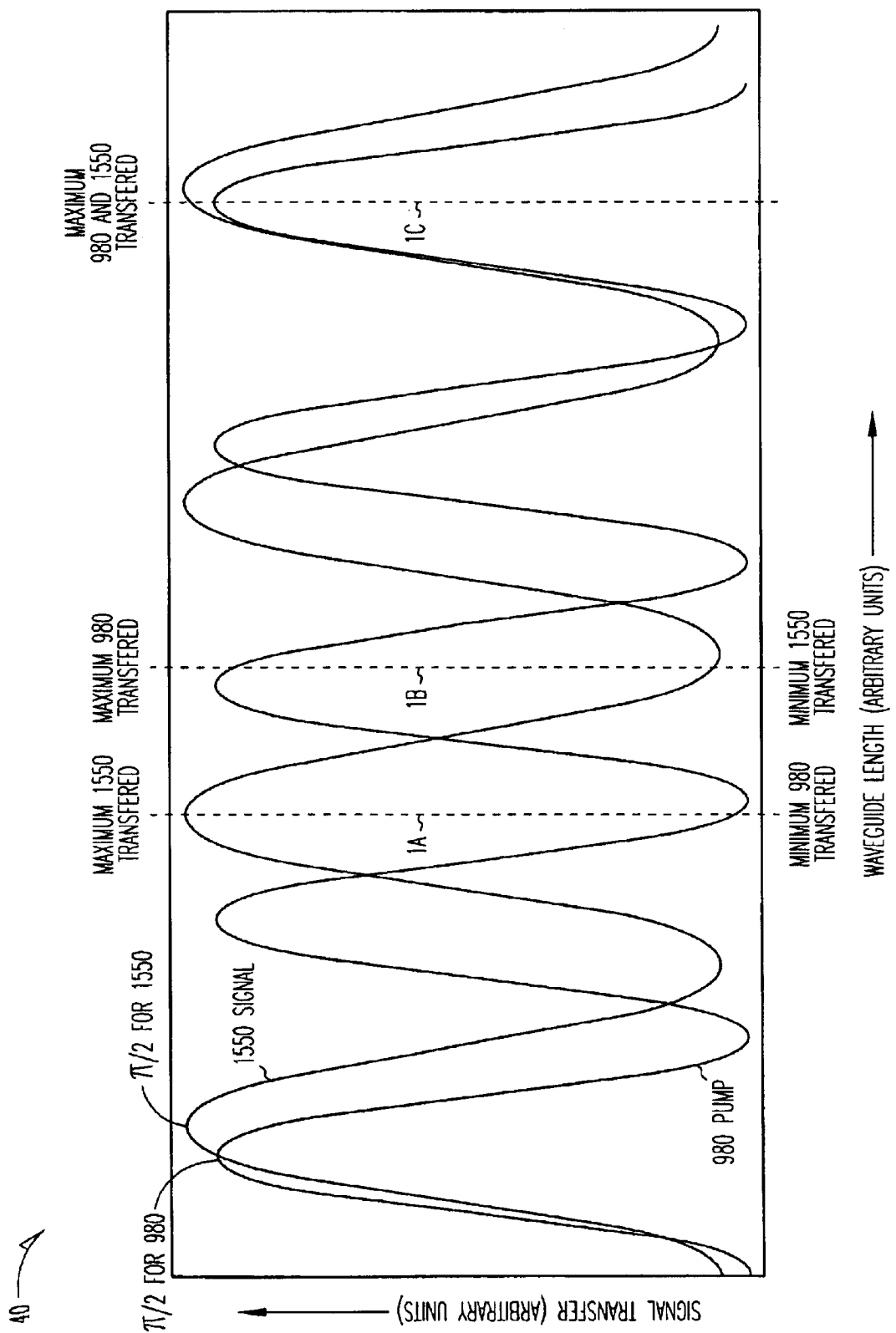
Figure 1O:
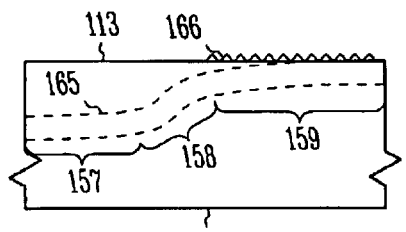

FIG. 1N shows a conceptual graph 40 of the respective evanescent coupling ratios of two different wavelengths of light (980 nm and 1550 nm) versus evanescent-coupler-length for an evanescent coupler having a given waveguide segment to waveguide segment lateral spacing. Such a graph is empirically measured by measuring the transfer characteristics of various spacings and lengths. The transfer function is a function of the wavelength of the light, waveguide segment spacing, evanescent coupler length, the mode size of the waveguide (the $1/e^2$ diameter of the optical field in the waveguide, often informally called the waveguide diameter or size), and index of refraction of the substrate and the waveguides, and the difference in indices of refraction between the waveguide and the surrounding material of the substrate (the delta-N) after all processing has been performed. A larger delta-N gives a smaller mode size, which needs a closer lateral spacing and/or longer interaction length for the evanescent coupler than for smaller delta-N values.

In some embodiments, the interaction length of the evanescent coupler is between about 100 microns (0.1 mm) and about 1000 microns (1.0 mm), and the lateral spacing of the waveguides is about 5 microns to about 10 microns (0.005 to 0.010 mm). The units of graph 40 and the interaction length of the evanescent coupler depends on several factors listed above, which vary with the composition of the glass and the processing used to make the waveguides. Determining the interaction length needed is straight forward, using formulas well known in the art and/or empirical measurements obtained by varying the length and/or spacing of test waveguides and measuring the amounts of light that do couple across and that do not, using the specific glass (such as IOG1). In some embodiments, an interaction length of about 600 microns (0.6 mm) and a center-to-center waveguide spacing of about 5 microns (0.005 mm), or 6 or 7 or 8 microns (0.006, 0.007, or 0.008 mm), is used. For folded evanescent couplers such as described below, a 600-micron interaction distance is obtained using a folded evanescent coupler length of 300 microns (0.3 mm) having a reflector (e.g., either a broadband metal mirror, or a wavelength selective layered dielectric mirror) in the middle.

In some embodiments, a dielectric mirror is used that is substantially transparent to pump light (e.g., 980 nm wavelength diode-laser light used to pump the glass laser or amplifier), and substantially reflective to signal light (e.g., one or more signal channels in a range between about 1520 to about 1560 nm, (herein called "1550 nm light")). The folded evanescent coupler is designed to have a device length that is one-half of the "full" interaction length that would transfer substantially all light of the pump wavelength and substantially all light of the signal wavelength. The pump light is launched through the mirror into one of the waveguide segments. It thus interacts with an evanescent coupler having half the length needed to transfer all its light across, and thus half the pump light goes out one waveguide segment and half goes out the other waveguide segment of the folded evanescent coupler. The signal light approaches the folded evanescent coupler in one of the waveguides from the opposite end. Thus the signal light approaching the folded evanescent coupler from either waveguide segment will experience half an interaction length going towards the mirror, and another half an interaction length going away from the mirror, and thus will be completely transferred to the other waveguide segment exiting the folded evanescent coupler.

FIG. 1-O shows an enlarged lengthwise cross section view of a waveguide device 106 schematically showing a waveguide segment 165 having a buried waveguide portion 157, a transition waveguide portion 158 and a surface waveguide portion 159. The buried portion prevents light losses due to surface interactions or imperfections, while the surface portion is needed in order to provide surface interactions such as with diffraction grating 166

Figure 1P:
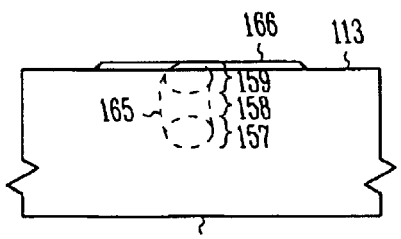

FIG. 1P shows an enlarged lengthwise cross section view of waveguide device 106, as described above for FIG. 1-O, schematically showing a buried waveguide having a transition into a surface waveguide.

Figure 1Q:
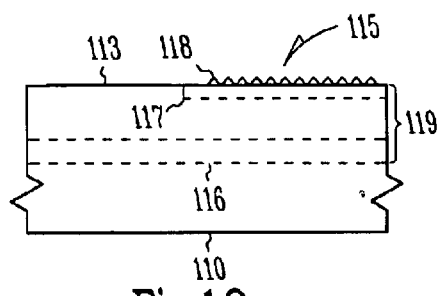

FIG. 1Q shows an enlarged lengthwise cross section view of a waveguide device 107 schematically showing a buried waveguide portion 116 having an evanescent coupling transition 119 to a surface waveguide portion 117. In some embodiments, a grating 118 is formed directly on surface waveguide portion 117. In some embodiments, as shown, surface waveguide portion 117 is formed directly over buried waveguide portion 116, for example by depositing ions (such as silver) for waveguide portion 116, then burying that waveguide portion using field-assisted diffusion, then depositing additional ions (such as silver) for surface waveguide portion 117 directly over the buried waveguide portion 116. In other embodiments, as shown above for FIG. 1H, the surface waveguide portion is deposited slightly to the side of the buried waveguide portion. In some embodiments, a calculated or empirically measured graph such as graph 40 of FIG. 1N is used to select a length for the evanescent coupler that will transfer the desired portion of the wavelength of interest. For example, in some embodiments, 5% or 10% of the signal is extracted and output through face 113 of device 107, using grating 118.

Figure 1R:
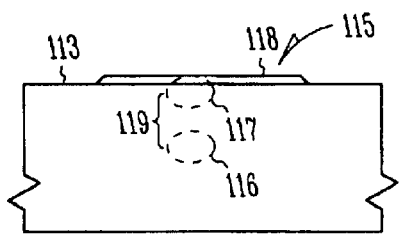

FIG. 1R shows an enlarged lengthwise cross section view of waveguide device 107 schematically showing a buried waveguide having an evanescent coupling transition to a surface waveguide.

Figure 1S:
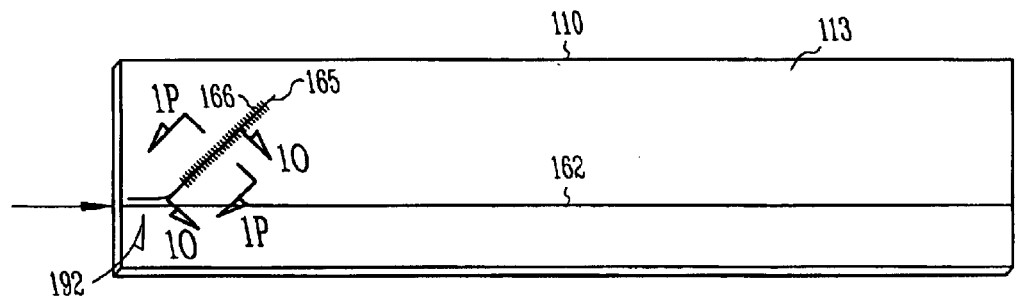

FIG. 1S shows a top isometric view of waveguide device 106 schematically showing a buried waveguide having a transition into a surface waveguide. For example, in some embodiments, 5% or 10% of the signal is extracted and output through face 113 of device 106, using grating 166.

Figure 1T:
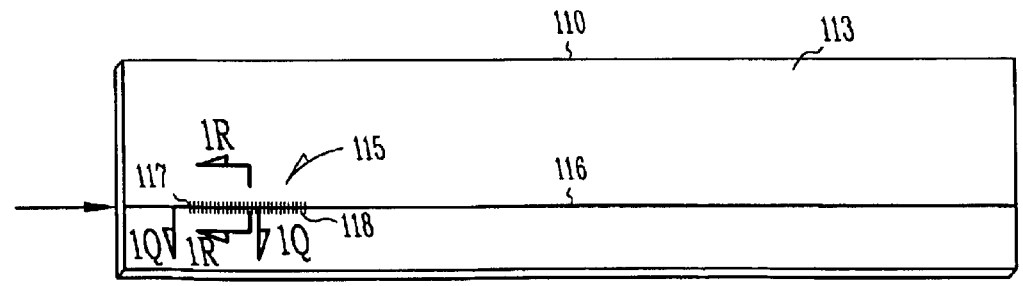

FIG. 1T shows a top isometric view of waveguide device 107 as described above for FIG. 1-O, schematically showing a buried waveguide having an evanescent coupling transition to a surface waveguide.

Figure 2A:
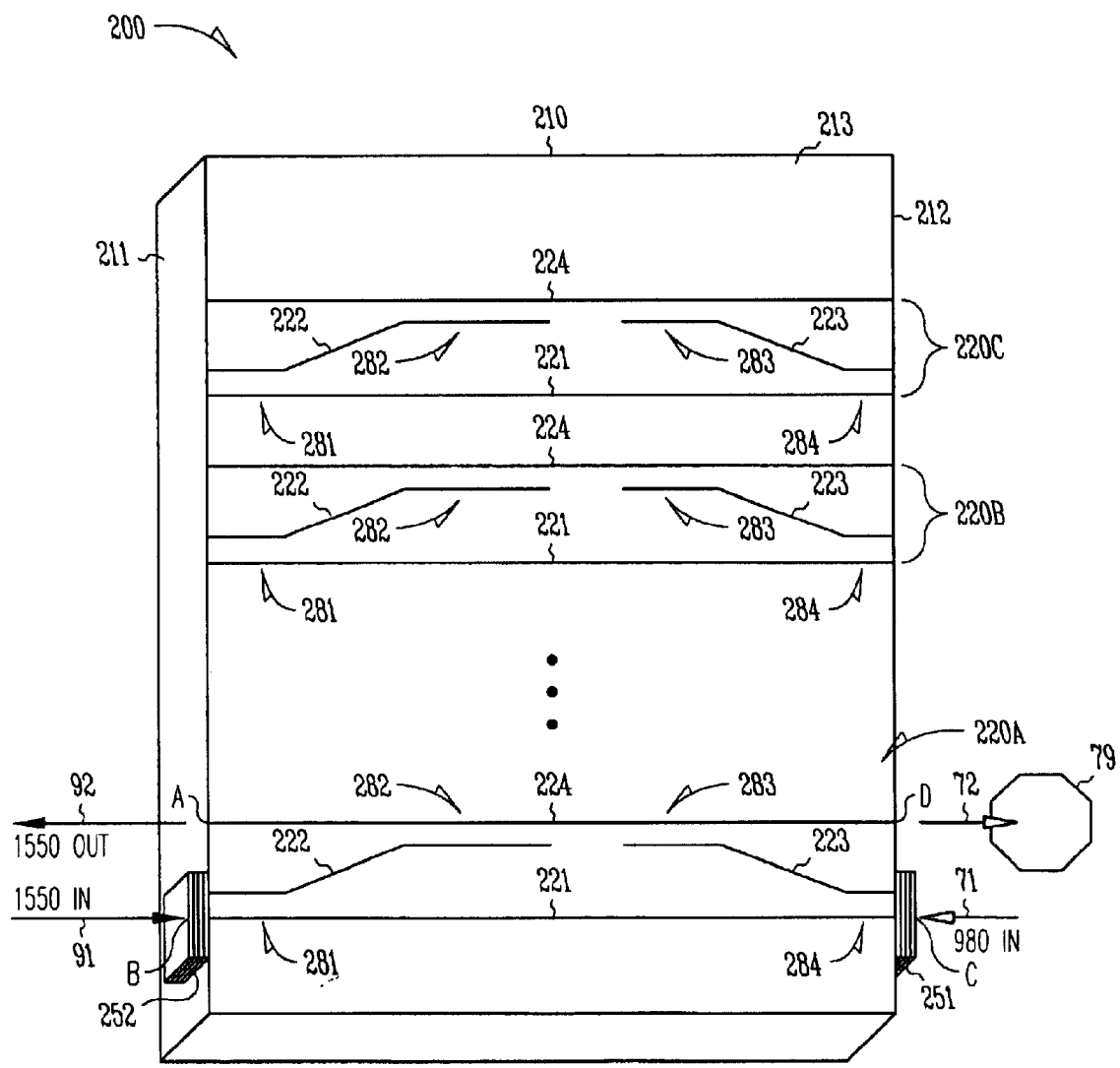
FIG. 2A shows a top isometric view of a waveguide device 200 having a plurality of subdevices 220, each having a signal waveguide segment passing signal light left to right in a first waveguide segment, a folded evanescent coupler that directionally couples the signal light to second waveguide segment that passes the signal light right to left then across an evanescent coupler and into a third waveguide segment passing the signal right to left and a pump light injection port that injects pump light traveling the opposite direction to the signal light.

FIG. 2A shows a top isometric view of a waveguide device 200 having a plurality of subdevices 220, each having a first signal waveguide segment 221 passing signal light 91, which was launched into port B, left to right in the first waveguide segment, a folded evanescent coupler 284 that directionally couples the signal light to second waveguide segment 223 that passes the signal light right to left, then across an evanescent coupler 283 and into a third waveguide segment 224 nears its right-hand end, then passing the signal right to left and out port A as amplified signal 92. Device 200 is built on substrate 210 having a first end face 211, a second end face 212, and a major surface face 213. In some embodiments, each of the waveguides is a buried waveguide, such that surface losses are minimized. A pump light injection port C injects pump light into waveguide segment 221 traveling the opposite direction to the signal light. The pump light reaches folded evanescent coupler 281 that directionally couples the signal light to fourth waveguide segment 222 that passes the signal light left to right, then across a wavelength-selective evanescent coupler 282 and into the third waveguide segment 224 nears its left-hand end, which then passes the signal left to and out port C as waste pump signal 72 into absorber 79.

In some embodiments, reflector 251 is a layered dielectric mirror that is highly reflective at about 1550 nm and highly transmissive at about 980 nm, thus reflecting the signal and transmitting the pump light 71 launched into port C through the mirror from face 212. In some embodiments, reflector 252 is a layered dielectric mirror that is highly transmissive at about 1550 nm and highly reflective at about 980 nm, thus reflecting the pump light 71 and transmitting the signal light 91 launched into port B through the mirror from face 211. As described above, each of the plurality of devices 220A through 220C, which can include any desired number of devices, can be individually used to increase production yield, or each of a plurality of the devices 220 can be simultaneously used to increase the function of the chip. In addition, some embodiments include one or more devices 220 on the same chip 210 as other(s) of the devices described herein.

In some embodiments, evanescent coupler 282 is a directional and wavelength selective evanescent coupler that transfers substantially all pump light from waveguide segment 222 into waveguide segment 224, the light traveling left to right. In some embodiments, a design graph, such as shown in FIG. 1N, is used to select a length that passes 980 nm light across the coupler, but does not transfer 1550 nm light. In some embodiments, evanescent coupler 283 is a directional and wavelength selective evanescent coupler that transfers substantially all signal light from waveguide segment 223 into waveguide segment 224, the light traveling right to left. In some embodiments, a design graph, such as shown in FIG. 1N, is used to select a length that passes 1550 nm light across the coupler, but does not transfer 980 nm light. Thus, amplified signal light 92 exiting from port A contains substantially no pump light wavelengths.

Figure 2B:
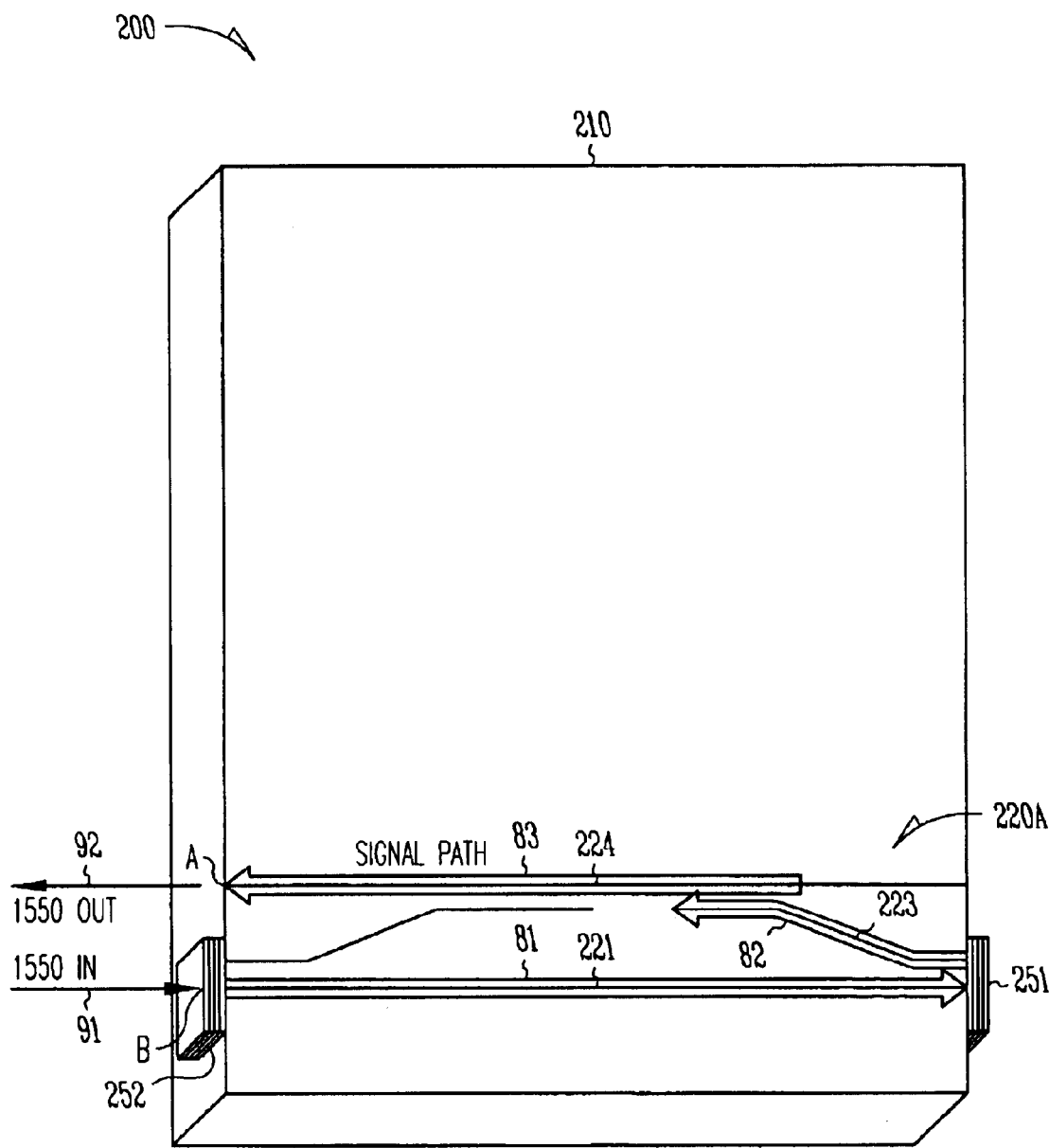
FIG. 2B shows a top isometric view of waveguide device 200 showing the signal light path passing signal light counterclockwise left to right and then right to left.

FIG. 2B shows a top isometric view of waveguide device 200 showing the signal light path 81, 82, and 83 passing signal light counterclockwise left to right along waveguide 221 and then right to left along waveguides 222 and 224. In devices having a plurality if subdevices 220, the same type of signal light path is followed for each subdevice.

Figure 2C:
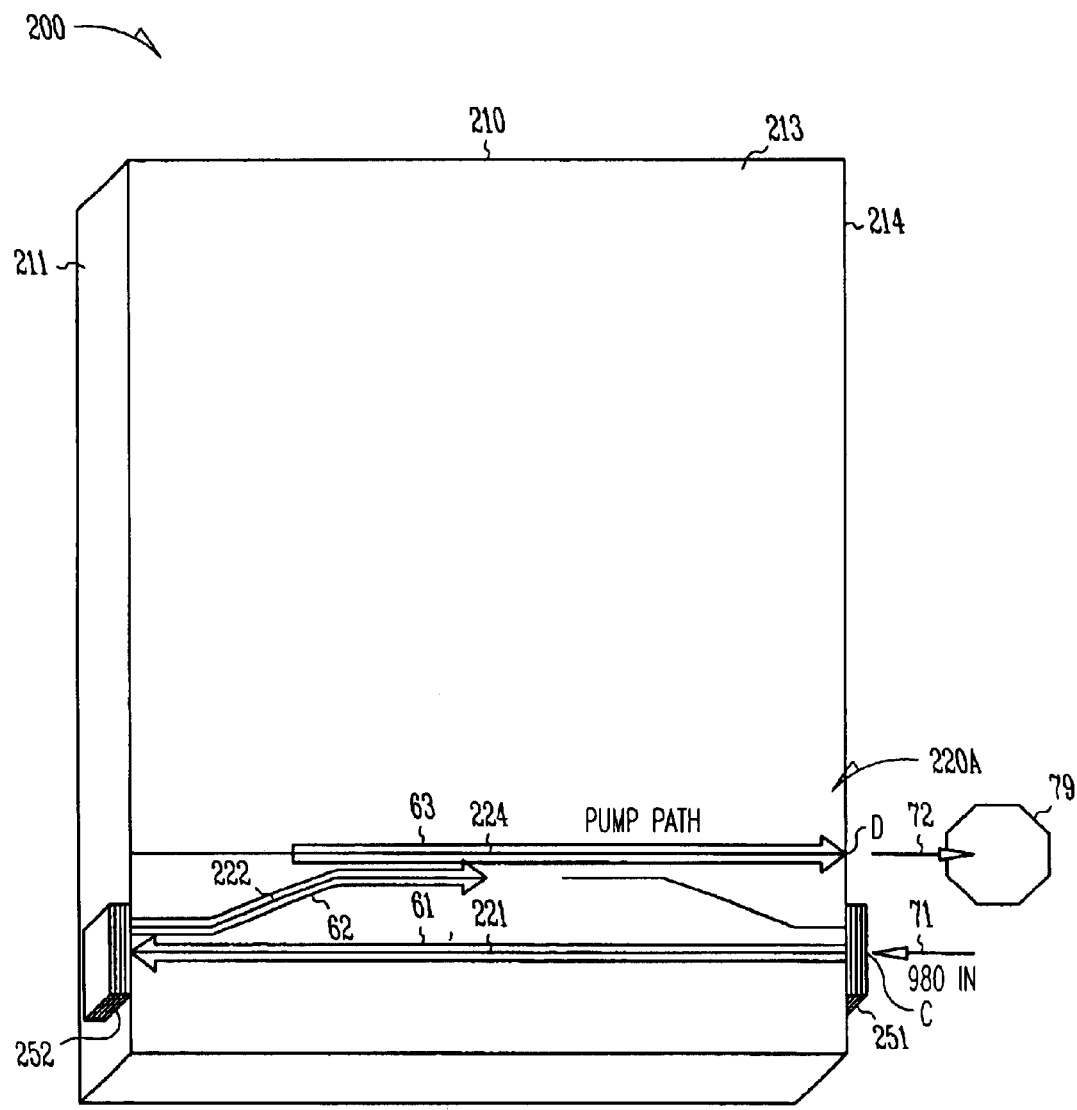
FIG. 2C shows a top isometric view of waveguide device 200 showing the pump light path passing pump light clockwise right to left and the left to right.

FIG. 2C shows a top isometric view of waveguide device 200 showing the pump light path 61, 62, and 63 passing pump light clockwise right to left in waveguide segment 221 along its full length and in the opposite direction as the signal light, and then left to right in waveguide segments 222 and 224 along nearly the full length of segment 224 and in the opposite direction as the signal light. Waste pump light can be terminated on chip, or in other embodiments, can be routed out port D to an off-chip absorber 79 as shown, to reduce on-chip noise and/or heat.

Figure 3A:
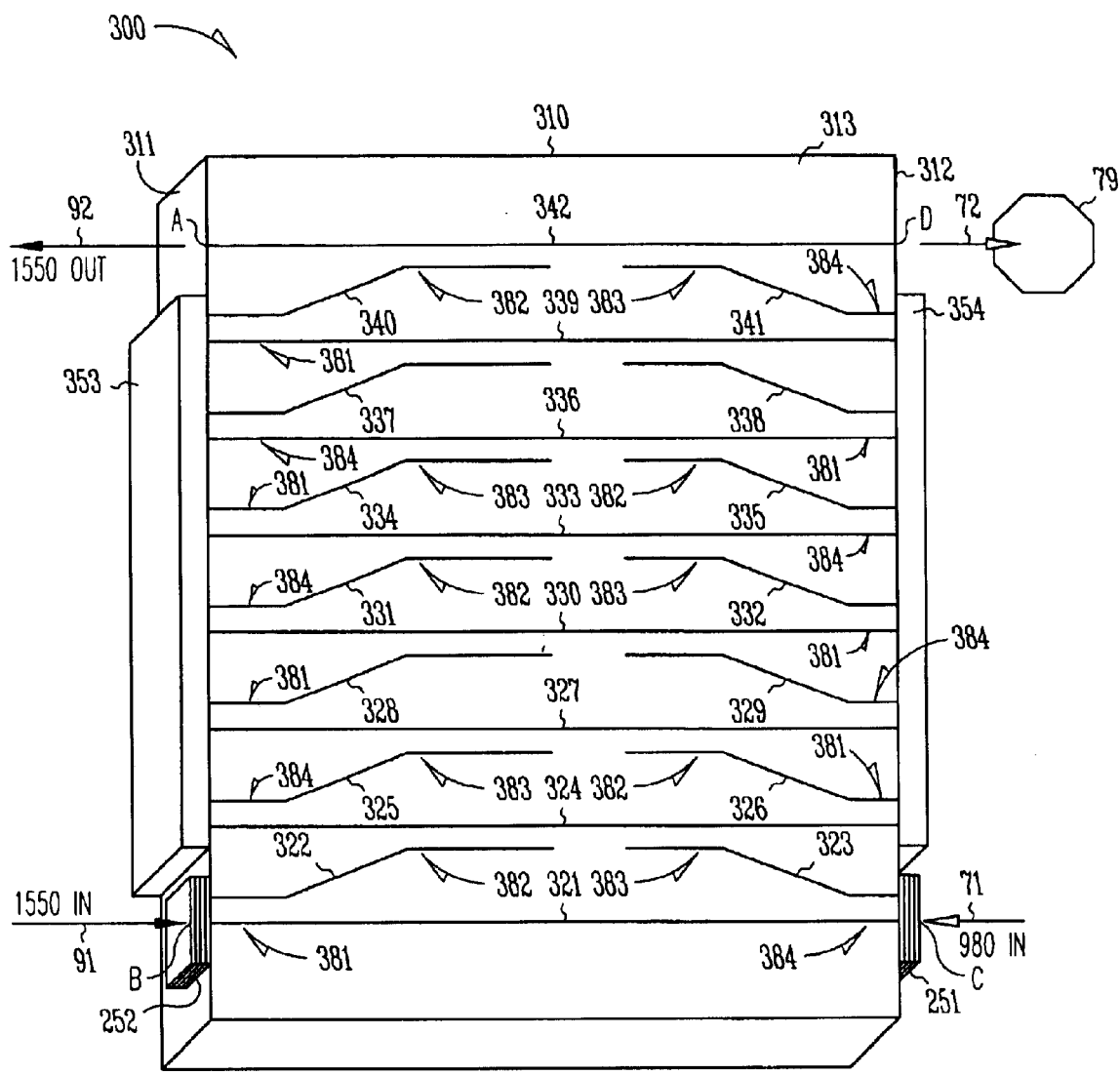
FIG. 3A shows a top isometric view of a waveguide device 300 having a signal waveguide segment passing signal light left to right in a first waveguide segment, a folded evanescent coupler that directionally couples the signal light to second waveguide segment that passes the signal light right to left then across an evanescent coupler and into a third waveguide segment passing the signal right to left, repeating in a ladder configuration, and a pump light injection port that injects pump light traveling up the ladder in the opposite direction to the signal light.

FIG. 3A shows a top isometric view of a waveguide device 300 passing signal light left to right in a first waveguide segment 321, a folded evanescent coupler 384 that directionally couples the signal light to second waveguide segment 323 that passes the signal light right to left then across an evanescent coupler 383 and into a third waveguide segment 324 passing the signal right to left, repeating in a ladder configuration. Note that each of the folded evanescent couplers 384, used for the signal light path and designed to reflect and transfer substantially light of the signal wavelength, are on alternating ends of the chip 310, in order that the signal light is passed up the ladder using a plurality of over-and-back crossings. Thus folded evanescent couplers 384 are on the odd-numbered (counted from the bottom) rungs on the right-hand edge of the chip 310, and on the even-numbered rungs on the left edge. Similarly, folded evanescent couplers 381 are alternated on alternating edges of chip 310. The waveguide segments numbered 321 through 342 thus form a ladder providing multiple double-crosses for both the pump light and the signal light, while keeping each separated by snaking them up the ladder in opposite directions. Reflectors 251 and 252 are as described in FIG. 2A, but mirrors 353 and 354 are, in some embodiments, designed to reflect both 980 nm light and 1550 nm light.

Figure 3B:
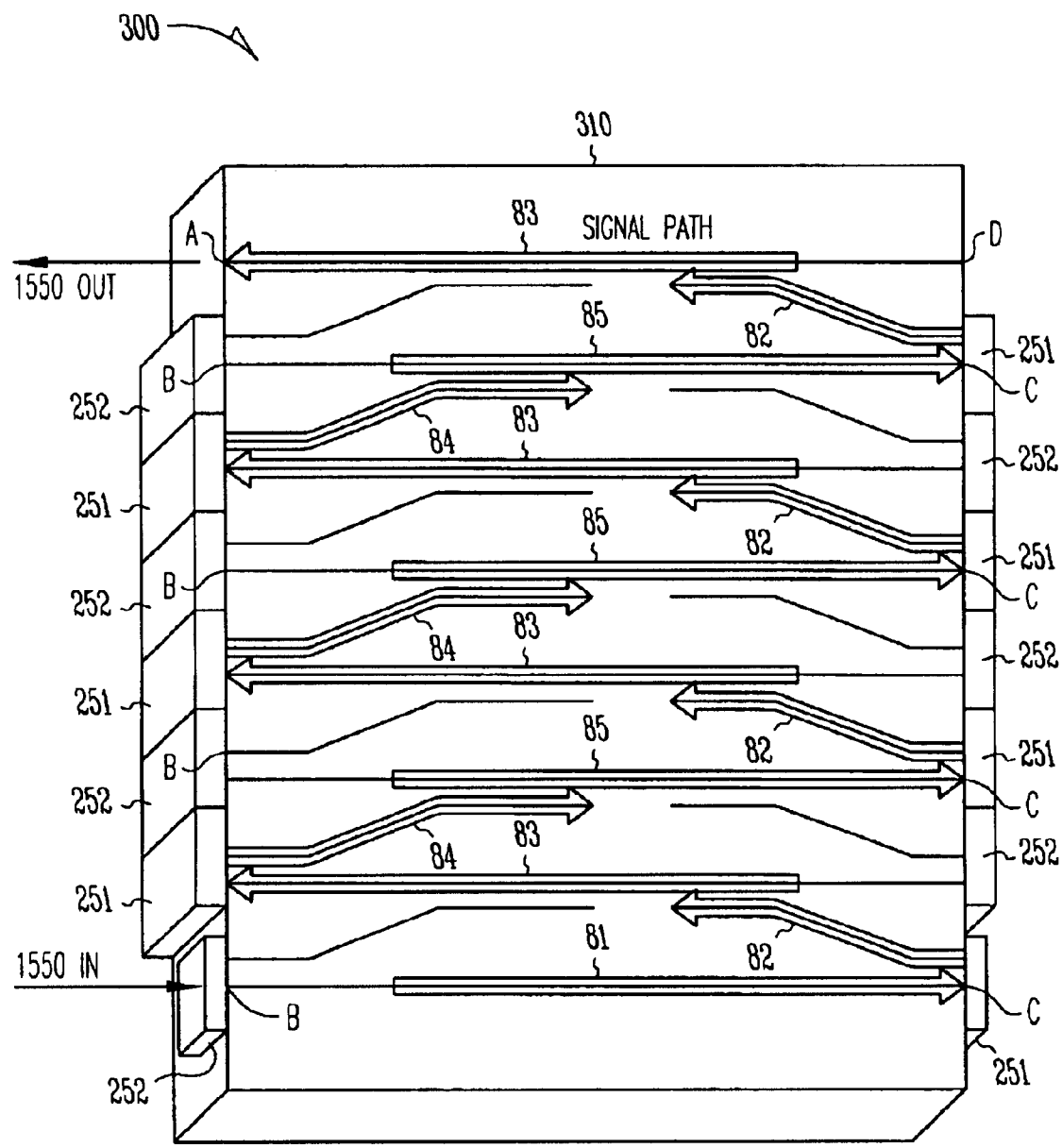
FIG. 3B shows a top isometric view of waveguide device 300 showing the signal light path passing signal light snaking up the ladder starting counterclockwise left to right and then right to left.

In other embodiments as shown in FIG. 3B, but otherwise the same as FIG. 3A, the signal light 91 can be injected into any of a plurality of Ports B each of which is transparent to signal light and reflective of pump light, with the pump light launched into one of the opposing ports C each of which is transparent to pump light and reflective of signal light. Totally reflecting mirrors 353 and 354 are removed, and instead replaced using mirrors 251 and 252 that are placed on each alternating edge of the pump path and the signal path, such that a mirror 251 is placed to cap each evanescent coupler 384, and a mirror 252 is placed to cap each evanescent coupler 381. As in FIG. 3B, a plurality of pump light injection ports C are provided to inject pump light 71 traveling up the ladder in the opposite direction to the signal light 91.

FIG. 3B shows a top isometric view of waveguide device 300 showing the signal light path 81, plus a repeating series of paths 82, 83, 84, and 85, passing signal light 91 snaking up the ladder starting counterclockwise left to right and then right to left. The substrate 310 is doped (e.g., with Er and Yb) to provide amplification of the signal, which is output from port A. The signal path in FIG. 3B and pump path of FIG. 3C are the same whether or not the mirrors 353 and 354 of FIG. 3A are used instead of the upper ones of mirrors 251 and 252 of FIG. 3B.

Figure 3C:
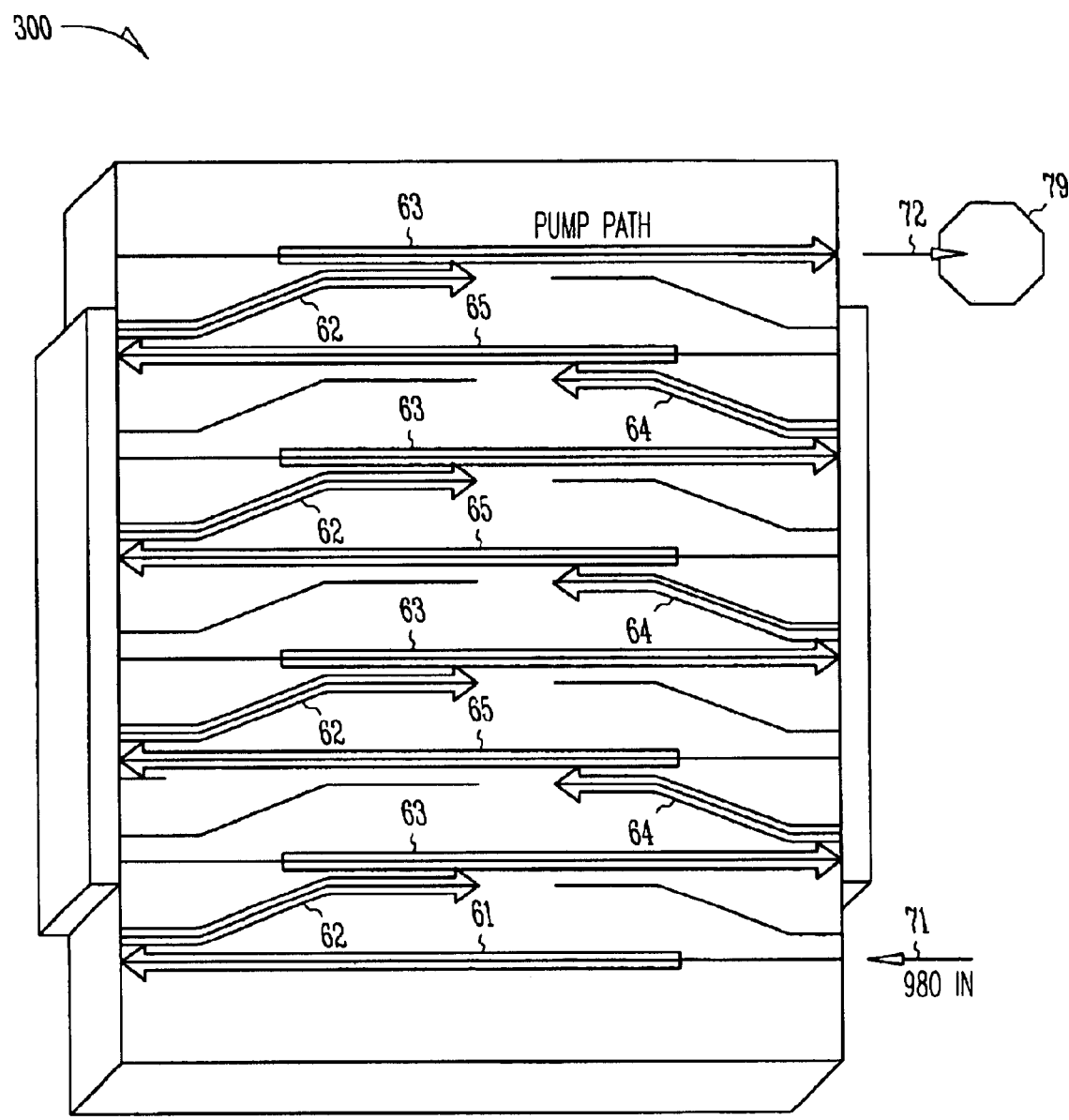
FIG. 3C shows a top isometric view of waveguide device 300 showing the pump light path passing pump light snaking up the ladder starting clockwise right to left and the left to right.

FIG. 3C shows a top isometric view of waveguide device 300 showing the pump light path passing pump light snaking up the ladder starting clockwise right to left and then left to right.

Figure 4A:
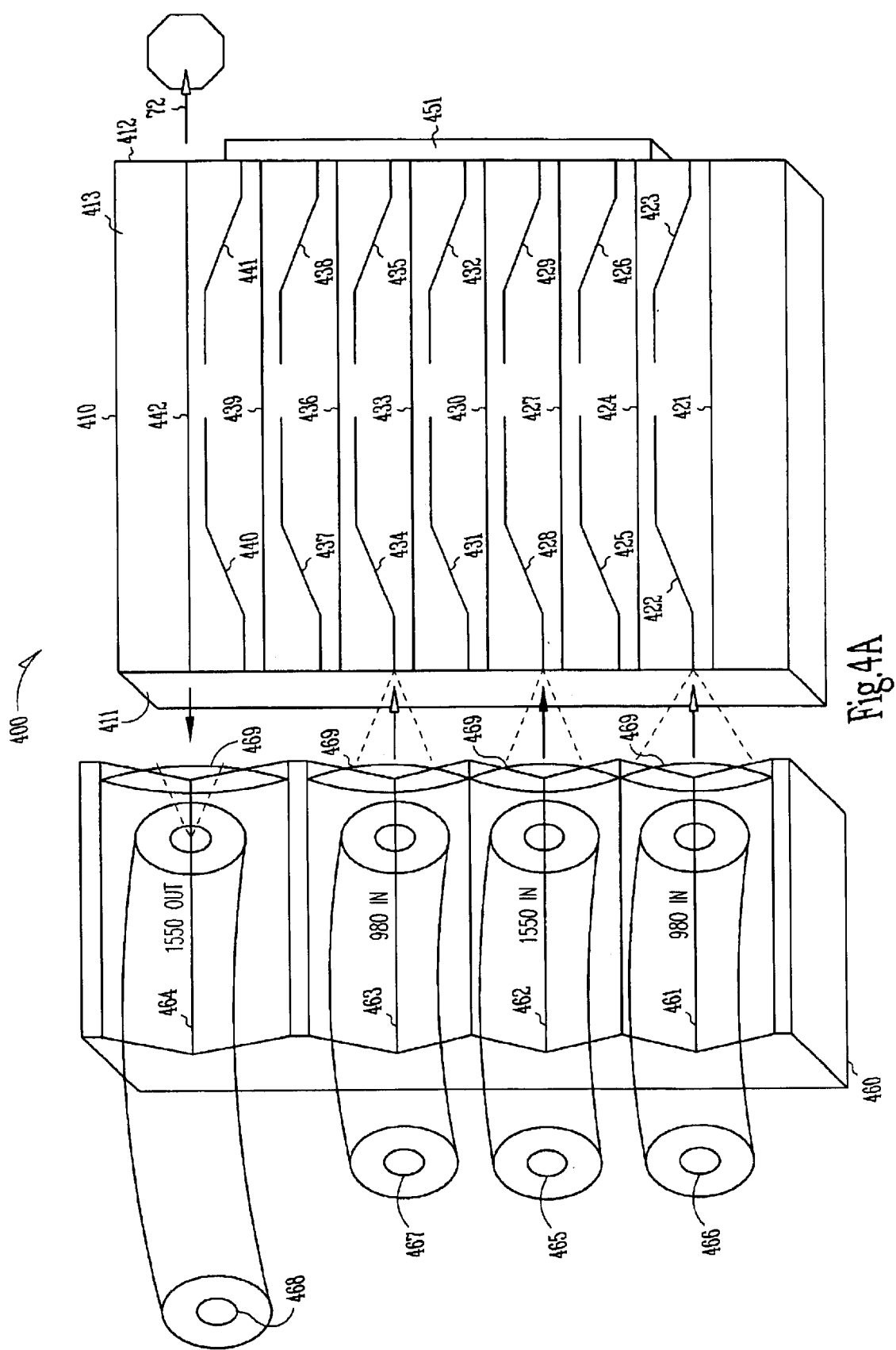
FIG. 4A shows a top isometric view of a waveguide device 400 having waveguide configuration identical to device 300 of FIG. 3A, but having an external configuration that enables optical fiber connections all interfaced to a single face of the substrate.

FIG. 4A shows a top isometric view of a waveguide device 400 having waveguide configuration identical to device 300 of FIG. 3B, but having an external configuration that enables optical fiber connections all interfaced to a single face 411 of the substrate 410. Wavelength-selective mirrors 252 and 251 are alternated up the left-hand edge of face 411 as shown in FIG. 3B. A totally reflecting mirror 451 or other reflector is used on the right-hand edge 412. In other embodiments, alternating wavelength-selective reflectors 251 and 251 are used, as shown in FIG. 3B. The operation on chip 410 of FIGS. 4A–4C is substantially the same as for FIGS. 3A–3C.

However, in this embodiment, a fiber alignment block 460 is provided. Block 460 includes a plurality of grooves 461–464, and a plurality of optical fibers 465–468, each fiber affixed to a corresponding groove. The grooves have a spacing that matches the corresponding spacing of waveguides 412, 424, 427, 430, 433, 436, 439 and/or 442 such that a single alignment operation simultaneously aligns all fibers the their corresponding waveguide. In some embodiments, a lens 469 is provided for each groove or fiber. Each lens 469 focuses the light from its fiber into or out of the corresponding waveguide.

Figure 4B:
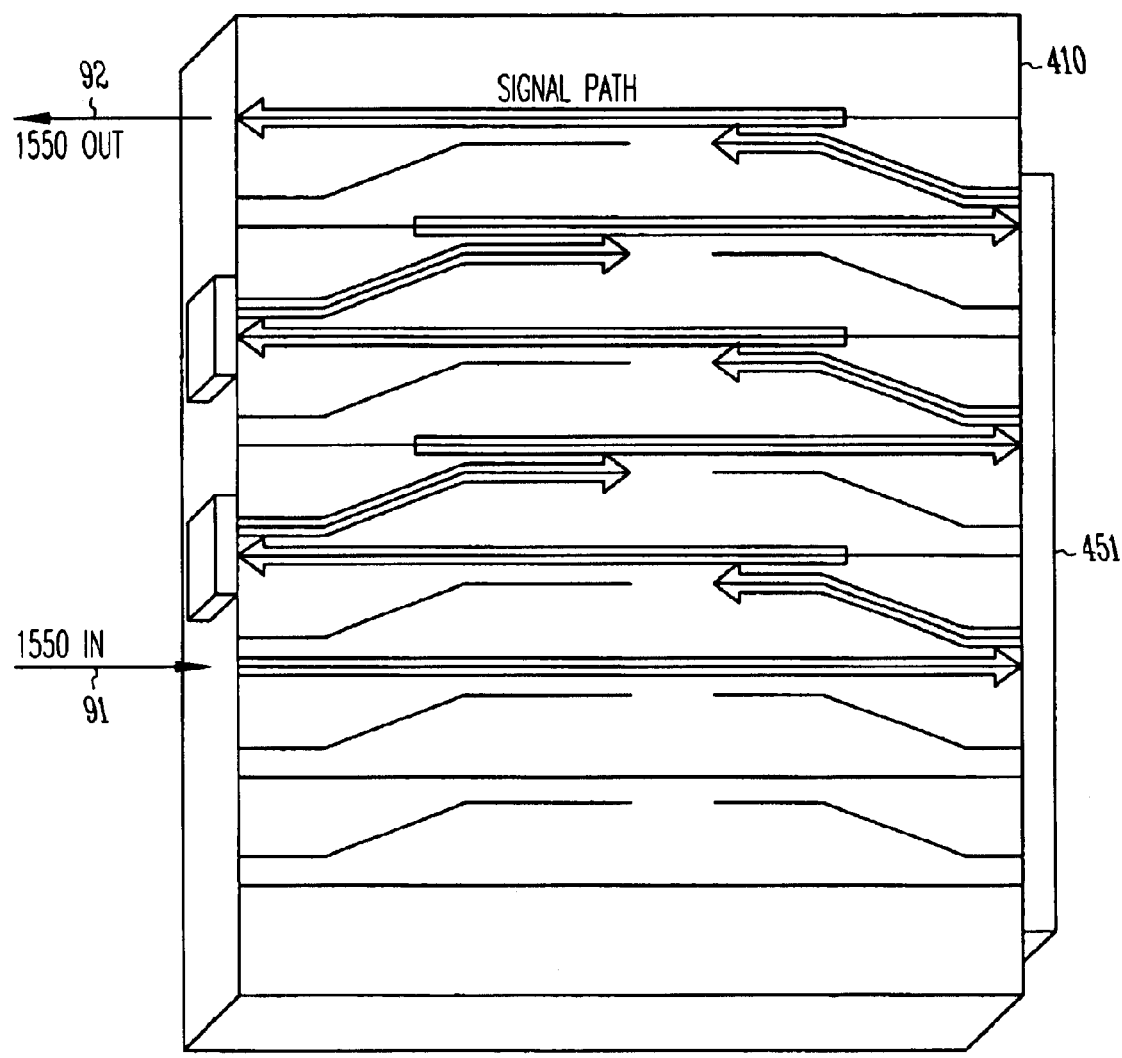
FIG. 4B shows a top isometric view of waveguide device 400 showing the signal light path passing signal light snaking up the ladder starting counterclockwise left to right and then right to left starting on an even ladder rung.

FIG. 4B shows a top isometric view of waveguide device 400 showing the signal light path passing signal light snaking up the ladder starting counterclockwise left to right and then right to left starting on an even ladder rung.

Figure 4C:
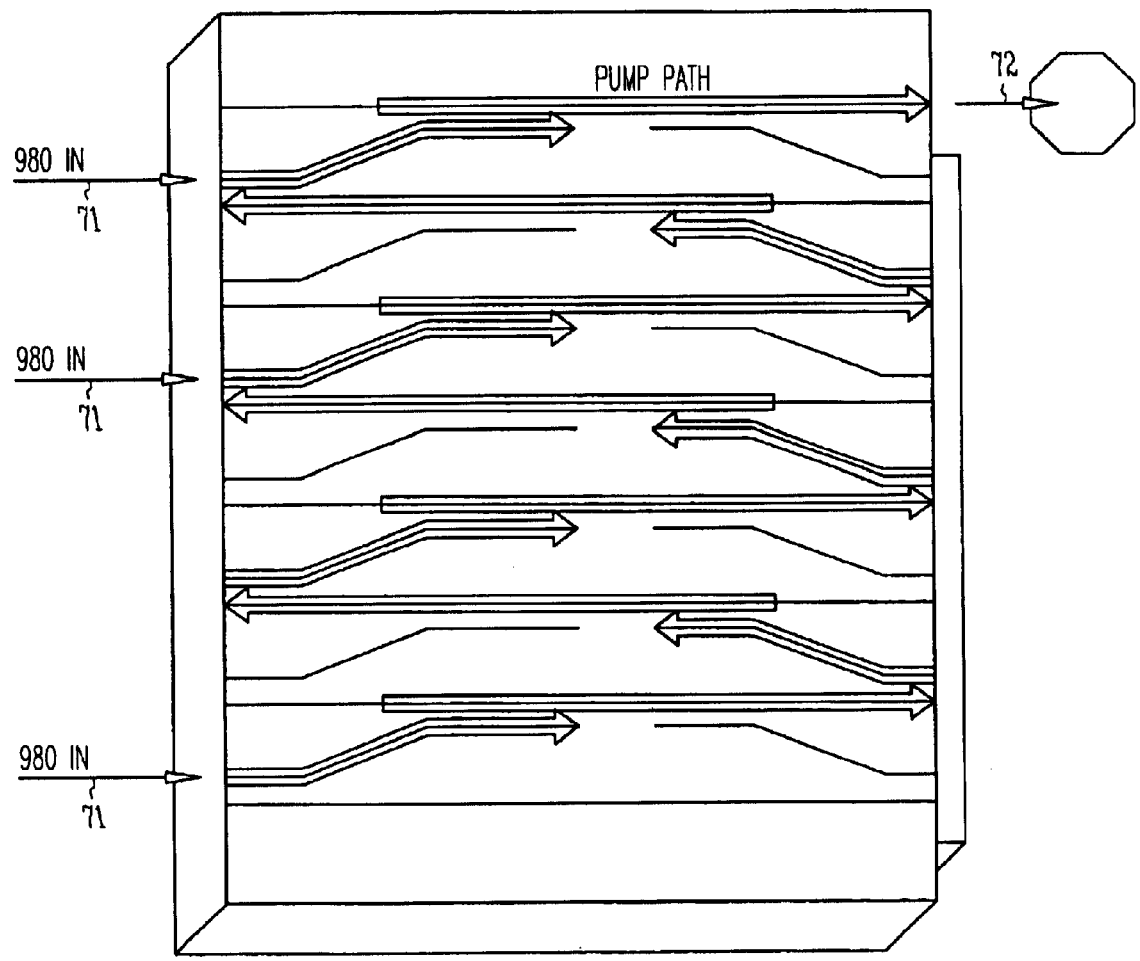
FIG. 4C shows a top isometric view of waveguide device 400 showing the pump light path passing pump light snaking up the ladder starting counterclockwise left to right and then right to left starting on an odd ladder rung.

FIG. 4C shows a top isometric view of waveguide device 400 showing the pump light path passing pump light snaking up the ladder starting counterclockwise left to right and then right to left starting on an odd ladder rung. In some embodiments, as shown, pump light 71 is injected into a plurality of waveguides (using fibers and grooves not shown) either above and/or below the signal injection point.

Figure 5A:
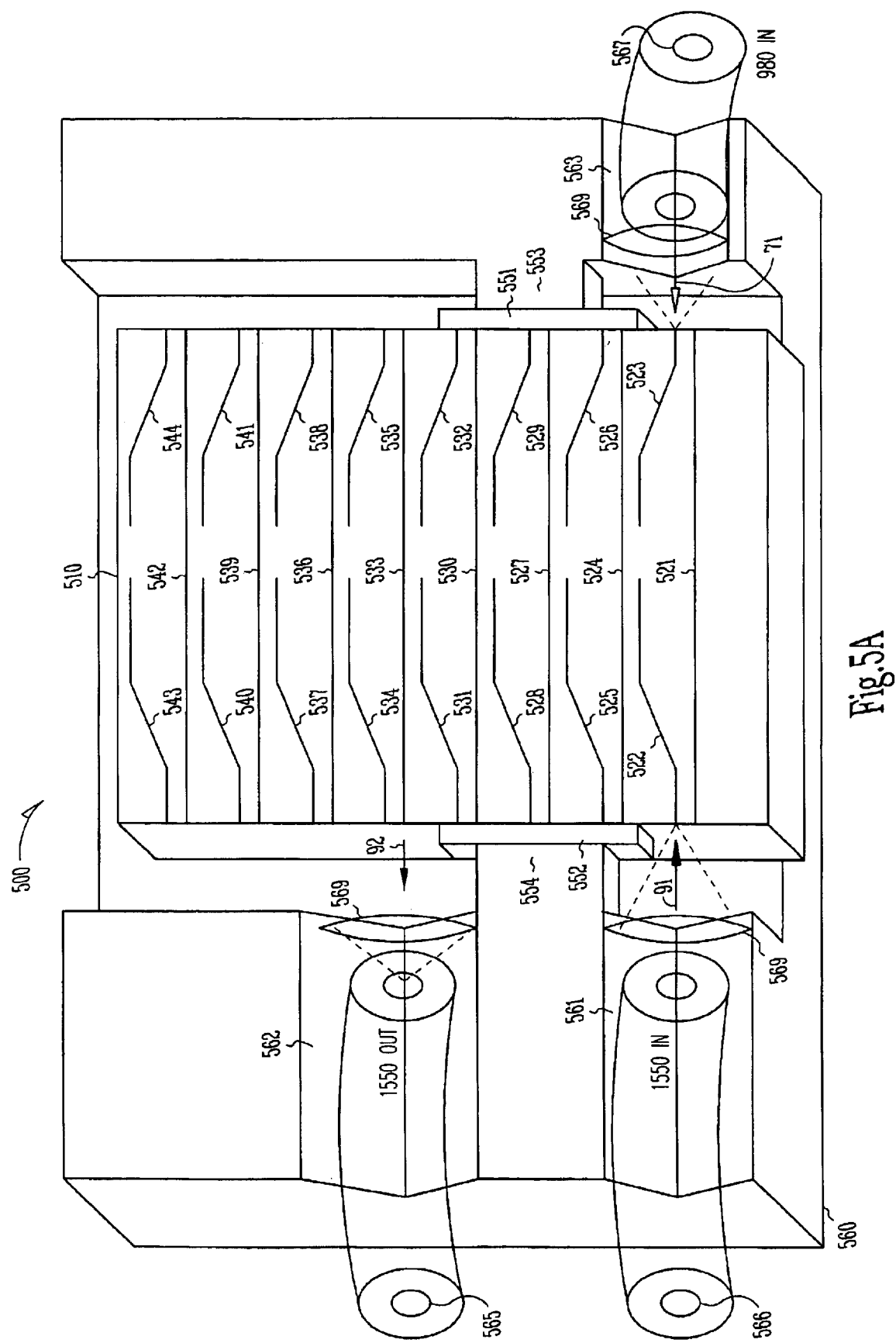
FIG. 5A shows a top isometric view of a waveguide device 500 having waveguide configuration identical to device 300 of FIG. 3A, but having an external configuration that enables optical fiber connections all interfaced to a single face of the substrate.

FIG. 5A shows a top isometric view of a waveguide device 500 having waveguide configuration identical to device 300 of FIG. 3A, but having an external configuration that enables optical fiber connections all interfaced to two different faces of the substrate 510. This configuration is substantially similar on the chip 510, however, mirrors 551 and 552 are affixed to alignment block 560 using respective projections 553 and 554 (and, in some embodiments, mirrors 252 and 251 (not shown here, but located as shown in FIG. 3A) are also affixed to block 560). This allows alignment of the external components such as fibers 565, 566, and 567 to any of a plurality of connection points, to increase yield of usable chips. Otherwise, this device operates similarly to previously discussed devices.

Figure 5B:
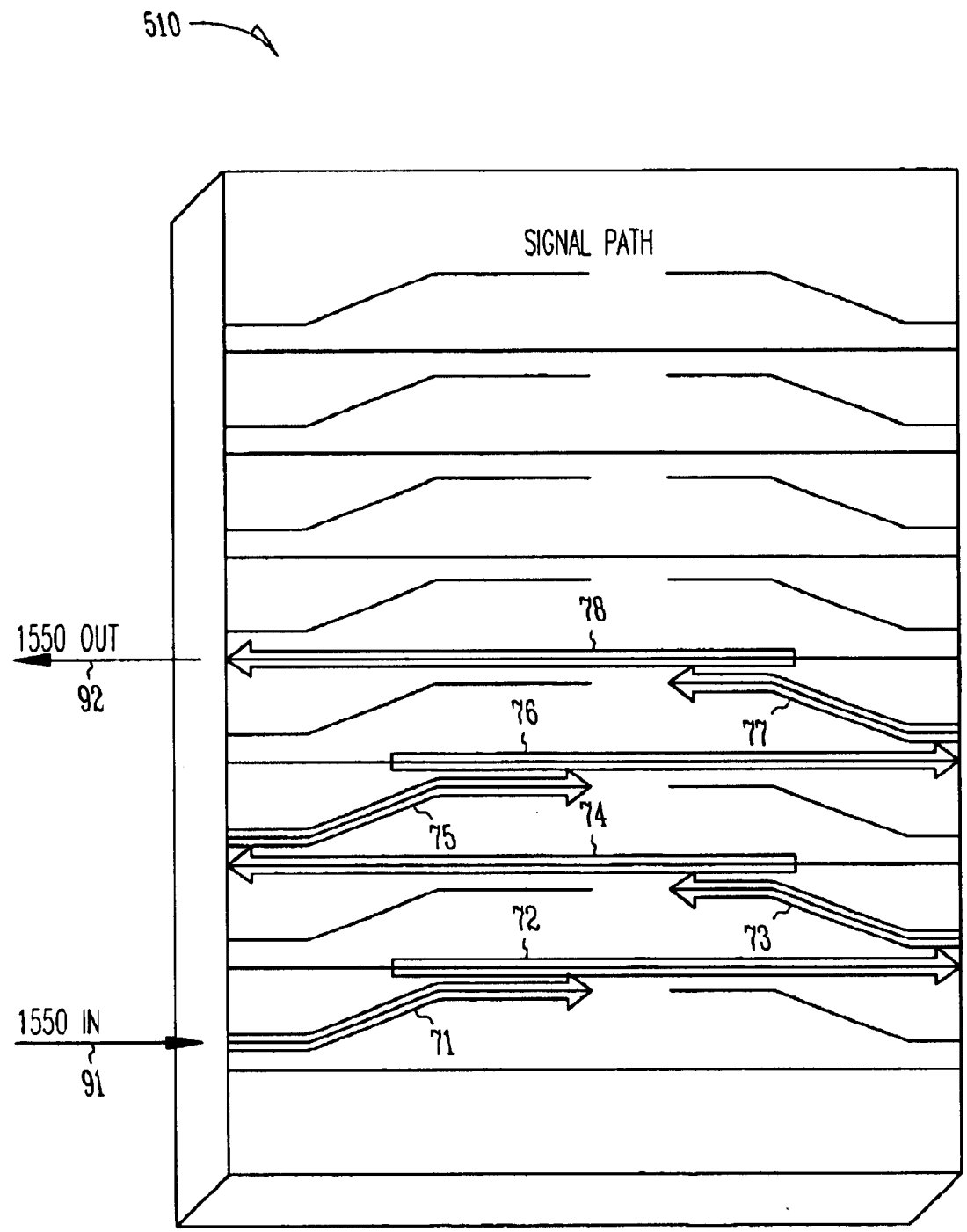
FIG. 5B shows a top isometric view of waveguide device 500 showing the signal light path passing signal light snaking up the ladder starting counterclockwise left to right and then right to left starting on an even ladder rung.

FIG. 5B shows a top isometric view of waveguide device 500 showing the signal light path passing signal light snaking up the ladder starting counterclockwise left to right and then right to left starting on an even ladder rung.

Figure 5C:
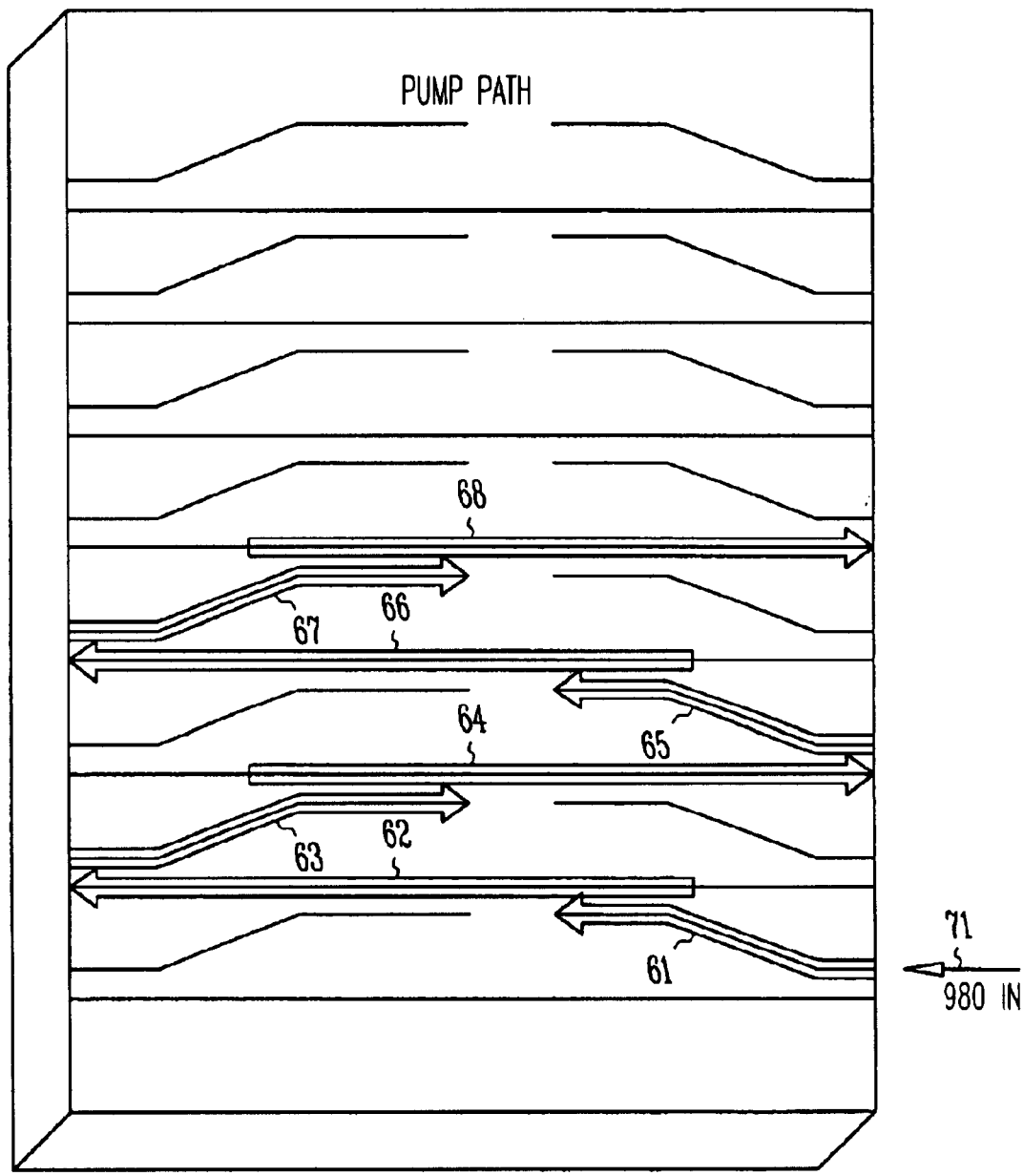
FIG. 5C shows a top isometric view of waveguide device 500 showing the pump light path passing pump light snaking up the ladder starting clockwise right to left and the left to right starting on an even ladder rung.

FIG. 5C shows a top isometric view of waveguide device 500 showing the pump light path passing pump light snaking up the ladder starting clockwise right to left and the left to right starting on an even ladder rung.

FIG. 6A shows a top isometric view of a waveguide device 600 having waveguide configuration repeating the configuration of device 104 of FIG. 1J to form a ladder. Signal input fiber 666 attached to groove 661 send light through lens 669 into port B, and into waveguide segment 621. A small portion is extracted by partially transmitting direction waveguide 681 into waveguide segment 631, which ends in an output port at surface 613, that emits the extracted input signal. Similarly, waveguide segment 633 has a wavelength-selective evanescent coupler 684 that passes a small portion of the pump input light, but substantially no signal light. Likewise, waveguide segment 635 has a wavelength-selective evanescent coupler 685 that passes a small portion of the pump input light, but substantially no signal light. Two pump ports E are provided.

Waveguide segment 631, in some embodiments, is a buried waveguide at evanescent coupler 681, and transitions to a surface waveguide under grating 632. In some embodiments, silver ions are diffused into the surface 613 for all waveguides shown, through a first mask. Then a second mask is placed to caver waveguide segments 613, 635, and 633 for only their respective portions that will lie under the gratings. Then a field-assisted diffusion operation as described above is used to drive the remaining exposed waveguide segments into a buried configuration, while the portions that will be adjacent to the gratings remain at the surface due to the additional mask. The surface portions then interact with the grating on the surface, while the buried portions have little or no interaction with the surface, thus reducing loss of signal and pump light.

Figure 6B:
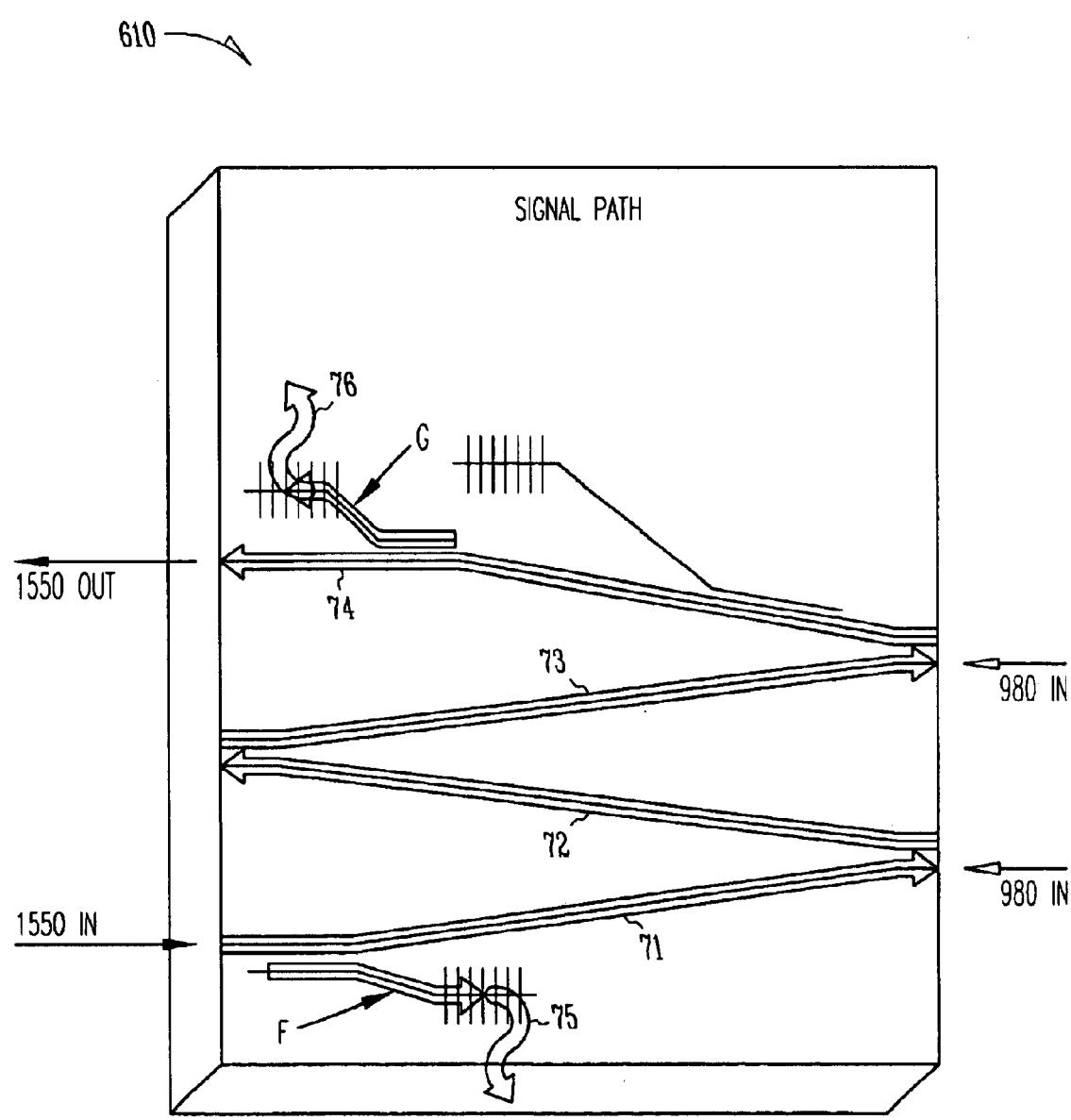
FIG. 6B shows a top isometric view of waveguide device 600 showing the signal light path passing signal light snaking up the ladder starting counterclockwise left to right and then right to left starting on an even ladder rung.

FIG. 6B shows a top isometric view of waveguide device 600 showing the signal light path 71, 72, 73, 74 passing signal light snaking up the ladder starting counterclockwise left to right and then right to left starting at the lower left. Port F taps the input waveguide segment 621 to output a portion of its light through exit path 75. Port G taps the output waveguide segment 624 to output a portion of its light through exit path 76.

Figure 6C:
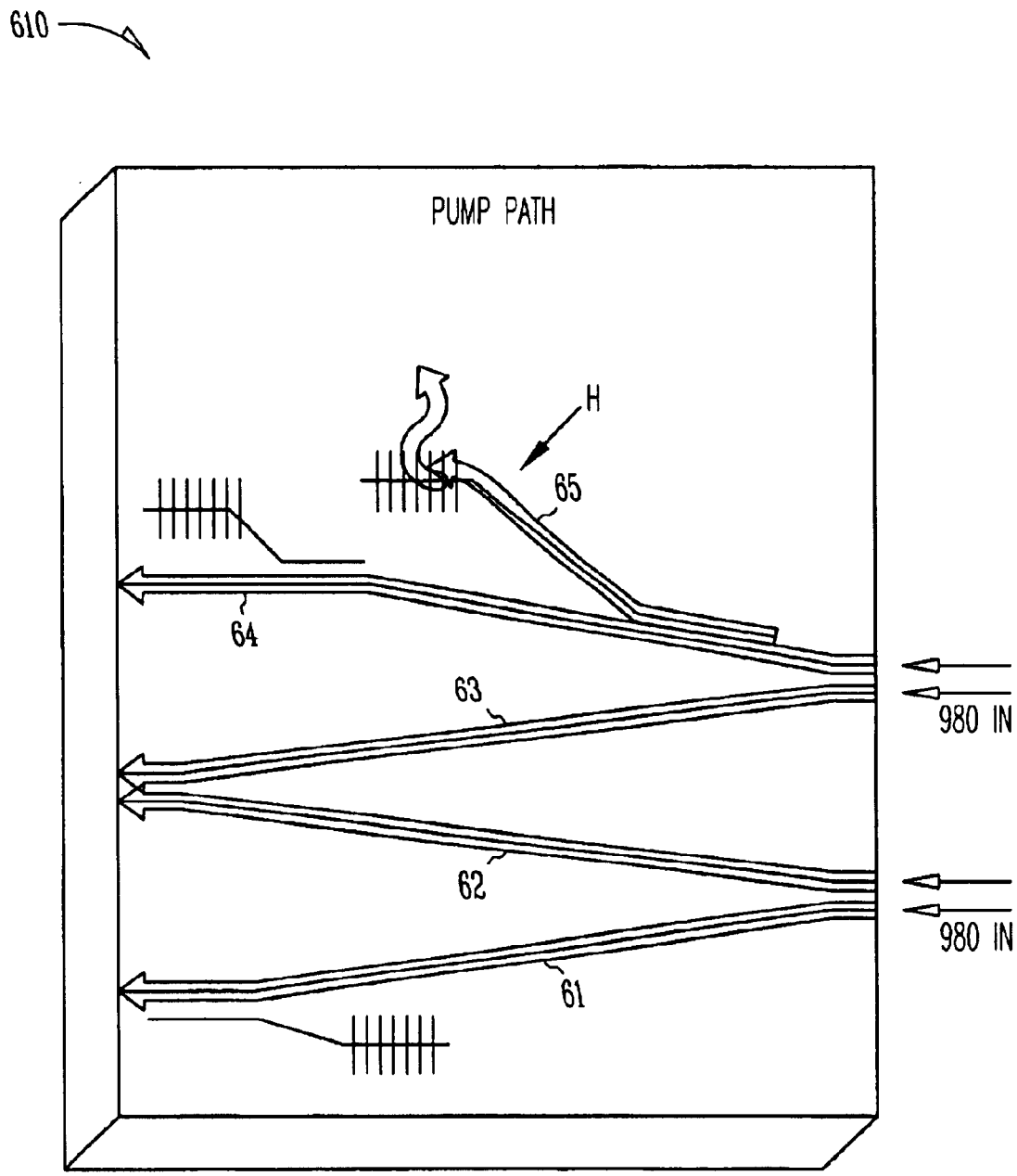
FIG. 6C shows a top isometric view of waveguide device 600 showing the pump light path injection pump light into all major signal waveguides, the pump light passing right to left.

FIG. 6C shows a top isometric view of waveguide device 600 showing the pump light path injection pump light into all major signal waveguides, the pump light passing right to left in all waveguide segments 621–624 and 633. Port H taps the input pump light in waveguide segment 624 to output a portion of its light through exit path 65.

Figure 7A:
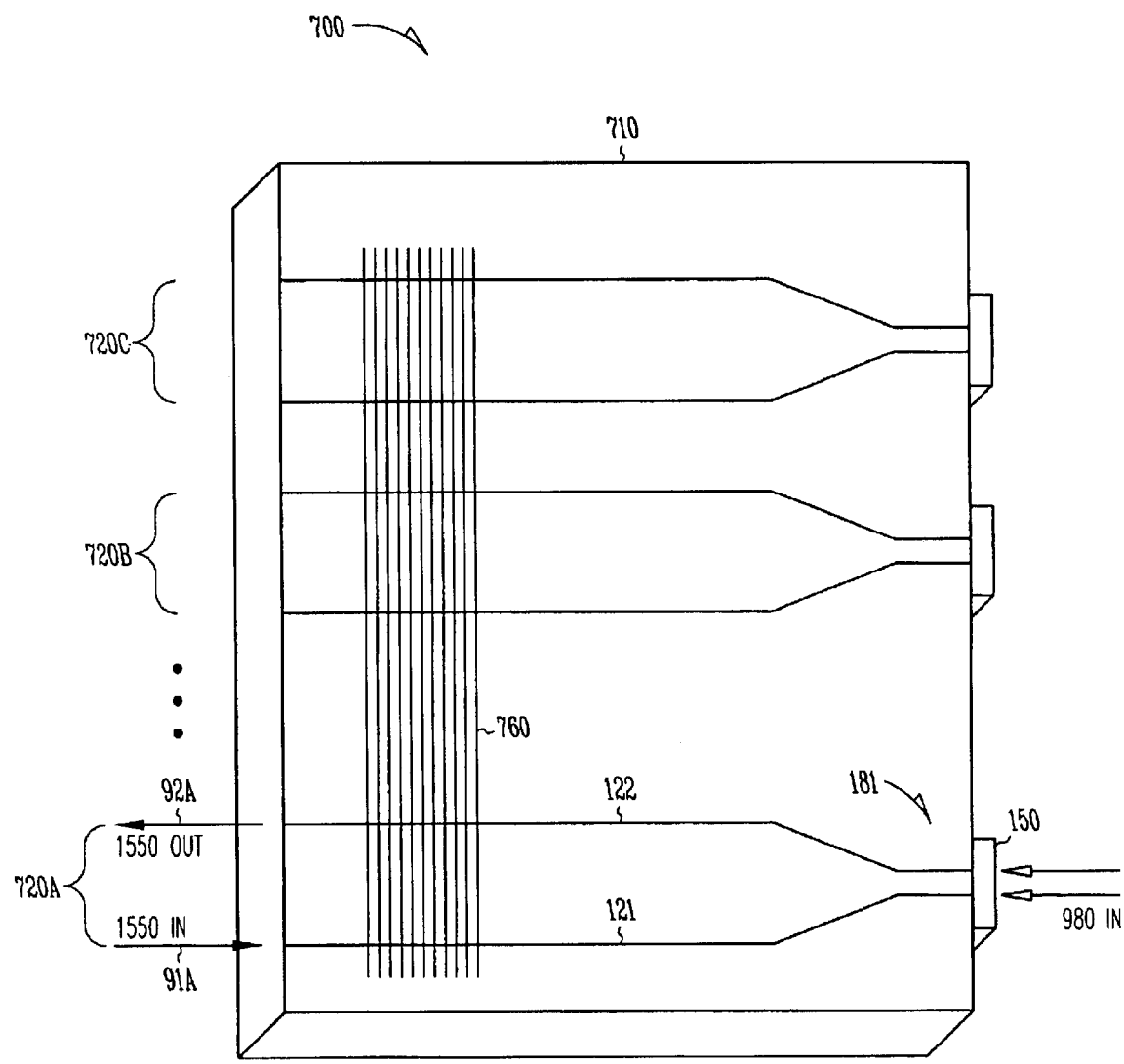
FIG. 7A shows a top isometric view of a waveguide amplifier device 700 having a plurality of subdevices 720, each similar to subdevices 120 of FIG. 1K, but also having a grating 760 configured to adjust the amplification characteristics.

FIG. 7A shows a top isometric view of a waveguide amplifier device 700 having a plurality of subdevices 720, each similar to subdevices 120 of FIG. 1K, but also having a grating 760 configured to adjust the amplification characteristics. In some embodiments, grating 760 is a gain-flattening grating having a transfer function that compensates for the gain curve of the amplifying waveguides, in order to provide a flat gain over a range of wavelengths, e.g., about 1530 nm to 1550 nm, or 1520 nm to 1560 nm, or other ranges. In other embodiments, a sharp narrow-bandwidth pass function for filter grating 760 is used to selectively amplify only a single wavelength from among many that may be in input signal 91A. In yet other embodiments, a sharp narrow-bandwidth blocking function for filter grating 760 is used to selectively amplify all but a single wavelength from among many that may be in input signal 91A (a drop function).

Figure 7B:
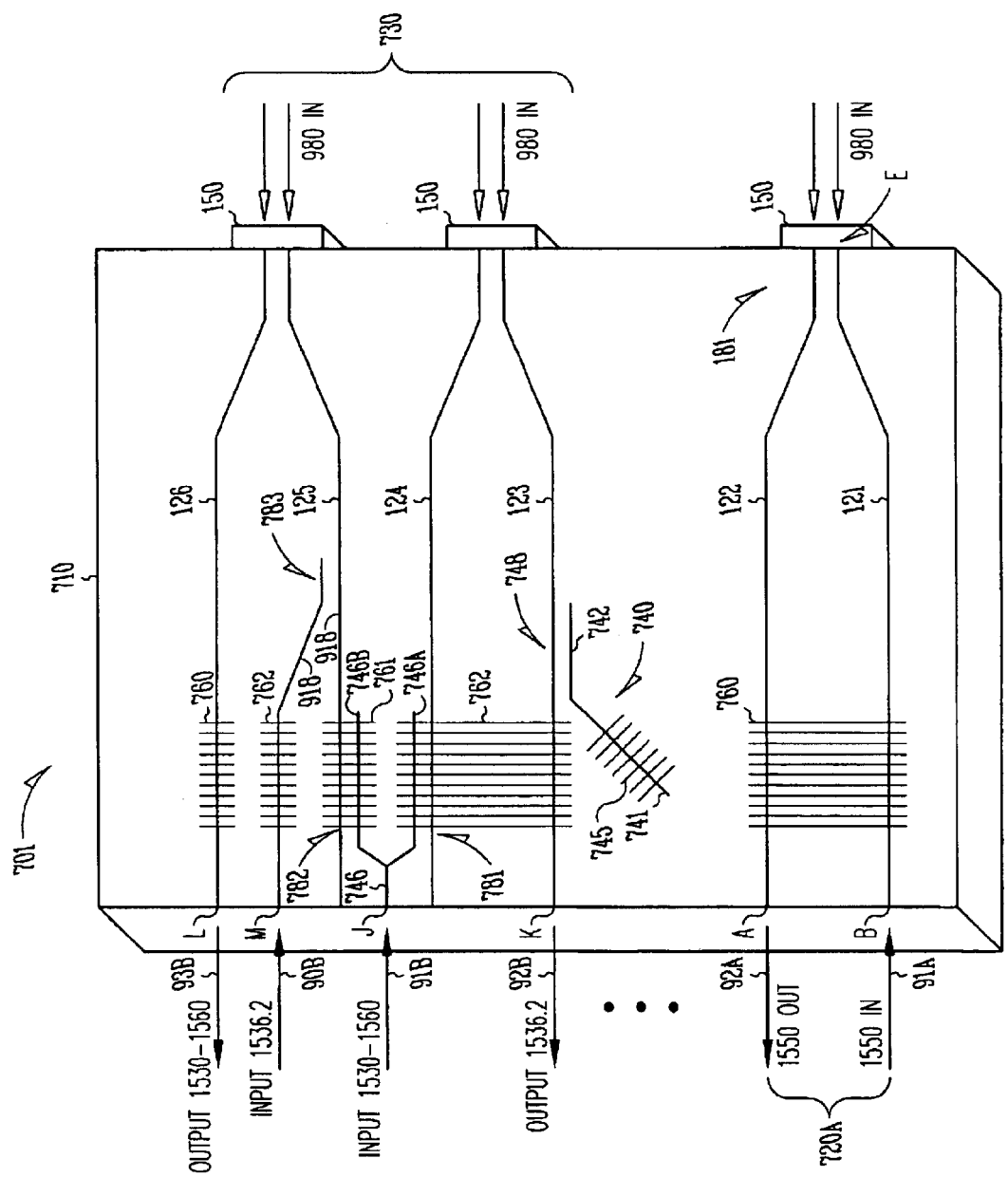
FIG. 7B shows a top isometric view of a waveguide amplifier device 701 having a plurality of subdevices 720A and 730.

FIG. 7B shows a top isometric view of a waveguide amplifier device 701 having one or more of subdevices 720 and or combined subdevices 730, each similar to subdevices 120 of FIG. 1K, but also having different gratings 760, 761, and 762 each configured differently to adjust the amplification characteristics to form: an add-drop device. Signal input 91B, e.g., a plurality of wavelengths between 1530 nm and 1560 nm is input through port J and split in two, a portion (e.g., half each) routed to evanescent coupler 781 and 782. Grating 761 and evanescent coupler 782 act together to form a sharp narrow-bandwidth blocking function for filter grating 760 is used to selectively couple all but a single wavelength from among many that may be in input signal 91B (a drop function) into waveguide segment 125. Input 90B obtain through port M is filtered by grating 762 and then coupled through evanescent coupler 783 to add a different signal having the same wavelength as that removed by grating filter 761 just described (and add function). This forms an add-drop device. Waveguide segments 125 and 126 amplify this combined signal 93B which is output through port L. Grating 760 on waveguide segment 126 is a broad-band gain-flattening grating, as is grating 760 across waveguide segment 121 and 122 of subdevice 720A.

In contrast, grating 762 and evanescent coupler 781 act together to form selectively amplify only a single wavelength from among many that may be in input signal 91B, this wavelength coupled to waveguide segment 124. Waveguide segments 123 and 124, and gratings 762 on each, amplify the signal that was extracted from input 91B. This amplified signal 92B is output through port K, e.g., as output having wavelength 1536.2. In some embodiments, standard communications wavelengths are used for these add drop devices. Thus broadband light goes into port J, a single wavelength is extracted, amplified, and output through port K, the remaining wavelengths from port J are combined with input from port M, which is bandpass filtered and added to those wavelengths, amplified, and output through port L. In some embodiments, a standard broadband amplifier 720 is also provided, and possibly used in series with one of the other inputs or outputs to amplify those signals as needed.

In some embodiments of the add drop-chip 710, a tap 740 is provided for extracting a portion of the light passing through waveguide 123. The tap includes a waveguide 741 which includes a segment 742 positioned in sufficiently close proximity to the waveguide 123 to form an evanescent coupler 748 between the waveguide 123 and the waveguide 741. Turning briefly to FIG. 1-I, there is shown a waveguide segment 182 and a waveguide segment 184 which are positioned at a distance 193. The distance 193 is sufficiently close to form an evanescent coupler 748.

Returning to FIG. 7B, also optically coupled to the waveguide 741 is a diffraction grating 745, which can be tuned to allow a selected wavelength of light to pass through the diffraction grating 745. In some embodiments, the diffraction grating 745 has a lateral spacing selected to maximize exit transfer of a wavelength of light selected from a plurality of wavelengths of light carried by the waveguide 123. In other embodiments, the lateral spacing of the diffraction grating 745 may be chosen to allow a plurality of wavelengths of light to be emitted through the diffraction grating 745. In some embodiments, a optical to electrical convertor (shown and described with respect to FIG. 9) may be positioned near the diffraction grating 745. The optical to electrical convertor is then used to convert the light emitted from the diffraction grating 745 into electrical energy. In one embodiment, for example, the light emitted from the diffraction grating 745 which is at a selected wavelength carries information representative of data. By converting at least a portion of the light at the selected frequency, the information is placed into electrical signal for processing using a computer.

In operation, light have a plurality of wavelengths from about 1530 nm to 1560 nm is input to the chip 710 at input port J. Input port J has a waveguide 746 optically coupled to the input port. The waveguide 746 branches into a first waveguide segment 746a and a second waveguide segment 746b. Each of the waveguide segments 746a, 746b carries light having half the power as that input to the chip 710 at input port J. The first waveguide segment 746a is positioned near the waveguide 124 of the chip 710. The first waveguide segment 746a and waveguide 124 are placed near one another and are sufficiently near so as to form an evanescent coupler. Associated with the first waveguide segment 746a and the waveguide 124 is a diffraction grating 762 which allows a selected wavelength of light in the first waveguide segment 746a to couple to waveguide 124. In other words, the diffraction grating 762 serves as a filter to allow a selected wavelength of light to couple to waveguide 124. The selected wavelength of light (1536.2 nm as shown in this example) passes toward mirror 150. Pump light having a wavelength of 980 nm is passed through the waveguide 124 in the opposite direction. The pump light amplifies the power associated with the light having an amplitude of 1536.2 nm. The waveguide 124 includes a waveguide segment which runs parallel and adjacent to a substantially equal length portion of the waveguide 123. Each length of the parallel and adjacent segments of waveguides 123, 124 is substantially equal to one half of a an evanescent coupler length needed to transfer a first wavelength in a non-folded evanescent coupler. The mirror 150 reflects the 1536.2 nm wavelength light and forms a folded evanescent coupler that allows the 1536.2 nm light traveling in the waveguide 124 to couple to the waveguide 123 and switch directions. Pump light is also passed through waveguide 123 which further amplifies the 1536.2 nm light in the waveguide 123. The tap 740 extracts a portion of the light traveling in the a waveguide 123 and emits the portion of the light through the diffraction grating 745.

Figure 7C:
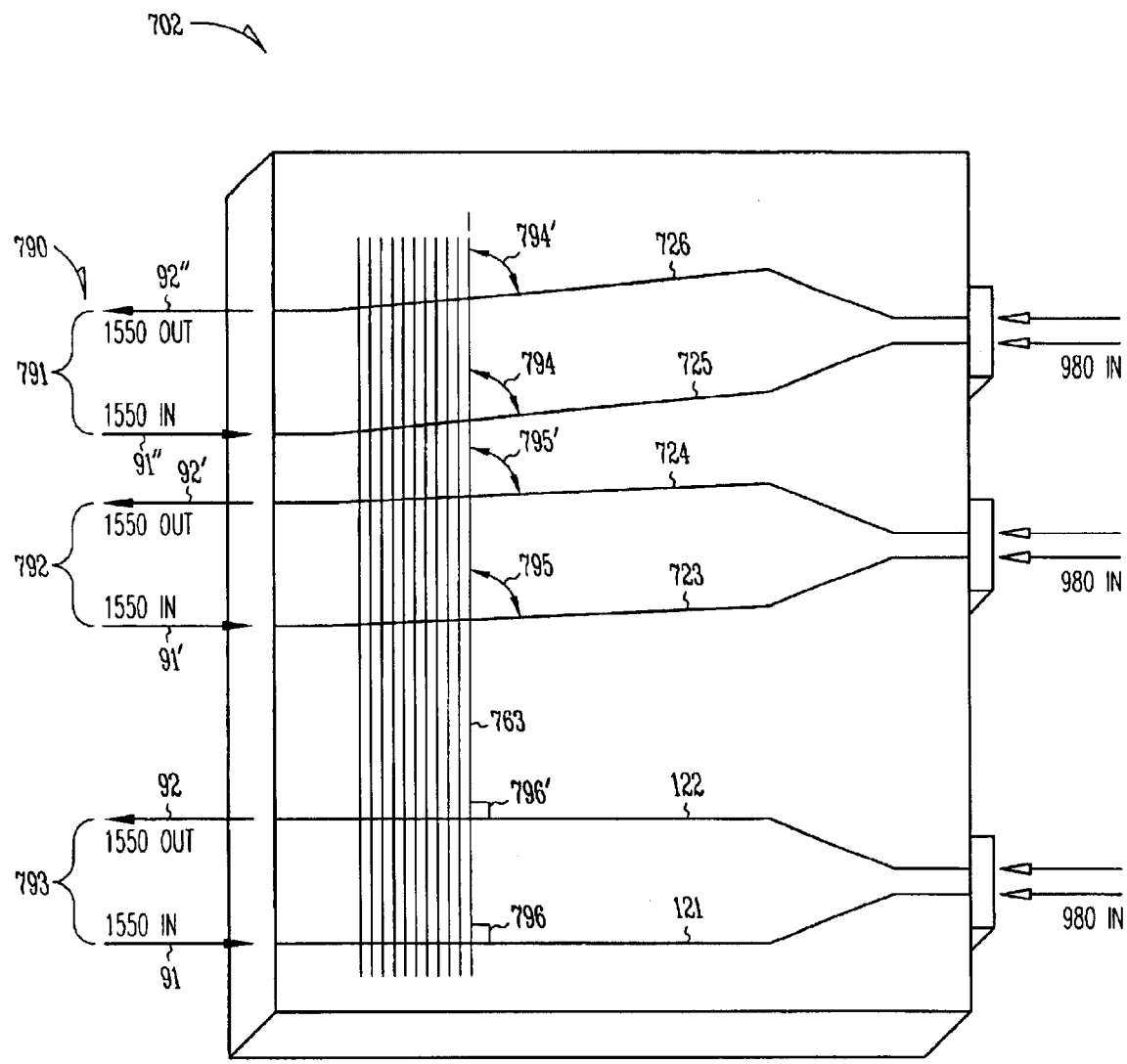
FIG. 7C shows a top isometric view of a waveguide amplifier device 702 having a plurality of subdevices 790, each similar to devices 720 of FIG. 7A but having different filter wavelength characteristics.

FIG. 7C shows a top isometric view of a waveguide amplifier device 702 having a plurality of subdevices 790, each similar to devices 720 of FIG. 7A but having different filter wavelength characteristics. In some embodiments, the angle 796 between waveguide 121 and the ridges of grating 760, and the angle 796 between waveguide 121 and the ridges of grating 763 are both 90-degree angles. In some embodiments, grating 763 forms a bandpass filter having a transfer function 774 such as shown in FIG. 7G below. In other embodiments, grating 763 forms a notch filter having a transfer function 772 such as shown in FIG. 7E below. In still other embodiments, grating 763 forms a gain-flattening filter having a transfer function 777 such as shown in FIG. 7J below.

Note that various waveguides 721–726 can also each form different angles to the single grating 763, thus shifting the frequency response, while keeping the same shape of the frequency response curve (e.g., either notch 772, bandpass 774, or gain-flattening 778, or other transfer function). I.e., the wavelength at each point along the curve is shifted by a proportional amount by changing the angle that the waveguide makes with the grating 763. A similar effect can be made in the other gratings and waveguides described herein. In some embodiments, several different angles are made between a single waveguide segment and a grating having a constant spacing (See FIG. 7N below), for example, by having a curving or multi-faceted waveguide segment.

Figure 7D:
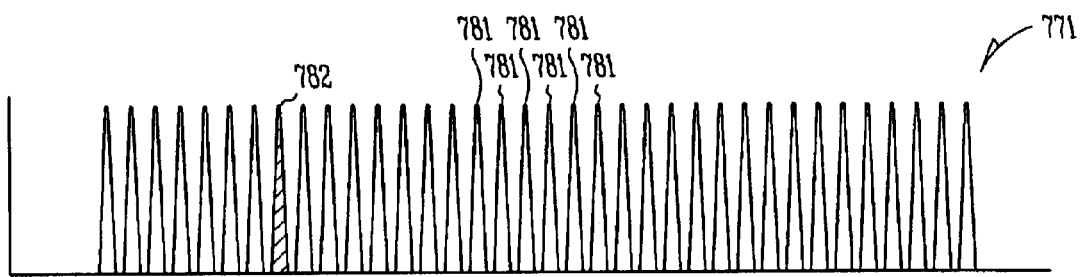
FIG. 7D shows a graph of channel power versus wavelength of an input signal.
Figure 7E:
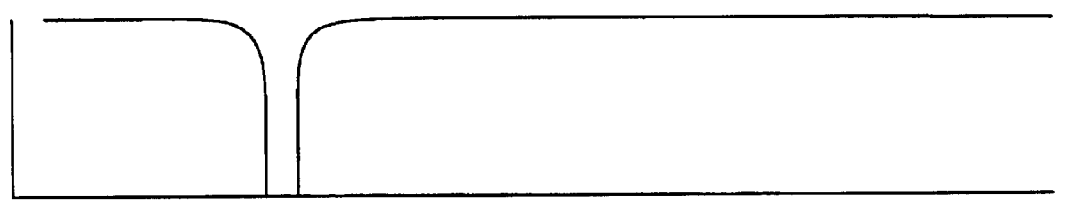
FIG. 7E shows a graph of filter response versus wavelength of a notch filter.

FIG. 7D shows a graph of channel power versus wavelength of an input signal 771 (this could be any of the inputs 91). In some embodiments, this input signal 771 has a plurality of data channels 781, each having a different wavelength and each amplitude modulated with a different data pattern, as is well known in the art. One channel, data channel 782, will be of interest.

FIG. 7E shows a graph of filter response 772 versus wavelength of a notch filter 761. This filter 761 is used in FIG. 7B to remove one channel 782 from a spectrum of channels 91B input at port J.

Figure 7F:
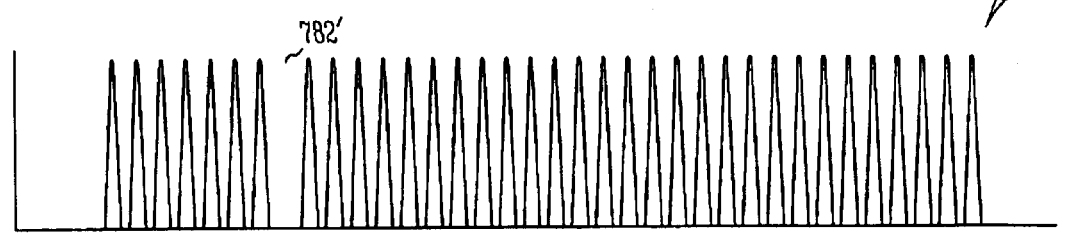
FIG. 7F shows a graph of channel power versus wavelength of an output signal.
Figure 7G:
FIG. 7G shows a graph of filter response versus wavelength of a bandpass filter.

FIG. 7F shows a graph of channel power 773 versus wavelength of an output signal of filter 761. This shows a hole 782' where channel 782 has been removed from the signal 91B'.

FIG. 7G shows a graph of filter response 774 versus wavelength of a bandpass filter formed by grating 762. The output on waveguide segment 124 is shown in FIG. 7H.

Figure 7H:
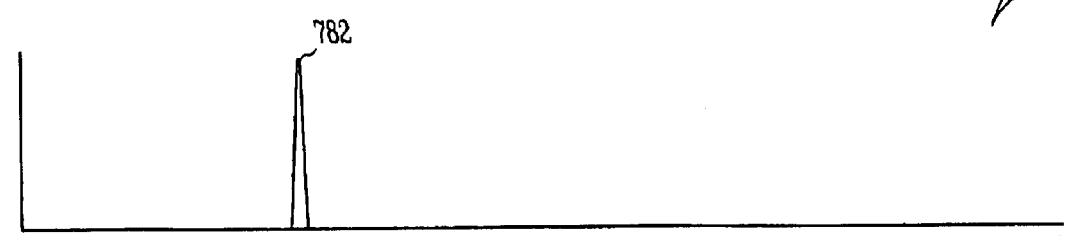
FIG. 7H shows a graph of channel power versus wavelength of an output signal.

FIG. 7H shows a graph of channel power 775 versus wavelength of an output signal having only channel 782.

Figure 7I:
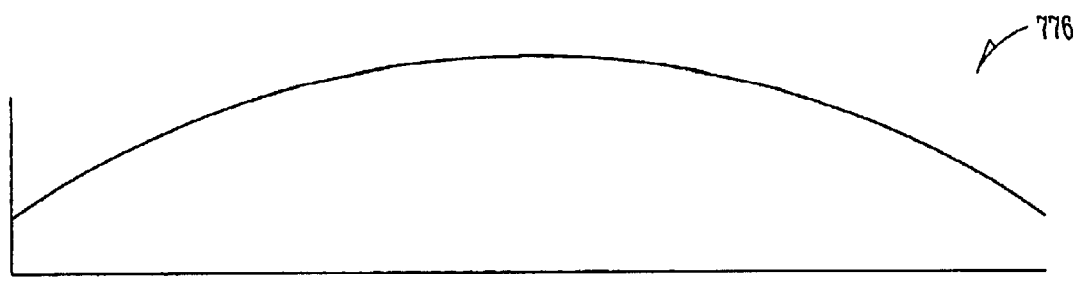
FIG. 7I shows a graph of amplifier response versus wavelength of an Er/Yb amplifier.
Figure 7J:
FIG. 7J shows a graph of filter response versus wavelength of a gain-flattening filter.

FIG. 7I shows a graph of amplifier response 776 versus wavelength of an Er/Yb amplifier such as shown in FIG. 1K.

FIG. 7J shows a graph of filter response 777 versus wavelength of a gain-flattening filter 760 (see FIG. 7B).

Figure 7K:
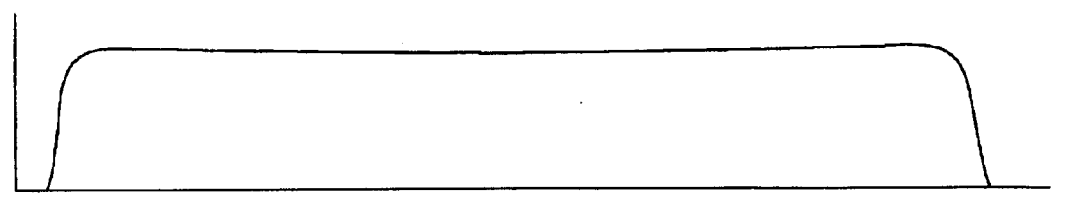
FIG. 7K shows a graph of amplifier response versus wavelength of an Er/Yb amplifier having gain-flattening filter.
Figure 7L:
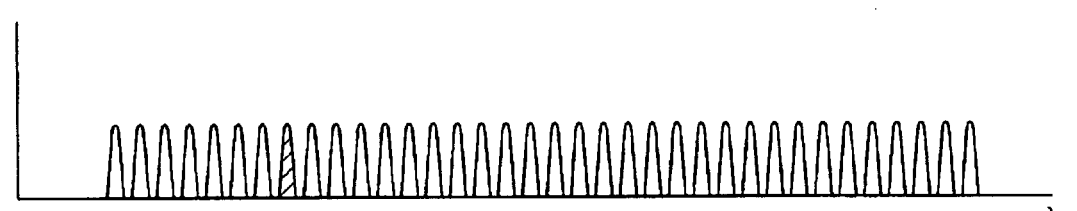
FIG. 7L shows a graph of channel power versus wavelength of an input signal.

FIG. 7K shows a graph of amplifier response 778 versus wavelength of an Er/Yb amplifier 720A having a gain-flattening filter 760. The flat response over a wide range of wavelengths is desirable in many applications. For example, an optical signal having a plurality of channels (such as shown in FIG. 7L) can be amplified. If pump power is sufficiently high such that an abundance of energized ions are available, there will be very little crosstalk between channels due to the amplification process, and all channels will be amplified by approximately the same amount.

FIG. 7L shows a graph of channel power versus wavelength of an input signal, such as on waveguide segment 125 after injection of signal 90B by evanescent coupler 783.

Figure 7M:
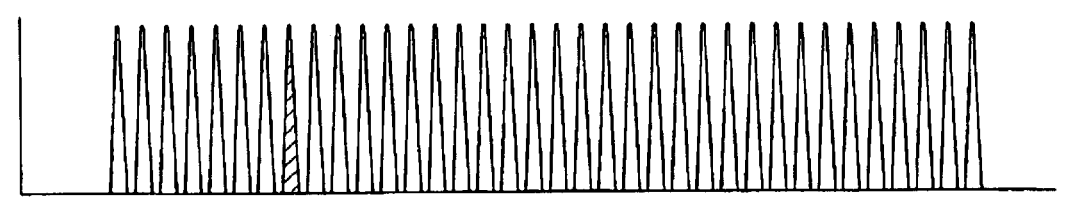
FIG. 7M shows a graph of channel power versus wavelength of an output signal.

FIG. 7M shows a graph of amplified channel power versus wavelength of an output signal 93B.

Figure 7N:
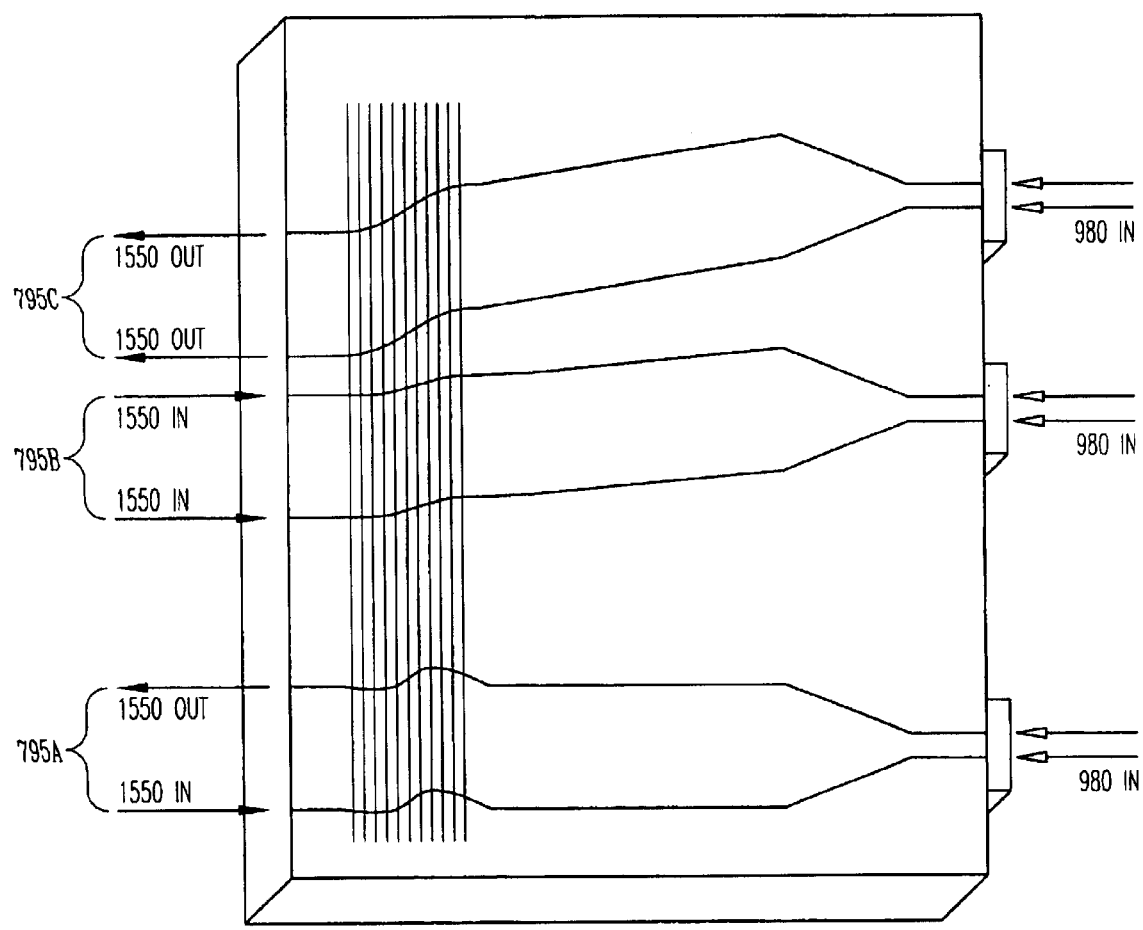
FIG. 7N shows a top isometric view of a waveguide amplifier device 704 having a plurality of subdevices 795, each similar to devices 790 of FIG. 7C but having different filter wavelength characteristics.

FIG. 7N shows a top isometric view of a waveguide amplifier device 704 having a plurality of subdevices 795 (795A, 795B, 795C), each similar to devices 790 of FIG. 7C but having different filter wavelength characteristics. In some embodiments, one or more of the waveguide segments passes under grating 763 in a non-straight line, such as a curve or a multi-faceted line, such that a plurality of different effective grating spacings is formed, in order to obtain a gain curve such as 777 of FIG. 7J. The gain curve desired can specify how much of each effective grating spacing is needed, and a corresponding curve of the waveguide segment can then be specified. This allows use of a simple uniformly spaced diffraction grating to be used, reducing cost and complexity.

Figure 8A:
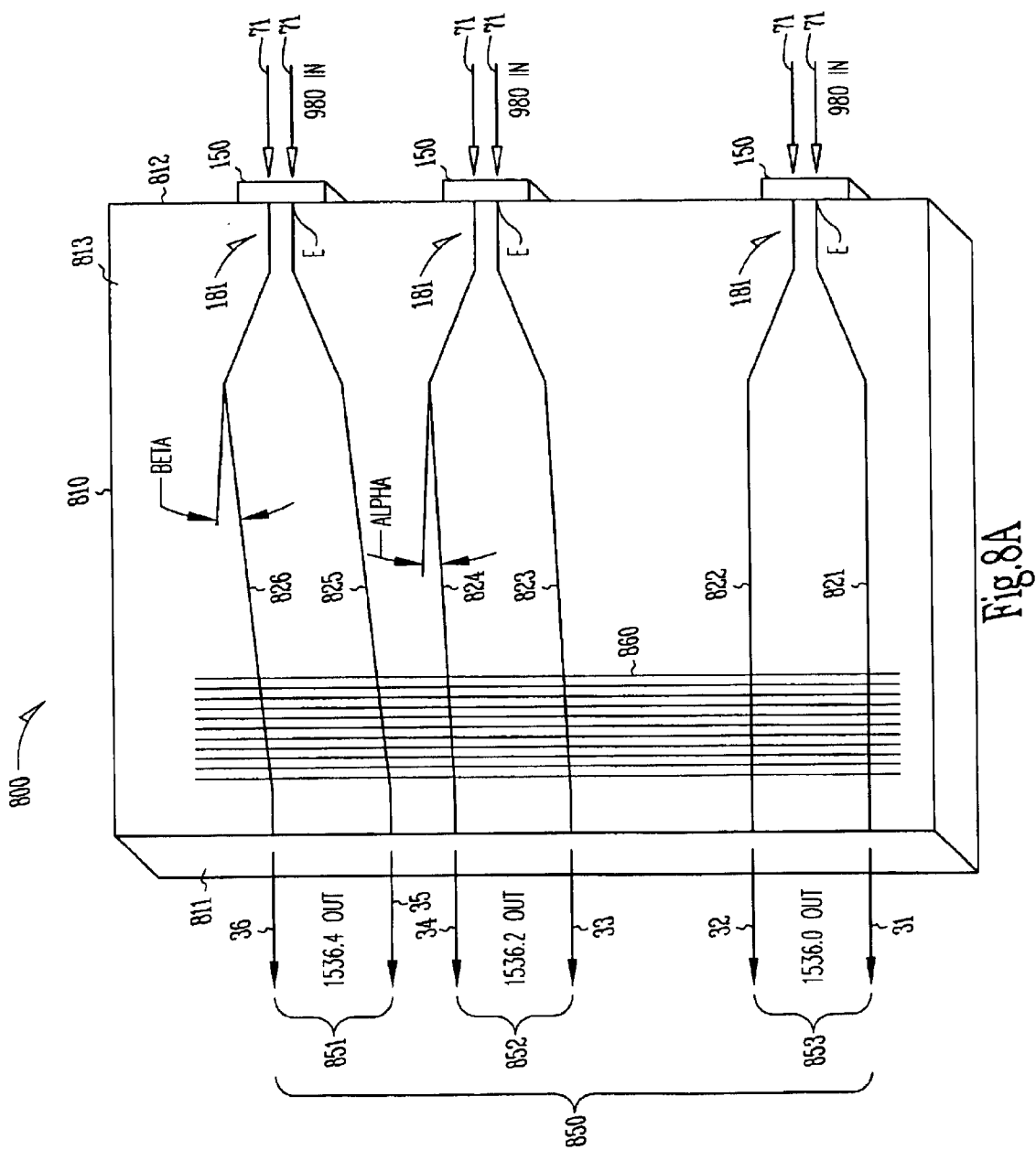
FIG. 8A shows a top isometric view of a waveguide laser device 800 having a plurality of lasing subdevices 850, each similar to subdevices 120 of FIG. 1K, but also having a grating 860 configured to cause lasing.

FIG. 8A shows a top isometric view of a waveguide laser device 800 having a plurality of subdevices 850, each similar to subdevices 120 of FIG. 1K, but also having a grating 860 configured to cause lasing. In subdevice 853, grating 860 is designed to provide a sharp bandpass reflection of most or all of one particular frequency, thus forming a laser cavity along with waveguide segment 821 and 822. In some embodiments, waveguides 821–826 are formed as buried waveguide for most of their length, but are surface waveguides for the portions interfaced to grating 860. In device 853, the grating 860 is formed substantially perpendicular to the underlying waveguide segments 821 and 822. In contrast, in some embodiments, the waveguides 823 and 824 form a second angle (not perpendicular, but 90 degrees plus a small angle alpha) to grating 860 for device 852, thus forming a laser having a longer wavelength (since the effective spacing of each cycle of grating is longer as seen by light in the waveguide segments). Further, in some embodiments, the waveguides 825 and 826 form a third angle (also not perpendicular, but 90 degrees plus a small angle beta) to grating 860 for device 851, thus forming a laser having a still longer wavelength (since the effective spacing of each cycle of grating is even longer as seen by light in the waveguide segments). The pump light inputs 71 and pump light paths are as described above in FIGS. 1J or 6A.

Figure 8B:
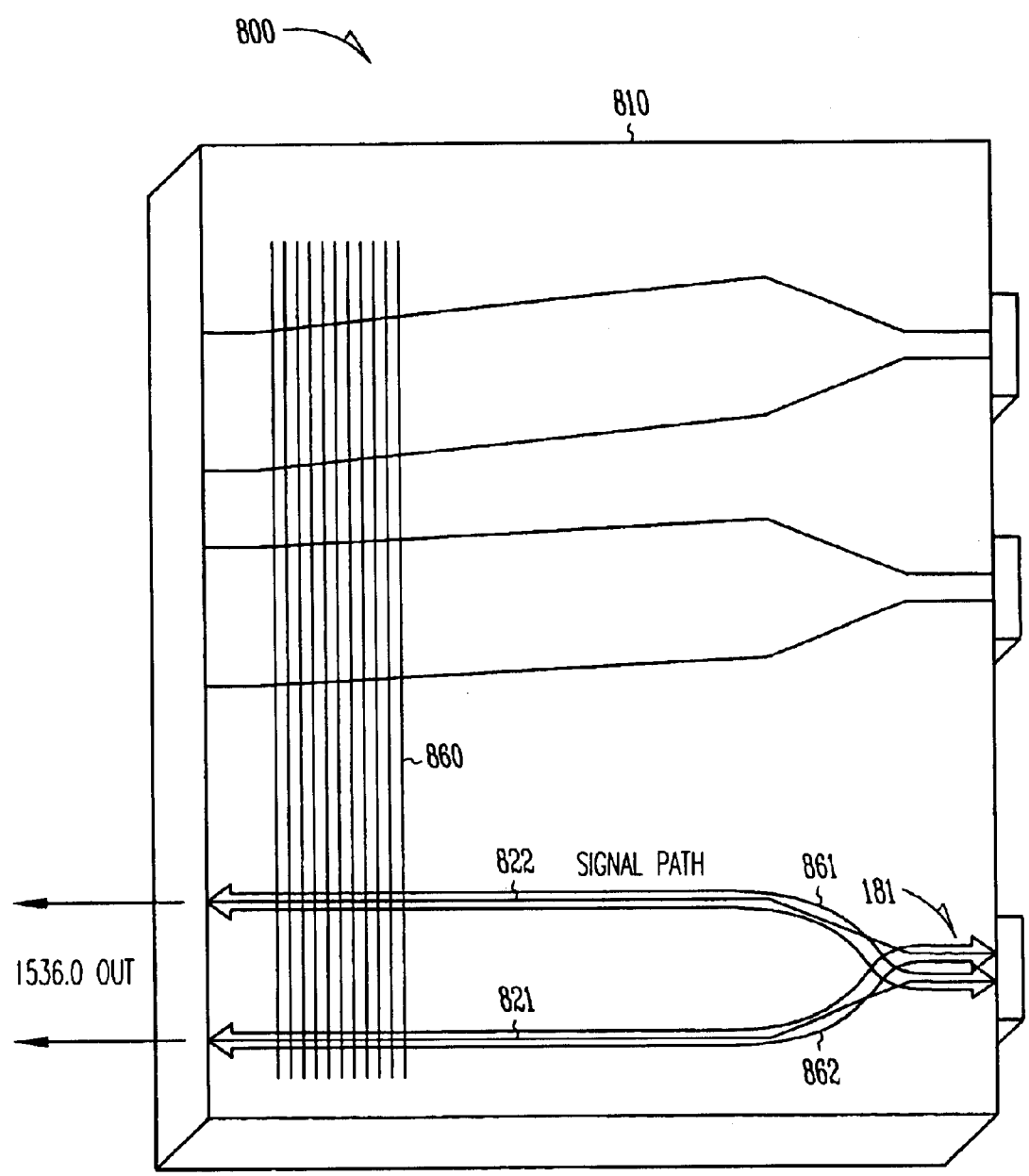
FIG. 8B shows a top isometric view of waveguide device 800 showing the signal light path passing signal light oscillating in the first and second waveguides.

FIG. 8B shows a top isometric view of waveguide device 800 showing the signal light path 861 and 862 passing signal light oscillating in the first waveguide 821 and the second waveguide 822 between their respective reflectors form by grating 860. Thus light reflected by grating 860 in waveguide segment 821 passes left to right in waveguide segment 821, crosses at folded evanescent coupler 181 and the passes right to left in waveguide segment 822, where it is reflected back, and travels the above route in a clockwise direction. Since the angle to the grating ans the grating angle is identical for each pair of waveguides, the reflectors can be more closely tuned to one another. In some embodiments, multiple lasers are formed, each having a slightly different (but each unknown ab initio because of possible process variations) wavelength. Accordingly, once the device is completed, the packaging operation selects the desired wavelength, then chooses a subdevice matching that requirement, thus increasing yield.

Figure 9:
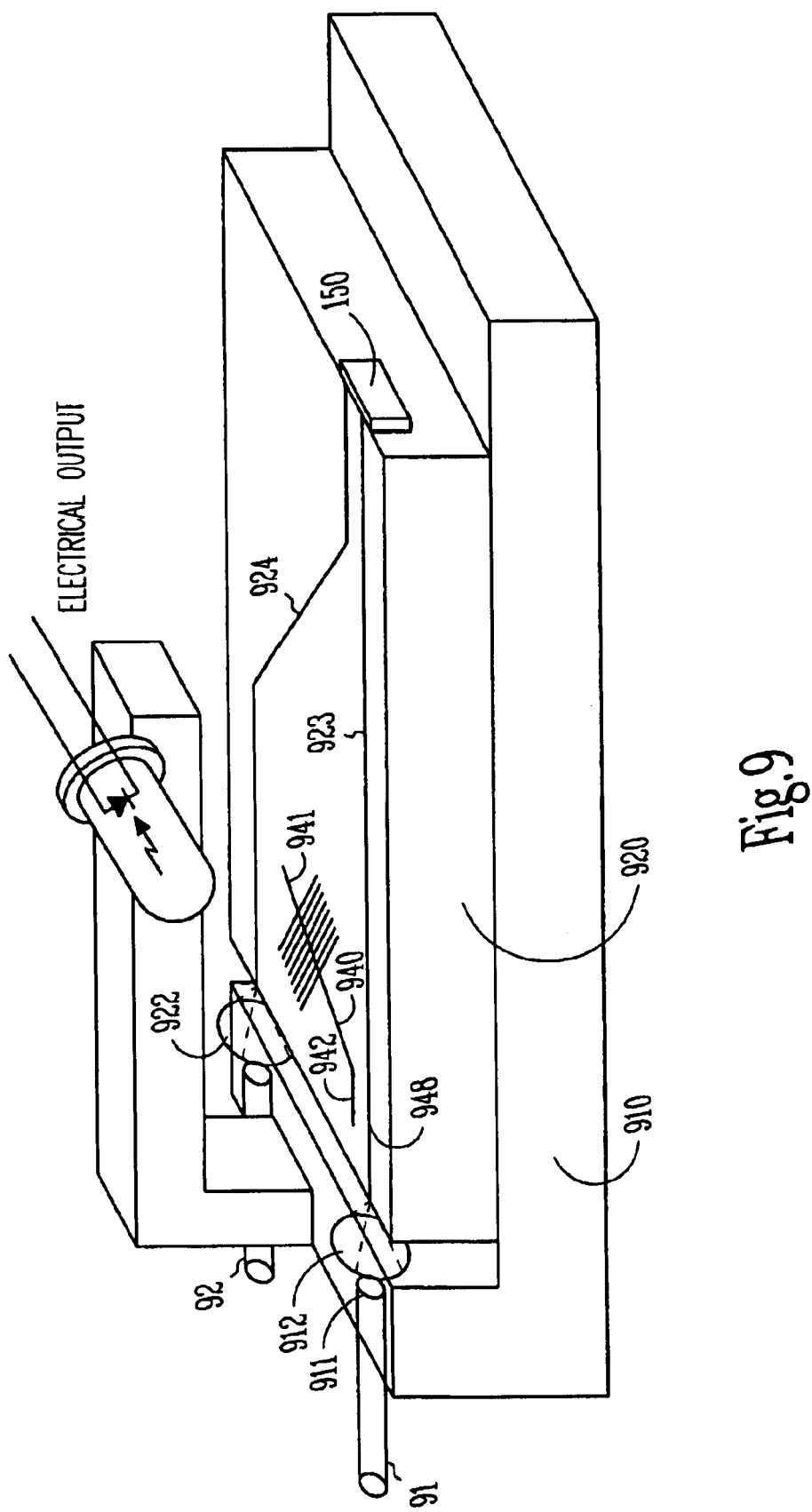
FIG. 9 shows perspective view of an optical module having an optical detector of an integrated photonic apparatus 900.

FIG. 9 is a perspective view of an integrated photonic apparatus 900. The integrated photonic apparatus 900 includes a chip carrier 910. The chip carrier 910 includes a first groove 911 for receiving an optical fiber 91, and a second groove 912 for receiving an optical fiber 92. The carrier 910 also has a lens 912 which focuses light carried by the optical fiber 91 onto a waveguide 923 of an chip 920 positioned within the chip carrier 910. Waveguide 923 of chip 920 carries light within the waveguide 923 to a reflector 150. Reflector 150 reflects light of certain wavelengths while allowing light of other wavelengths to pass. The light coupled from the optical fiber 91 and carried in the waveguide 923 from the optical fiber 91 to the reflector 150 reflects off reflector 150. The waveguide 923 includes a waveguide segment which runs parallel and adjacent to a substantially equal length portion of the waveguide 924. Each length of the parallel and adjacent segments of waveguides 923, 924 is substantially equal to one half of an evanescent coupler length needed to transfer light of a first wavelength in a non-folded evanescent coupler.

The mirror 150 reflects the first wavelength light and forms a folded evanescent coupler that allows the first wavelength light traveling in the waveguide 923 to couple to the waveguide 924 and switch directions. The light travels from the reflector 150 toward the optical fiber 92. The carrier 910 also has a lens 922 which optically couples light carried by the waveguide 924 to the optical fiber 92 within the groove 912 of the chip carrier 910.

The chip carrier 910 also includes a bed 940 which receives or cradles the chip 920. The chip carrier 910 also includes a boom 950 which is attached to the edge of the chip carrier 910. Attached to the boom 950 is an optical-to-electrical convertor 952, such as a photodiode. The optical-to-electrical convertor 952 is positioned to receive light emitted from the chip within the chip carrier 910.

A tap 940 is provided for extracting a portion of the light passing through waveguide 923. The tap 940 includes a waveguide 941 which includes a segment 942 positioned in sufficiently close proximity to the waveguide 923 to form an evanescent coupler 948 between the waveguide 923 and the segment 942 of the waveguide 941. The evanescent coupler 948 couples only a portion of the light traveling in the waveguide 923 to the waveguide 941. As a result, the evanescent coupler formed is a partial transfer evanescent coupler. Turning briefly to FIG. 1I, there is shown a waveguide segment 182 and a waveguide segment 184 which are positioned at a distance 193. The distance 193 is sufficiently close to form an evanescent coupler 748. Returning to FIG. 9, the tap 940 also includes an exit port. In one embodiment, the exit port is a diffraction grating 945. The diffraction grating 945 has a lateral spacing which allows a selected wavelength of light in the waveguide 941 to pass through the diffraction grating 945. The light passing through the diffraction grating 945 and is emitted toward the optical-to-electrical convertor 952. The optical-to-electrical convertor 952 converts signals carried by the emitted light into electrical signals. The electrical signals can then be used by a computer or other information handling device.

Figure 10:
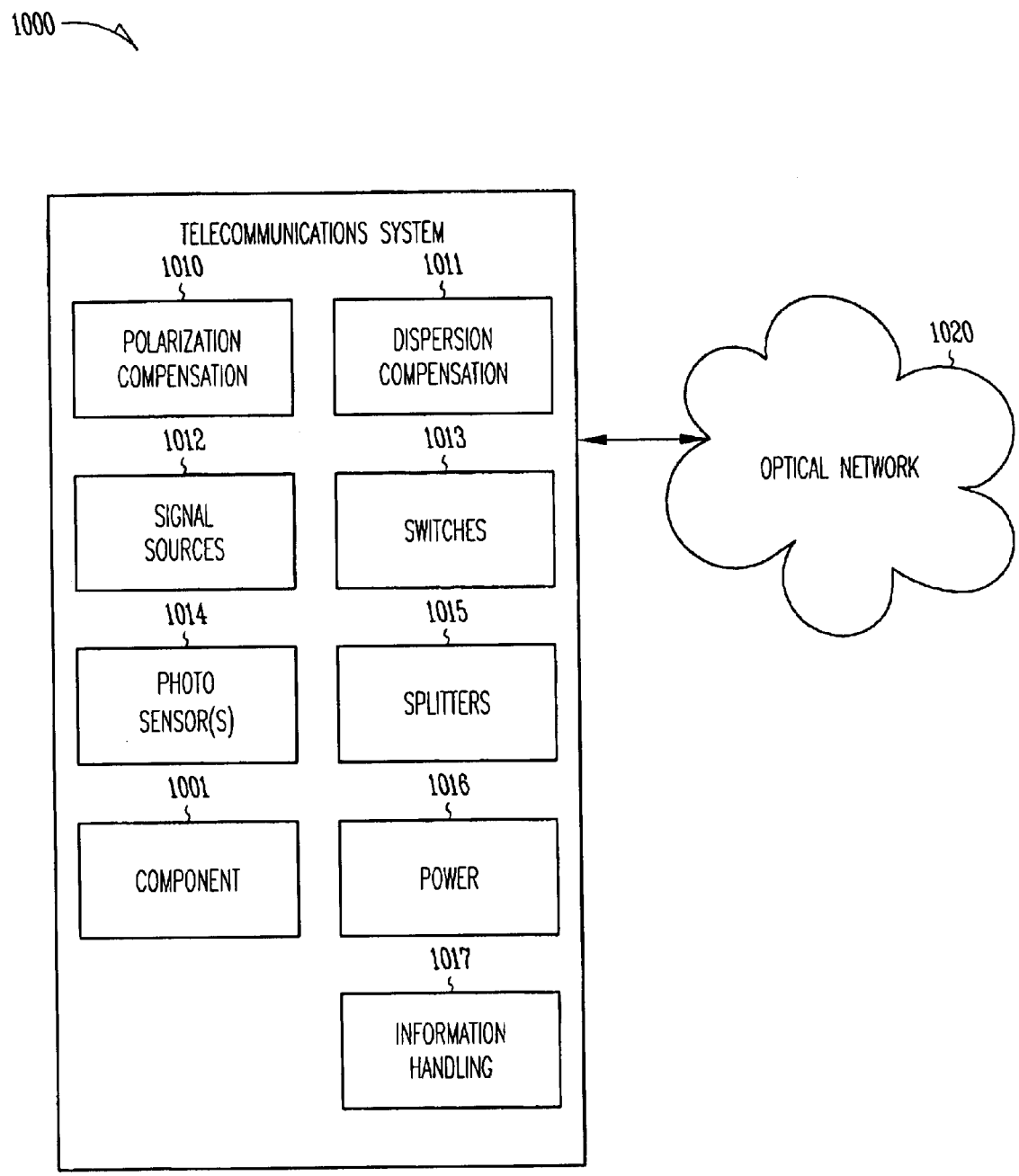
FIG. 10 shows schematic of an optical system 1000.

FIG. 10 shows schematic of an optical telecommunications system 1000. System 1000 includes a device 1001, which in some embodiments, includes one or more of the devices or combinations of the devices shown and described for FIG. 1A through FIG. 9. System 1000 also includes a polarization compensation apparatus 1010, a dispersion compensation apparatus 1011, one or more signal sources 1012, one or more optical switching mechanisms 1013, one or more photosensors 1014, one or more optical splitters 1015, power source 1016 and/or an information handling system 1017 that processes electronic signals coming from or going to the optical subsystems. Systems 1000, in some embodiments, is connected to optical network 1020.

In some embodiments, various parts of the present invention are combined with various parts of the inventions described in U.S. patent application Ser. No. 09/996,407, entitled Apparatus and Method for Integrated Photonic Devices Having High-performance Waveguides and Multi-compositional Substrates filed Nov. 27, 2001, and U.S. patent application Ser. No. 09/996,346, entitled Apparatus and Method for Integrated Photonic Devices Having Gain and Wavelength-selectively filed Nov. 27, 2001, ans U.S. patent application Ser. No. 09/996,346, entitled Apparatus and Method for Integrated Photonic Devices Having Add/drop Ports and Gain filed Nov. 27, 2001, and U.S. patent application Ser. No. 09/996,406, entitled Apparatus and Method for Integrated Photonic Devices Having Adjustable Gain filed on Nov. 27, 2001, and U.S. patent application Ser. No. 09/490,730, entitled Method and Apparatus for Waveguide Optics and Devices filed on Jan. 25, 2000, each of which are incorporated in their entirety by reference.

Conclusion

One aspect of the present invention provides an integrated photonic apparatus that includes a glass substrate having a major surface, a plurality of waveguide segments on the surface of the substrate including a first waveguide segment and a second waveguide segment, and a folded evanescent coupler connecting the first waveguide segment to the second waveguide segment. In some embodiments, the folded evanescent coupler includes an evanescent coupler formed by a length portion, having a first length, of the first waveguide segment and an equivalent length portion of the second waveguide running parallel and adjacent to the length portion of the first waveguide segment, wherein the first length is substantially equal to one half of an evanescent coupler length needed to transfer a first wavelength in a non-folded evanescent coupler, and a reflector located at an end of the folded evanescent coupler.

In some embodiments, the first length is a length selected to transfer substantially all light of a first wavelength from the first waveguide segment to the second waveguide segment.

In some such embodiments, the reflector is a dielectric mirror that is highly reflective to light of the first wavelength. In some such embodiments, the reflector is also highly transmissive to light of a second wavelength, wherein the first wavelength is different than the second wavelength.

In some embodiments, the integrated photonic apparatus also includes a first port configured to launch signal light into the first waveguide segment, a second port configured to launch signal light into the second waveguide segment, and a third port configured to launch signal light into both the first waveguide segment and port configured to launch signal light into the first waveguide segment and into the second waveguide segment. In some such embodiments, the third port is through the reflector.

In some embodiments, the first length is a length selected to transfer substantially all light of a first wavelength from the first waveguide segment to the second waveguide segment, while the length is also selected to transfer substantially no light of a second wavelength from the first waveguide segment to the second waveguide segment, wherein the first wavelength is different than the second wavelength.

In some embodiments, the first length is a length selected to transfer substantially all light of a first wavelength from the first waveguide segment to the second waveguide segment, while the length is also selected to transfer substantially all of a second wavelength from the first waveguide segment to the second waveguide segment, wherein the first wavelength is substantially different than the second wavelength.

Yet another aspect of the present invention provides an integrated photonic apparatus including a glass substrate having a major surface, a plurality of waveguide segments on the surface of the substrate including a first waveguide segment, a second waveguide segment, a third waveguide segment, a fourth waveguide segment, a first folded evanescent coupler connecting the first waveguide segment to the second waveguide segment, and a second folded evanescent coupler connecting the third waveguide segment to the fourth waveguide segment.

In some embodiments, the first folded evanescent coupler includes an evanescent coupler formed by a length portion, having a first length, of the first waveguide segment and an equivalent length portion of the second waveguide running parallel and adjacent to the length portion of the first waveguide segment, wherein the first length is substantially equal to one half of an evanescent coupler length needed to transfer a first wavelength in a non-folded evanescent coupler, and a first reflector located at an end of the first folded evanescent coupler. In some embodiments, the second folded evanescent coupler includes an evanescent coupler formed by a length portion, having a second length, of the third waveguide segment and an equivalent length portion of the fourth waveguide running parallel and adjacent to the length portion of the third waveguide segment, wherein the second length is substantially equal to one half of an evanescent coupler length needed to transfer a second wavelength across a non-folded evanescent coupler, and a second reflector located at an end of the second folded evanescent coupler.

Another aspect of the present invention provides an integrated photonic apparatus that includes a glass substrate having a major surface, a plurality of wavelength segments of the surface of the substrate including a first waveguide segment, a second waveguide segment, a third waveguide segment, a fourth waveguide segment, a first folded evanescent coupler connecting the first waveguide segment to the waveguide segment, and a second folded evanescent coupler connecting the third segment to the fourth waveguide segment.

In some embodiments, the first folded evanescent coupler includes an evanescent coupler formed by a length portion, having a first length, of the first waveguide segment and an equivalent length portion of the second waveguide running parallel and adjacent to the portion of the first waveguide segment, wherein the first length is substantially equal to one half of an evanescent coupler length needed to transfer a first wavelength in a non-folded evanescent coupler, and a first reflector located at an end of the first folded evanescent coupler.

In some embodiments, the second folded evanescent coupler includes an evanescent coupler formed by a length portion, having a second length, of the third waveguide segment and an equivalent length portion of the fourth waveguide running parallel and adjacent to the length portion of the third waveguide segment, wherein the second length is substantially equal to one half of an evanescent coupler length needed to transfer a second wavelength in a non-folded evanescent coupler, and a second reflector located at an end of the first folded evanescent coupler.

In some embodiments, the first length is a length selected to transfer substantially all light of a wavelength from the first waveguide segment to the second waveguide segment.

In some embodiments, the reflector is a dielectric mirror that is highly reflective to light of the first wavelength. In some embodiments, the reflector is also highly transmissive to light of a second wavelength, wherein the first wavelength is different than the second wavelength.

Another aspect of the present invention provides a method that includes passing a first light stream having one or more signal wavelength through a first waveguide and a second waveguide that are optically coupled to one another by a folded evanescent coupler, at least one of which is doped with an optically active species, and launching pump-light directly into and end of the folded evanescent coupler to amplify at least one wavelength selected from a set of one or more signal wavelength of the first stream.

Some embodiments of the method further include passing a second light stream having one or more signal wavelengths from the second waveguide to the first waveguide through the folded evanescent coupler in a direction opposite that of the first light stream.

In some embodiments, the first light stream is already modulated when inserted to the first waveguide, and the second light stream is continuous-wave when inserted to the second waveguide.

Still another aspect of the present invention provides a method that includes passing light of the first light stream from a first signal wavelength to a second signal waveguide through a folded evanescent coupler in a first direction, and passing light of a second light stream from the second signal waveguide to the signal waveguide through the folded evanescent coupler in an opposite second direction.

In some embodiments, the first light stream includes signal light and the second light stream includes pump light, wherein at least one of the first signal waveguide, the second signal waveguide, and the folded evanescent coupler is doped with an optically active species.

In some embodiments, the first light stream includes only signal light and the second light stream includes pump light.

In some embodiments, the passing of the light stream includes passing light into the folded evanescent coupler from the first waveguide, propagating the light a length of the folded evanescent coupler, reflecting the light, again propagating the light the length of the folded evanescent coupler, and passing the light from the folded evanescent coupler to the second waveguide.

In some embodiments, the length is a distance selected to transfer substantially all light of a first wavelength from the first waveguide to the second waveguide.

In some embodiments, the reflecting occurs at a dielectric mirror that is highly reflective to light of the first wavelength. In some embodiments, the dielectric mirror is also highly transmissive to light of a second wavelength, wherein the first wavelength is different than the second wavelength.

Some embodiments of this method further include launching pump light through the dielectric mirror.

In some embodiments, the folded evanescent coupler has a length selected to transfer substantially all light of a first wavelength from the first waveguide to the second waveguide, and also selected to transfer substantially no light of a second wavelength between the first waveguide segment and the second waveguide segment, wherein the first wavelength is different than the second wavelength.

Some embodiments of these methods further include wavelength-selective filtering the first light stream.

In some embodiments, the wavelength-selective filtering eliminates a first wavelength from the first waveguide but passes one or more other wavelengths.

In some embodiments, the wavelength-selective filtering eliminates a first wavelength from the first waveguide, and passes the first wavelength along the second waveguide but eliminates one or more other wavelengths from the second waveguide.

In some embodiments, the wavelength-selective filtering performing gain-flattening.

In some embodiments, the wavelength-selective filtering performing gain-flattening filtering to both the first waveguide and the second waveguide.

One aspect of the present invention provides an integrated photonic apparatus that includes a glass substrate having a major surface, a first waveguide segment formed along the major surface of the substrate, and a first tapping port including a second waveguide segment forming a partial transfer evanescent coupler to the first signal waveguide segment and the second waveguide segment also including a first exit port.

In some embodiments, the substrate further includes an edge, and wherein the first exit port is through the edge of the substrate adjacent the major surface of the substrate.

In some embodiments, the first exit port is through the major surface of the substrate.

In some embodiments, the first exit port includes a diffraction grating optically coupled to the second waveguide segment.

In some embodiments, the diffraction grating is optically coupled to the second waveguide segment, and has a lateral spacing selected to maximize exit transfer of a first wavelength of light selected from a plurality of wavelengths of light carried by the first waveguide.

Some embodiments further include a second tapping port including a third waveguide segment forming a partial transfer evanescent coupler to the first signal waveguide segment, and the third waveguide segment also including a second exit port.

In some embodiments, the substrate further includes an edge, and wherein the second exit port is through the edge of the substrate adjacent the major surface of the substrate.

In some embodiments, the second exit port is through the major surface of the substrate.

In some embodiments, the second exit port includes a diffraction grating optically coupled to the third waveguide segment.

In some embodiments, the diffraction grating is optically coupled to the third waveguide segment, and has a lateral spacing selected to maximize exit transfer of a second wavelength of light selected from a plurality of wavelengths of light carried by the first waveguide.

In some embodiments, the first tapping port and the second tapping port are directional couplers wherein the directional couplers each couple light traveling in a first direction in the first waveguide.

In some embodiments, the first tapping port and the second tapping port are directional couplers wherein the directional couplers each couple light traveling in a different directions in the first waveguide.

Some embodiments further include a second tapping port including a third waveguide segment forming a partial transfer evanescent coupler to the first signal waveguide segment, and the third waveguide segment also includes a second exit port, the second exit port including a diffraction grating optically coupled to the third waveguide segment, wherein the diffraction grating optically coupled to the third waveguide segment has a spacing selected to maximize exit transfer of a first wavelength of light selected from a plurality of wavelengths of light carried by the first waveguide, which is different from the spacing of the diffraction grating optically coupled to the second waveguide segment selected to maximize exit transfer of a second wavelength of light selected from a plurality of wavelengths of light carried by the first waveguide, wherein the first wavelength of light is different from the second wavelength of light.

In some embodiments, the first waveguide further comprises an input end and wherein one of the first tapping port extracts a subportion of unamplified light proximate the input end of the first waveguide.

In some embodiments, the second tapping port extracts a subportion of amplified light from the first waveguide.

In some embodiments, the first exit port is a first directional coupler which couples out light in a first direction and the second exit port is a second directional coupler which couples out light in a second direction, wherein the second direction is opposite to the first direction.

In some embodiments, the first directional coupler extracts a signal wavelength of light and wherein the second directional coupler extracts a pump wavelength of light.

Another aspect of the present invention provides an integrated photonic apparatus that includes a first waveguide. The first waveguide includes a buried portion, a surface portion, and a transition portion optically coupling the buried portion of the first waveguide to the surface portion of the first waveguide.

Some embodiments further include an diffraction grating optically coupled to the surface portion of the waveguide.

Some embodiments further include a second waveguide optically coupled to the buried portion of the first waveguide.

Still another aspect of the present invention provides an integrated photonic apparatus that includes a first buried waveguide portion, and a surface waveguide portion, the first buried waveguide portion forming an evanescent coupler to the surface waveguide portion.

Yet another aspect of the present invention provides a method that includes passing light through a waveguide segment, tapping a portion of the light passing through the first waveguide segment, and emitting the tapped portion of light.

Some embodiments further include diffracting the tapped portion of light.

In some embodiments, the emitting the tapped portion of light includes selecting a first wavelength of light from the light passed through the waveguide.

In some embodiments, the emitting the tapped portion of light includes emitting a first selected wavelength of light from the light passed through the waveguide, and emitting a second selected wavelength of light from the light passed through the waveguide, the first wavelength of light having a different wavelength than the second wavelength of light.

In some embodiments of the method, selecting a first wavelength of light includes tapping a portion of the light passing through the waveguide in a first direction and wherein selecting a second wavelength of light includes tapping a portion of the light passing through the waveguide in a first direction.

In some embodiments, selecting a first wavelength of light includes tapping a portion of the light passing through the waveguide in a first direction and wherein selecting a second wavelength of light includes tapping a portion of the light passing through the waveguide in a second direction.

In some embodiments, tapping a portion of the light passing through the first waveguide segment includes tapping a subportion of unamplified light in the first waveguide.

In some embodiments, tapping a portion of the light passing through the first waveguide segment includes tapping a subportion of amplified light in the first waveguide.

In some embodiments, emitting the tapped portion of light includes emitting a signal wavelength of light.

In some embodiments, emitting the tapped portion of light includes emitting a pump wavelength of light.

Yet another aspect of the present invention provides a method that includes inputting light to a first buried waveguide, evanescently coupling light between the first buried waveguide and a buried portion of a second waveguide, transferring light from the buried portion of the second waveguide to a surface portion of the second waveguide, and emitting light from the surface portion of the second waveguide.

In some embodiments, emitting light includes periodically diffracting the light.

Yet another aspect of the present invention provides a method that includes passing light through a first buried waveguide, and evanescently coupling the first buried waveguide and a surface waveguide.

Yet still another aspect of the present invention provides a method that includes a glass substrate having a major surface, a first waveguide segment formed along the major surface of the substrate, and a first tap port including: a second waveguide segment forming a partial transfer evanescent coupler to the first waveguide segment, and a first exit port optically coupled to the second waveguide segment, and an optical-to-electrical convertor positioned to receive light emitted from the first exit port.

In some embodiments, the first exit port includes a diffraction grating optically coupled to the second waveguide segment.

In some embodiments, the diffraction grating is optically coupled to the second waveguide segment, and has a lateral spacing selected to maximize exit transfer of a first wavelength of light selected from a plurality of wavelengths of light carried by the first waveguide.

In some embodiments, the optical-to-electrical convertor is a photodiode. In some embodiments, the photodiode is positioned proximate the first exit port.

In some embodiments, a different type of directional reflective coupler is used to couple a pair of waveguides. In some such embodiments (not shown, but readily apparent from the figures and the following discussion), this reflective directional coupler includes a first waveguide segment that approaches an edge of the substrate at a non-perpendicular angle, and a second waveguide segment that meets the first waveguide segment at the point where the first waveguide segment meets the edge of the substrate. A reflector on the edge of the chip (such as a dielectric mirror) reflects light from the first waveguide segment into the second waveguide segment. In other embodiments, a fiber-optic connection is made externally between two waveguide segments that meet the edge of the chip at separated locations, in order that multiple passes across the amplifying chip are made.

The present invention also provides apparatus and methods for amplifying light in a relatively short transverse distance on a glass substrate. Various embodiments of the present invention also provides combinations of any two or more of the above features.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An integrated photonic apparatus comprising:
   a glass substrate having a major surface;
   a plurality of waveguide segments along the surface of the substrate including a first waveguide segment and a second waveguide segment; and
   a folded wavelength-selective evanescent coupler connecting the first waveguide segment to the second waveguide segment, the folded wavelength-selective evanescent coupler including a reflector located at one end of the folded wavelength-selective evanescent coupler.

2. The apparatus of claim 1, wherein the folded wavelength-selective evanescent coupler includes
   an interaction portion formed by a first length portion, having a first length, of the first waveguide segment and an equivalent length portion of the second waveguide running parallel and adjacent to each other, wherein the first length is substantially equal to one half of an interaction length needed to transfer a first wavelength in a substantially similar non-folded evanescent coupler.

3. The apparatus of claim 2, wherein the first length is a length selected to transfer substantially all light of the first wavelength from the first waveguide segment to the second waveguide segment.

4. The apparatus of claim 2, wherein the reflector is a dielectric mirror that is highly reflective to light of the first wavelength.

5. The apparatus of claim 4, wherein the reflector is also highly transmissive to light of a second wavelength, wherein the first wavelength is different than the second wavelength.

6. The apparatus of claim 1, further comprising:
   a first port configured to launch signal light into the first waveguide segment;
   a second port configured to launch signal light into the second waveguide segment; and
   a third port configured to launch pump light into at least one of the first and the second waveguide segments.

7. An integrated photonic apparatus comprising:
   a glass substrate having a major surface;
   a plurality of waveguide segments along the surface of the substrate including a first waveguide segment and a second waveguide segment; and
   a folded evanescent coupler connecting the first waveguide segment to the second waveguide segment:
   a first port configured to launch signal light into the first waveguide segment;
   a second port configured to launch signal light into the second waveguide segment; and
   a third port configured to launch pump light into at least one of the first and the second waveguide segments, wherein the third port launches pump light through a reflector.

8. The apparatus of claim 1, wherein the first length is a length selected to transfer substantially all light of a first wavelength from the first waveguide segment to the second waveguide segment, and also selected to transfer substantially no light of a second wavelength between the first waveguide segment and the second waveguide segment, wherein the first wavelength is different than the second wavelength.

9. The apparatus of claim 1, further comprising:
   a first grating that interacts with light in at least the first waveguide segment, wherein the first grating eliminates a first wavelength from the first waveguide segment but passes one or more other wavelengths; and
   a second grating that interacts with light in at least the second waveguide segment wherein the second grating passes the first wavelength along the second waveguide segment but eliminates one or more other wavelengths.

10. The apparatus of claim 1, further comprising:
    a first grating that interacts with light in at least the first waveguide segment.

11. The apparatus of claim 10, wherein the first grating eliminates a first wavelength from the first waveguide segment but passes one or more other wavelengths.

12. The apparatus of claim 10, wherein the first grating eliminates a first wavelength from the first waveguide segment but passes the first wavelength along the second waveguide segment but eliminates one or more other wavelengths.

13. The apparatus of claim 10, wherein the first grating forms a gain-flattening filter.

14. The apparatus of claim 10, wherein the first grating forms a gain-flattening filter on both the first waveguide segment and the second waveguide segment.

15. An integrated photonic apparatus comprising:
    a glass substrate having a major surface;
    a plurality of waveguide segments on the surface of the substrate including a first waveguide segment, a second waveguide segment, a third waveguide segment, a fourth waveguide segment;
    a first folded evanescent coupler connecting the first waveguide segment to the second waveguide segment; and
    a second folded evanescent coupler connecting the third waveguide segment to the fourth waveguide segment, wherein the first folded evanescent coupler is a wavelength-selective evanescent coupler.

16. The apparatus of claim 15, wherein the first folded evanescent coupler includes
    a first reflector located at one end of the folded evanescent coupler, and
    an interaction portion formed by a first length portion, having a first length, of the first waveguide segment and an equivalent length portion of the second waveguide running parallel and adjacent to each other, wherein the first length is substantially equal to one half of an interaction length needed to transfer a first wavelength in a substantially similar non-folded evanescent coupler.

17. The apparatus of claim 16, wherein the second folded evanescent coupler includes
    a second reflector located at an end of the second folded evanescent coupler, and
    an interaction portion formed by a length portion, having a second length, of the third waveguide segment and an equivalent length portion of the fourth waveguide running parallel and adjacent to the length portion of the third waveguide segment, wherein the second length is substantially equal to one half of an interaction length needed to transfer a second wavelength, different that the first wavelength, across a substantially similar non-folded evanescent coupler.

18. The apparatus of claim 16, wherein the first length is a length selected to transfer substantially all light of a first wavelength from the first waveguide segment to the second waveguide segment.

19. The apparatus of claim 18, wherein the first reflector is a dielectric mirror that is highly reflective to light of the first wavelength.

20. The apparatus of claim 19, wherein the first reflector is also highly transmissive to light of a second wavelength, wherein the first wavelength is different than the second wavelength.

21. A method comprising:

passing a first light stream having one or more signal wavelengths through a first waveguide and a second waveguide that are optically coupled to one another by a folded evanescent coupler, at least one of which is doped with an optically active species; and launching pump-light directly into an end of the folded evanescent coupler to amplify at least one wavelength selected from a set of one or more signal wavelengths of the first light stream.

22. The method of claim 21, further comprising passing a second light stream having one or more signal wavelengths from the second waveguide to the first waveguide through the folded evanescent coupler in a direction opposite that of the first light stream.

23. The method of claim 22, wherein the first light stream is modulated when inserted to the first waveguide, and the second light stream is continuous-wave when inserted to the second waveguide.

24. A method comprising:

passing light of a first light stream from a first signal waveguide to a second signal waveguide through a folded evanescent coupler in a first direction; and passing light of a second light stream from the second signal waveguide to the first signal waveguide through the folded evanescent coupler in an opposite second direction.

25. The method of claim 24, wherein the first light stream includes signal light and the second light stream includes pump light, and wherein at least one of the first signal waveguide, the second signal waveguide, and the folded evanescent coupler is doped with an optically active species.

26. The method of claim 24, wherein the first light stream includes only signal light and the second light stream includes only pump light.

27. The method of claim 24, wherein the passing of the first light stream, includes passing light into the folded evanescent coupler from the first waveguide, propagating the light a length of the folded evanescent coupler, reflecting the light, again propagating the light the length of the folded evanescent coupler, and passing the light from the folded evanescent coupler to the second waveguide.

28. The method of claim 27, wherein the length is a distance selected to transfer substantially all light of a first wavelength from the first waveguide to the second waveguide.

29. The method of claim 27, wherein the reflecting occurs at a dielectric mirror that is highly reflective to light of the first wavelength.

30. The method of claim 29, wherein the dielectric mirror is also highly transmissive to light of a second wavelength, wherein the first wavelength is different than the second wavelength.

31. A method comprising:

passing light of a first light stream from a first signal waveguide to a second signal waveguide through a folded evanescent coupler in a first direction, wherein the passing of the first light stream includes passing light into the folded evanescent coupler from the first waveguide;

propagating the light a length of the folded evanescent coupler;

reflecting the light wherein the reflecting occurs at a dielectric mirror that is highly reflective to light of the first wavelength;

again propagating the light the length of the folded evanescent coupler; and passing the light from the folded evanescent coupler to the second waveguide;

passing light of a second light stream from the second signal waveguide to the first signal waveguide through the folded evanescent coupler in an opposite second direction; and launching pump light through the dielectric mirror.

32. The method of claim 24, wherein the folded evanescent coupler has a length selected to transfer substantially all light of a first wavelength from the first waveguide to the second waveguide, and also selected to transfer substantially no light of a second wavelength between the first waveguide segment and the second waveguide segment, wherein the first wavelength is different than the second wavelength.

33. The method of claim 24, further comprising:

wavelength-selective filtering the first light stream.

34. The method of claim 32, wherein the wavelength-selective filtering eliminates a first wavelength from the first waveguide but passes one or more other wavelengths.

35. The method of claim 32, wherein the wavelength-selective filtering eliminates a first wavelength from the first waveguide, and passes the first wavelength along the second waveguide but eliminates one or more other wavelengths from the second waveguide.

36. The method of claim 32, wherein the wavelength-selective filtering performs a gain-flattening.

37. The method of claim 32, wherein the wavelength-selective filtering performs a gain-flattening filtering to both the first waveguide and the second waveguide.

* * * * *

UNITED STATES PATENT AND TRADEMARK OFFICE
CERTIFICATE OF CORRECTION

PATENT NO. : 6,813,405 B1
DATED : November 2, 2004
INVENTOR(S) : Bendett et al.

It is certified that error appears in the above-identified patent and that said Letters Patent is hereby corrected as shown below:

Column 31,
Line 53, after "stream" delete ",".

Signed and Sealed this

Fifth Day of April, 2005

JON W. DUDAS
*Director of the United States Patent and Trademark Office*